(12) United States Patent
Sun

(10) Patent No.: US 11,787,903 B2
(45) Date of Patent: Oct. 17, 2023

(54) HIGHLY STRONG AND TOUGH PHOTO-CROSSLINKED HYDROGEL MATERIAL AND ITS PREPARATION AND APPLICATION

(71) Applicant: ZHONGSHAN GUANGHE MEDICAL TECHNOLOGY CO., LTD., Guangdong (CN)

(72) Inventor: Yu Sun, Guangdong (CN)

(73) Assignee: ZHONGSHAN GUANGHE MEDICAL TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 17/993,884

(22) Filed: Nov. 24, 2022

(65) Prior Publication Data

US 2023/0130864 A1 Apr. 27, 2023

Related U.S. Application Data

(63) Continuation of application No. PCT/CN2020/106113, filed on Jul. 31, 2020.

(30) Foreign Application Priority Data

May 31, 2020 (CN) .......................... 202010481125.6

(51) Int. Cl.

| C08F 2/46 | (2006.01) |
|---|---|
| C08F 2/50 | (2006.01) |
| C08G 61/04 | (2006.01) |
| C08G 65/333 | (2006.01) |
| C08F 283/02 | (2006.01) |
| C08J 3/075 | (2006.01) |

(52) U.S. Cl.
CPC ...... C08G 65/33389 (2013.01); C08F 283/02 (2013.01); C08J 3/075 (2013.01); *C08J 2367/02* (2013.01)

(58) Field of Classification Search
CPC ............... C08F 2/50; C08F 2/46; C08G 61/04
USPC .................. 522/86, 71, 189, 184, 6, 1; 520/1
See application file for complete search history.

(56) References Cited

FOREIGN PATENT DOCUMENTS

| CN | 105131315 | 12/2015 |
|---|---|---|
| CN | 106822183 | 6/2017 |
| CN | 107987287 | 5/2018 |
| CN | 109776450 | 5/2019 |
| CN | 109776451 | 5/2019 |
| CN | 109880132 | 6/2019 |
| CN | 109776451 | * 12/2020 |

OTHER PUBLICATIONS

Zhu et al, CN 109776451 Machine Translation, Dec. 11, 2020 (Year: 2020).*
"International Search Report (Form PCT/ISA/210) of PCT/CN2020/106113", dated Mar. 5, 2021, pp. 1-6.
Malar A. Azagarsamy et al., "Photoregulated Hydrazone-Based Hydrogel Formation for Biochemically Patterning 3D Cellular Microenvironments", ACS Macro Letters, Dec. 2015, pp. 19-23.
Daniel D. McKinnon et al., "Design and Characterization of a Synthetically Accessible, Photodegradable Hydrogel for User-Directed Formation of Neural Networks", Biomacromolecules, vol. 15, Jun. 2014, pp. 2808-2816.
Guido Creusen et al., "Bottom-up design of model network elastomers and hydrogels from precise star polymers", Polymer Chemistry, vol. 10, Jun. 2019, pp. 3740-3750.
Jun Yang et al., "High Strength of Physical Hydrogels Based on Poly(acrylic acid)-g-poly(ethylene glycol) Methyl Ether: Role of Chain Architecture on Hydrogel Properties", J. Phys. Chem. B, vol. 116, Sep. 2012, pp. 12038-12047.

\* cited by examiner

*Primary Examiner* — Jessica Whiteley
(74) *Attorney, Agent, or Firm* — JCIPRNET

(57) ABSTRACT

This invention provides preparations and applications of a highly strong and tough photo-crosslinked hydrogel material. The hydrogel materials are made from the o-nitrobenzyl phototriggers modified photosensitive polymer derivative, double bond groups modified polymer derivative, and photoinitiator. This invention significantly improved the properties of hydrogels by controlling the average molecular weight (arm length) of photosensitive poly (ethylene glycol) (with o-nitrobenzyl phototriggers modification) and its derivatives, and the molar ratio of o-nitrobenzyl phototriggers to poly (ethylene glycol) and its derivatives. Compared with prior technologies, the strength and/or toughness of the hydrogels in this invention are increased by one order of magnitude or even higher. These advances solve the problems of weak mechanical properties in current hydrogel materials and widen the applications of hydrogel materials.

14 Claims, 9 Drawing Sheets

HIGHLY STRONG AND TOUGH PHOTO-CROSSLINKED HYDROGEL MATERIAL AND ITS PREPARATION AND APPLICATION

CROSS-REFERENCE TO RELATED APPLICATION

The present application is a continuation of PCT application No. PCT/CN2020/106113, filed on Jul. 31, 2020, which claims the priority of China Patent Application No. 202010481125.6, filed on May 31, 2020. The entirety of each of the above mentioned patent applications is incorporated by reference herein and made a part of this specification.

BACKGROUND

Technical Field

The invention belongs to the field of biomedical materials, and specially relates to the preparation and applications of a highly strong and tough photo-crosslinked hydrogel material.

Description of Related Art

A hydrogel is designed as highly hydrated and crosslinked 3D polymeric networks. Due to its excellent biocompatibility and favorable mechanical support, it can highly fit the micro-environment of biological tissues and is widely used in tissue engineering and regenerative medicine. In clinical applications, in-situ forming hydrogels have excellent tissue integration. Particularly, the photo-crosslinked hydrogel is easily operational in clinical operation due to its in-situ forming ability and precise controllability in time and space. However, current photo-crosslinked hydrogels severely suffer from weak mechanical properties. For example, the fracture strength of conventional photo-crosslinked hydrogels is only tens of kilopascal. In recent years, double network (DN) hydrogel preparation strategy has effectively improved the mechanical properties of non-covalent hydrogels. However, the stable, covalent DN hydrogels still show limited fracture strength that lower than 2 MPa, and inevitably face the longstanding trade-off between strength and toughness. Their mechanical performance fails to meet the requirement for some soft tissues in human body, thus greatly limiting the applications of photo-crosslinked hydrogels.

A photo-crosslinked gel technology was introduced in Chinese Patent CN201711132472.2, which involves a photocrosslinked hydrogel preparation strategy based on o-nitrobenzyl modified poly (ethylene glycol) or its derivatives, double bond modified polymer, and photoinitiators. In this patent, photoinitiator improves the crosslinking speed and crosslinking efficiency of the original o-nitrobenzyl (crosslinking by generating a very reactive nitroxide), and also brings the polymer derivatives for photo-initiated free radical polymerization and the polymer derivatives for photo-coupled reaction into one photocrosslinking system to form a new polymer composite solution. Under photoirradiation, the initiator is activated to generate free radicals, and initiate the free radical polymerization and the photo-coupled crosslinking at the same time. Based on this, a multiple photo-crosslinking technology is established to prepare composite hydrogels. Hydrogels prepared using this technology have the advantages of fast curing speed, strong tissue adhesion, good biocompatibility, favorable ductility and moderate mechanical strength.

We found that the average chain length of poly (ethylene glycol) and its derivatives had significant effect on the mechanical performance of hydrogels. This has not reported or referred in Chinese Patent CN201711132472.2. Moreover, the strength of the hydrogel prepared by Chinese Patent CN201711132472.2 is very limited, with only 1 to 2 MPa.

SUMMARY

Focusing on the mechanical weakness of current photo-crosslinked hydrogels, this invention proposes a highly strong and tough photo-crosslinked hydrogel material, as well as its preparation and applications.

This invention provides highly strong and tough hydrogels based on photo-crosslinking. By cross-linking the photosensitive groups between polymer derivatives, we facilitate the load transfer between polymer skeletons, improve the mechanical properties of hydrogels, and widen the applications of hydrogels.

The objectives of the invention can be realized based on the following technical scheme.

The first objective of this invention is to provide an o-nitrobenzyl phototrigger modified photosensitive polymer derivative.

The structure of o-nitrobenzyl phototrigger modified polymer (Component A) is shown in Formula I:

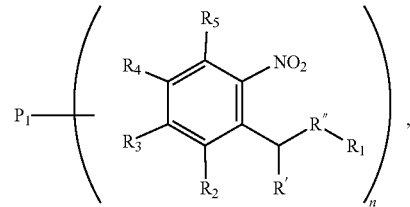

Formula I where, R' is selected from the group consisting of a hydrogen atom, a halogen atom, a hydroxyl group, a sulphydryl group, an amine group, a nitro group, a cyano group, an aldehyde group, a ketone group, an ester group, an amide group, a phosphonic acid group, a phosphonate group, a sulfonate group, a sulfonic acid ester group, a sulfone group, a sulfoxide group, an aryl group, a heteroaryl group, an alkyl group, an alkylene group, a modified alkyl group and a modified alkylene group.

R" is selected from a carbon atom, an oxygen atom, a nitrogen atom or a sulfur atom.

$R_1$ is selected from the group consisting of a hydrogen group, an ether group, an ester group, a carbonate group, an amino formate ester group, a mercaptoformic ester group and phosphoric acid ester group.

$R_2$, $R_3$, $R_4$ and $R_5$ are independently selected from the group consisting of a hydrogen atom, a halogen atom, a hydroxyl group, a mercapto group, an amine group, a nitro group, a cyano group, an aldehyde group, a ketone group, an ester group, an amide group, a phosphonic acid group, a phosphonate group, a sulfonic acid group, a sulfonate group, a sulfone group, a sulfoxide group, an aryl group, a heteroaryl group, an alkyl group, an alkylene group, a modified alkyl group and a modified alkylene group.

In Formula I, $P_1$ connects optionally to any one or more groups of $R_2$, $R_3$, $R_4$ or $R_5$, but not connected to $R_1$.

When $R_2$, $R_3$, $R_4$ and $R_5$ interconnect to each other based on carbon atoms to form a saturated/unsaturated alicyclic/heteroalicyclic ring, or an aromatic ring, or an aromatic heterocyclic ring, $P_1$ can also connect to the rings formed by $R_2$, $R_3$, $R_4$ and $R_5$ via a linkage bond.

When $P_1$ connects to any one or more groups of $R_2$, $R_3$, $R_4$ and $R_5$, or connects to the rings formed by $R_2$, $R_3$, $R_4$ and $R_5$, the linkage bond can be $P_1$—O—, $P_1$—S—, $P_1$—NH—, $P_1$—CH, $P_1$—COO—, or $P_1$—CONH—, whose one end connects to $P_1$, and the other end connects to the benzene ring of the molecule shown in Formula I.

In Formula I, $P_1$ can be a hydrophilic or water-soluble multi-arm poly (ethylene glycol), or its derivatives, and the general formula of $P_1$ is the following:

Formula II where, PEG represents poly (ethylene glycol) chain.

X and Y are independently selected from poly (ethylene glycol), poly (propylene glycol), poly (lactic acid), polyester, poly (hydroxyacetic acid), poly (vinyl alcohol), poly (amino acid), poly (acrylic acid), poly (methacrylic acid), polyacrylate, poly (methacrylamide), poly (vinyl pyrrolidone), copolymer of hydrophilic monomer and hydrophilic monomer, copolymer of hydrophilic monomer and hydrophobic monomer, and copolymer of hydrophobic monomer and hydrophobic monomer.

In Formula II, m≥1, $R_6$ is the multi-arm branching center, and the degree of branching is 2-8. The molecular weight of the structure that connects to $R_6$ is not less than 6000. $R_6$ is selected from one or more of the following structures.

Two-arm branching center includes the following structures:

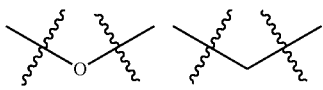

Three-arm branching center includes the following structures:

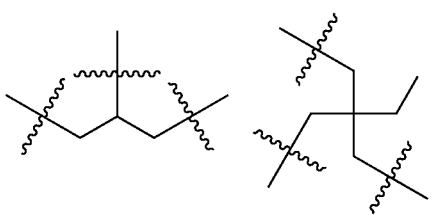

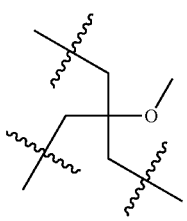

Four-arm branching center includes the following structures:

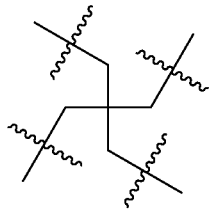

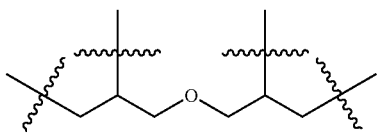

Five-arm branching center includes the following structures:

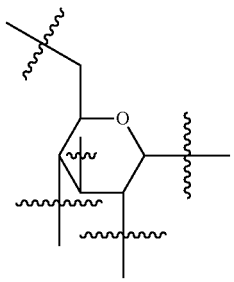

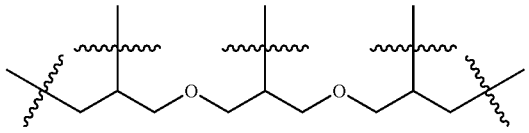

Six-arm branching center includes the following structures:

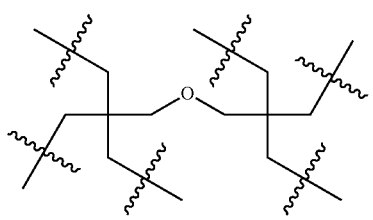

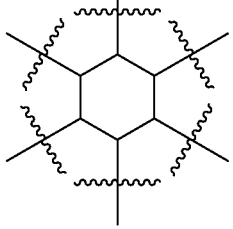

Eight-arm branching center includes the following structures:

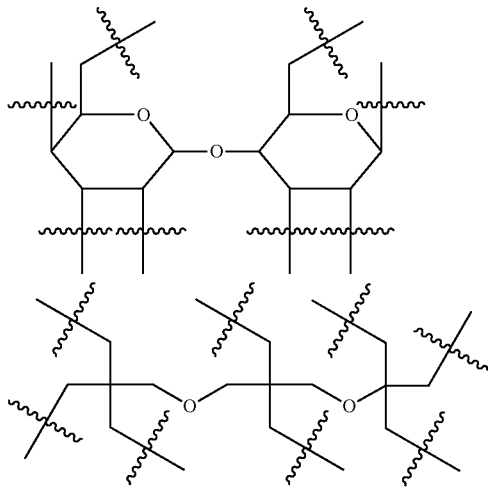

Other branching centers are also included such as various number of arms that are available from commercial products or by simple polymerization.

Preferably, $P_1$ is selected from two-arm poly (ethylene glycol), three-arm poly (ethylene glycol), four-arm poly (ethylene glycol), six-arm poly (ethylene glycol) and eight-arm poly (ethylene glycol).

Preferably, $P_1$ is selected from two-arm poly (ethylene glycol) with molecular weight higher than 20000 or four-arm poly (ethylene glycol) with molecular weight higher than 40000.

In Formula I, $n \geq 2$, the average number of o-nitrobenzyl phototriggers on a single $P_1$ polymer chain (i.e. the structure in brackets in Formula I) is higher than or equal to 2.

Preferably, $R_2$, $R_3$, $R_4$ and $R_5$ interconnect to each other based on carbon atoms to form a saturated/unsaturated alicyclic/heteroalicyclic ring, or an aromatic ring, or an aromatic heterocyclic ring.

Further, the alkyl group is a saturated or unsaturated, aliphatic linear or branched alkyl group with 1 to 30 carbon atoms.

The alkylene group is a saturated or unsaturated, aliphatic linear chain or branched alkylene group with 1 to 30 carbon atoms.

Modified alkyl group is a hybrid group in which one or more carbon atoms are replaced by other groups such as a halogen atom, —OH, —SH, —NO$_2$, —CN, —CHO, —COOH, ester, amide, aromatic, arylidene, —CO—, —O—, —S—, —SO—, —SO$_2$—, amino, secondary amine, tertiary amine, quaternary ammonium salt, saturated/unsaturated single/double cyclic alkyl, bridged aliphatic heterocyclic. The modified alkyl group has 1 to 30 carbon atoms, and its carbon-carbon single bond can be replaced optionally and independently by a carbon-carbon double bond or a carbon-carbon triple bond.

Modified alkylene group is a hybrid group in which one or more carbon atoms are replaced by other groups such as a halogen atom, —OH, —SH, —NO$_2$, —CN, —CHO, —COOH, ester, amide, aromatic, arylidene, —CO—, —O—, —S—, —SO—, —SO$_2$—, amino, secondary amine, tertiary amine, quaternary ammonium salt, saturated/unsaturated single/double cyclic alkyl, bridged aliphatic heterocyclic. The modified alkylene group has 1 to 30 carbon atoms, and its carbon-carbon single bond can be replaced optionally and independently by a carbon-carbon double bond or a carbon-carbon triple bond.

The ether group is selected from the following structures:
—(CH$_2$)$_x$CH$_3$, —(CH$_2$CH$_2$O)$_x$CH$_3$, —(CH$_2$)$_x$(CH$_2$CH$_2$O)$_y$CH$_3$, or

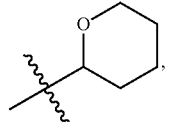

etc., wherein x and y≥0 and are integers.

The ester group is selected from the following structures:
—CO(CH$_2$)$_x$CH$_3$, —CO(CH$_2$CH$_2$O)$_x$CH$_3$, —CO(CH$_2$)$_x$(CH$_2$CH$_2$O)$_y$CH$_3$, etc., wherein x and y≥0 and are integers.

The carbonate group is selected from the following structures:
—COO(CH$_2$)$_x$CH$_3$, —COO(CH$_2$CH$_2$O)$_x$CH$_3$, —COO(CH$_2$)$_x$(CH$_2$CH$_2$O)$_y$CH$_3$, etc., wherein x and y≥0 and are integers.

The amino formate ester group is selected from the following structures:
—CONH(CH$_2$)$_x$CH$_3$, —CONH(CH$_2$CH$_2$O)$_x$CH$_3$, —CONH(CH$_2$)$_x$(CH$_2$CH$_2$O)$_y$CH$_3$, etc., wherein x and y≥0 and are integers.

The mercapto formate ester group is selected from the following structures:
—COS(CH$_2$)$_x$CH$_3$, —COS(CH$_2$CH$_2$O)$_x$CH$_3$, —COS(CH$_2$)$_x$(CH$_2$CH$_2$O)$_y$CH$_3$, etc., wherein x and y≥0 and are integers.

The phosphate ester group is selected from the following structures:
—POOO(CH$_2$)$_x$CH$_3$, —POOO(CH$_2$CH$_2$O)$_x$CH$_3$, —POOO(CH$_2$)$_x$(CH$_2$CH$_2$O)$_y$CH$_3$, etc., wherein x and y≥0 and are integers.

The aryl ring is a monocyclic or fused bicyclic ring containing 5 to 10 atoms.

The heteroaryl is a monocyclic or fused bicyclic ring containing 5 to 10 atoms, and the ring contains at least one hetero atom selected from N, O, S or Si.

The halogen atom is independently selected from F, Cl, Br or I.

The alicyclic ring is a saturated or unsaturated monocyclic or polycyclic alicyclic ring containing 3 to 10 atoms.

The heteroalicyclic ring is a saturated or unsaturated monocyclic or polycyclic alicyclic ring containing 3 to 10 atoms, and the ring contains at least one hetero atom selected from N, O, S or Si. When the heteroalicyclic ring contains an S atom, it is selected optionally from —S—, —SO— or —SO$_2$—; the H atom on the alicyclic or heteroalicyclic ring can be optionally replaced by a halogen atom, a nitro group, an aryl group or an alkyl group or a modified alkyl group.

The aromatic ring is a monocyclic or fused bicyclic ring containing 5 to 10 atoms.

The aromatic heterocycle is a monocyclic or fused bicyclic ring containing 5 to 10 atoms, and the ring contains at least one hetero atom selected from O, S, N or Si; the H atom on the aromatic ring or the aromatic heterocyclic ring can also be optionally replaced by a halogen atom, a nitro group, an aryl group, an alkyl group or a modified alkyl group.

Further, alkyl substituent is preferably selected from linear alkyl as —(CH$_2$)$_x$CH$_3$, branched alkyl as —(CH$_2$)$_x$(CY'Y")$_y$CH$_3$ (Y', Y" is hydrogen, alkyl or modified alkyl), etc., wherein x and y≥0, x and y are integers.

Further, ether substituent is preferably selected from —O(CH$_2$)$_x$CH$_3$, —O(CH$_2$CH$_2$O)$_x$CH$_3$, —O(CH$_2$)$_x$(CH$_2$CH$_2$O)$_y$CH$_3$, etc., wherein x and y≥0, x and y are integers.

Further, thioether substituent is preferably selected from —S(CH$_2$)$_x$CH$_3$, —S(CH$_2$CH$_2$O)$_x$CH$_3$, —S(CH$_2$)$_x$(CH$_2$CH$_2$O)$_y$CH$_3$, etc., wherein x and y≥0, x and y are integers, Further, amino substituent is preferably selected from —NH(CH$_2$)$_x$CH$_3$, —NH(CH$_2$)$_x$(CY'Y")$_y$CH$_3$, —N(CY'Y")$_x$(CY'Y")$_y$,

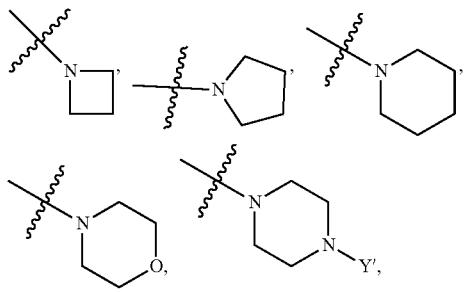

(Y', Y" is hydrogen, alkyl or modified alkyl), etc., wherein x and y≥0, x and y are integers;

Further, ester substituent is preferably selected from —COO(CH$_2$)$_x$CH$_3$, —COO(CH$_2$CH$_2$O)$_x$CH$_3$, —COO(CH$_2$)$_x$(CH$_2$CH$_2$O)$_y$CH$_3$ or the like, wherein x and y≥0, x and y are integers;

Further, amide substituent is preferably selected from —CONH(CH$_2$)$_x$CH$_3$, —CONH(CH$_2$CH$_2$O)$_x$CH$_3$, —CONH(CH$_2$)$_x$(CH$_2$CH$_2$O)$_y$CH$_3$ or the like, wherein x and y≥0, x and y are integers;

Further, aromatic substituent is preferably selected from -Ph,

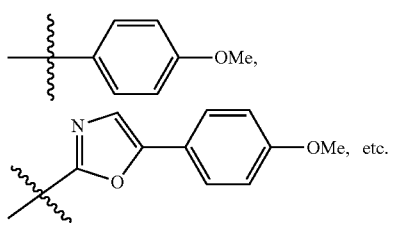

Further, the alicyclic or heteroalicyclic ring is preferably selected from:

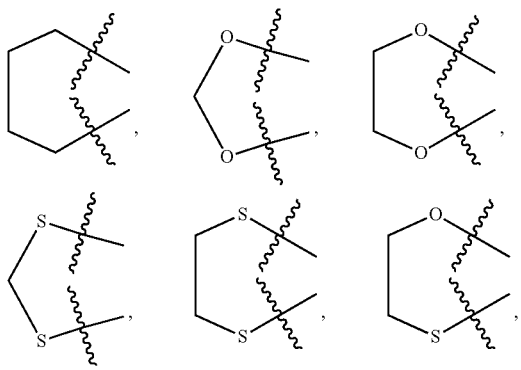

-continued

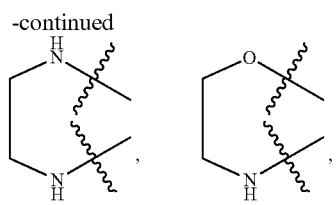

Further, the aromatic ring or the aromatic heterocyclic ring is preferably selected from:

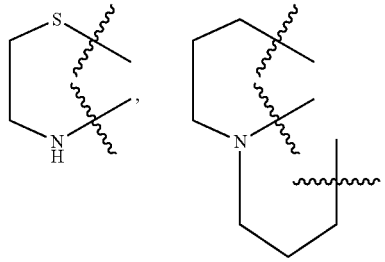

R' is preferably selected from:
—H, —CH$_3$, —CH$_2$CH$_3$, —CH=CH—CH=CH—CH$_3$, —F, —Cl, —Br, —I, —CF$_3$, —CCl$_3$, —CBr$_3$, —CI$_3$, —CN, —COOH, -Ph,

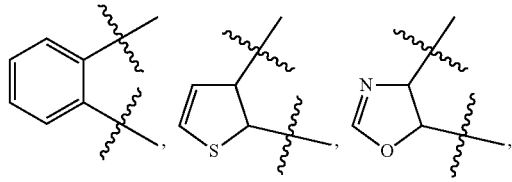

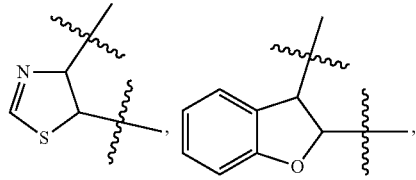

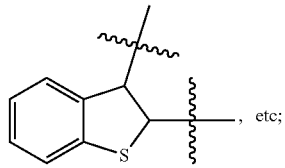

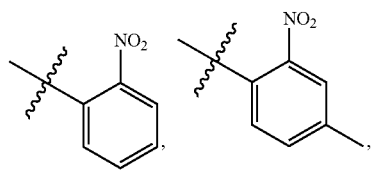

$R_2$, $R_3$, $R_4$ and $R_5$ are preferably selected from:
—H, —OH, —SH, —NH$_2$, —F, —Cl, —Br, —I, —CF$_3$, —CCl$_3$, —CBr$_3$, —CI$_3$, —NO$_2$, —CN, —CHO, —COOH, —COONH$_2$, —SO$_3$H, etc.;

Further, the Formula I is preferably selected from the following structures of Component A-1 to A-30:
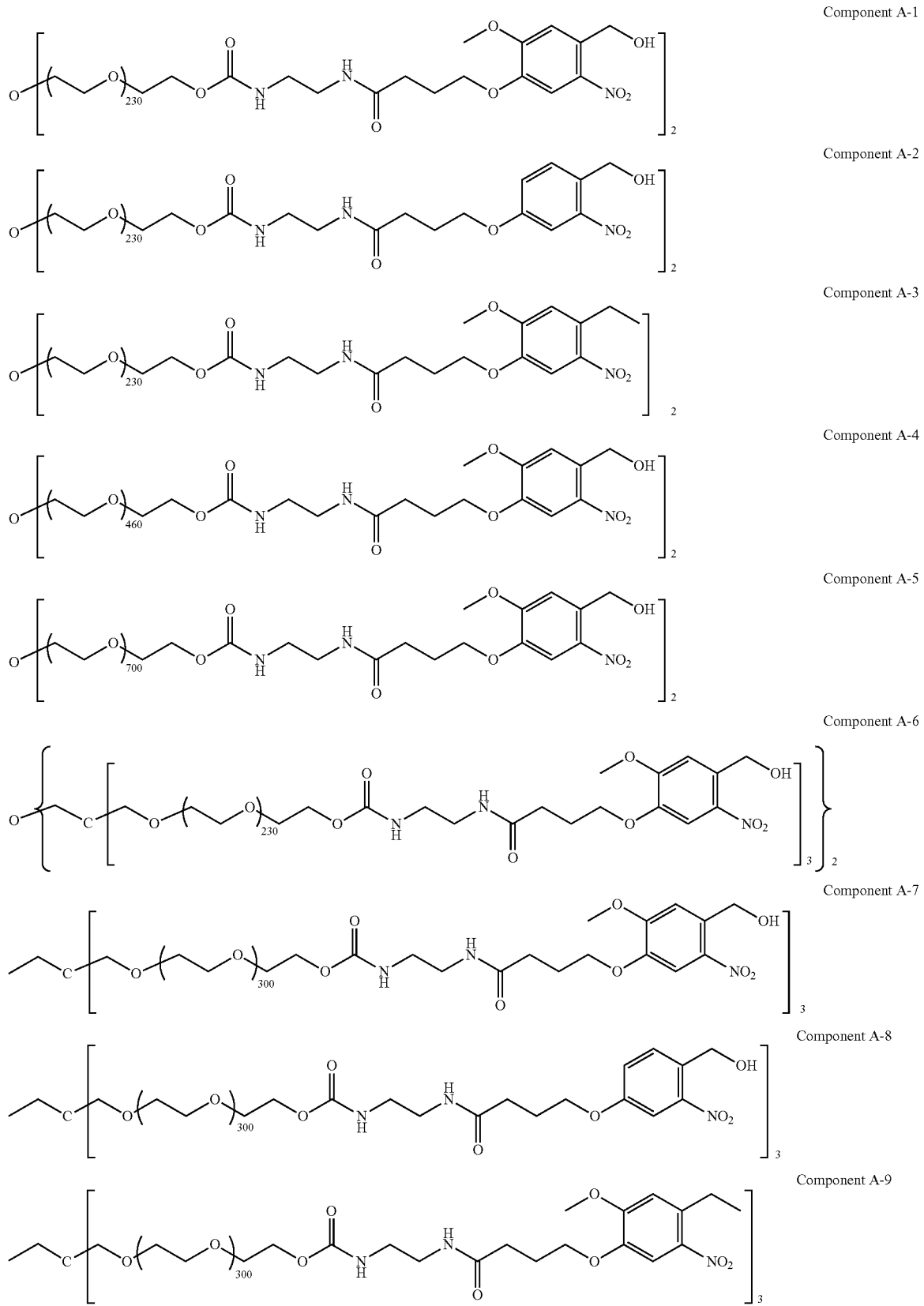

-continued
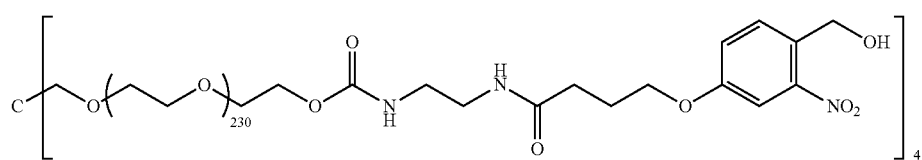
Component A-10
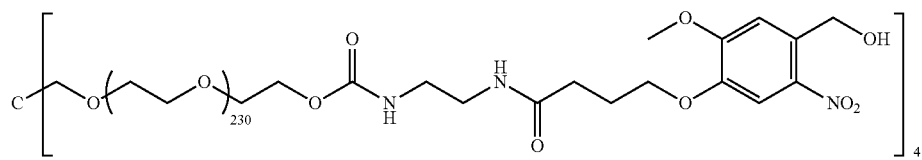
Component A-11
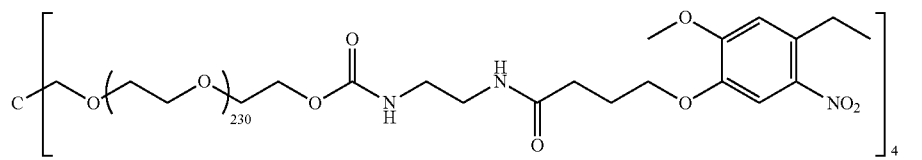
Component A-12
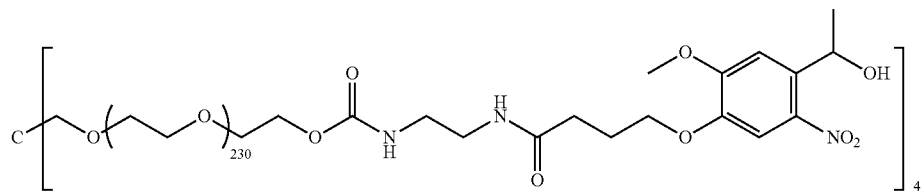
Component A-13
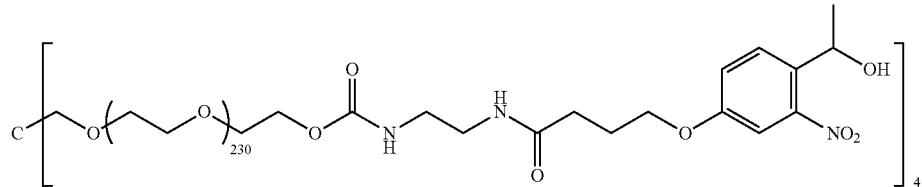
Component A-14
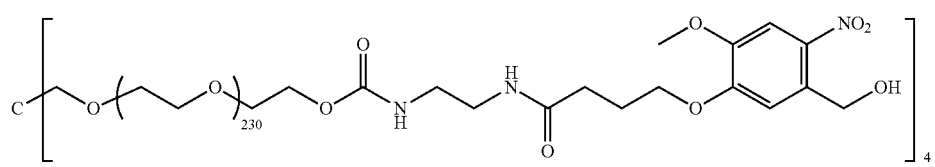
Component A-15
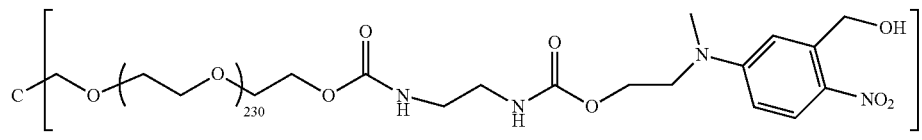
Component A-16
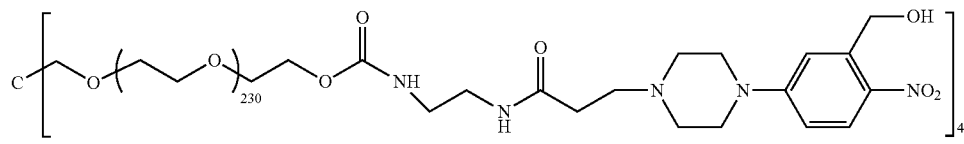
Component A-17
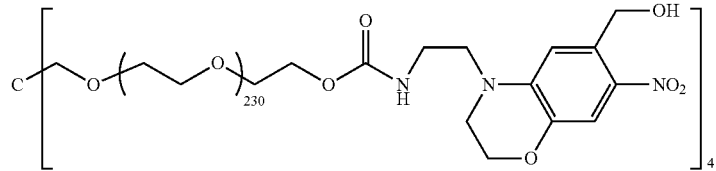
Component A-18

-continued
Component A-19
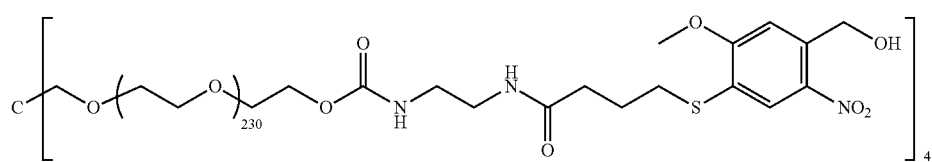
Component A-20
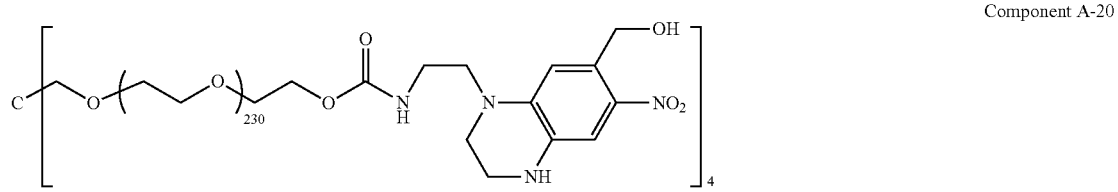
Component A-21
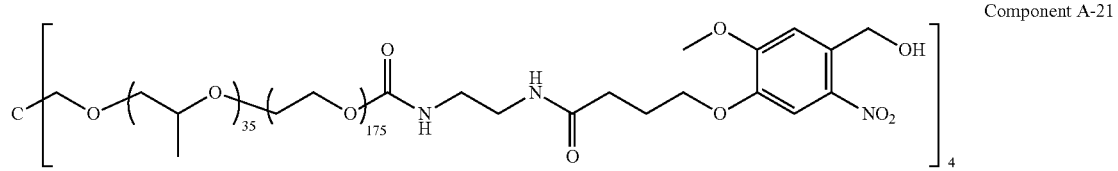
Component A-22
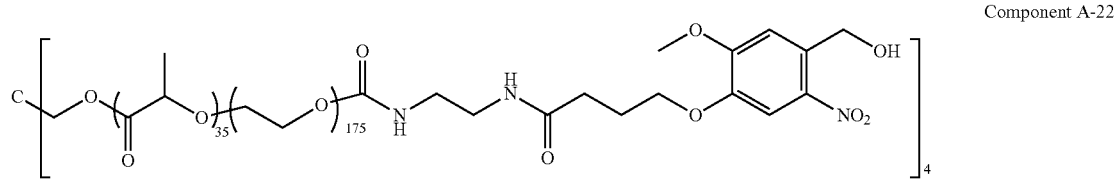
Component A-23
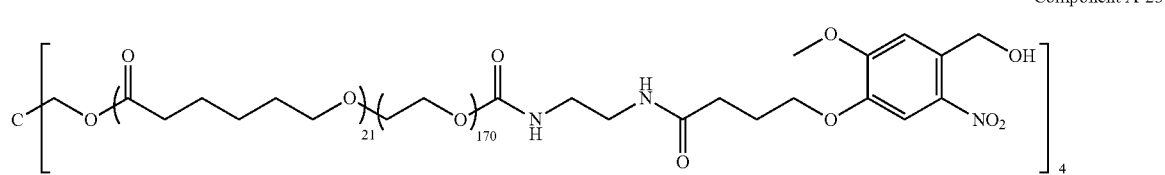
Component A-24
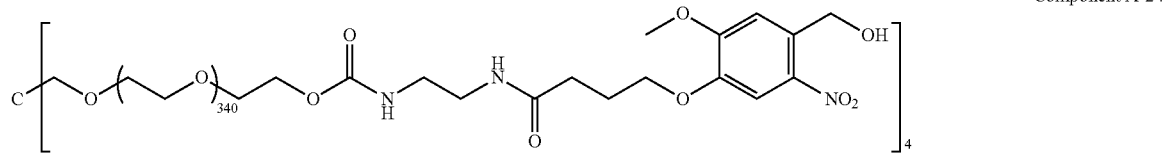
Component A-25
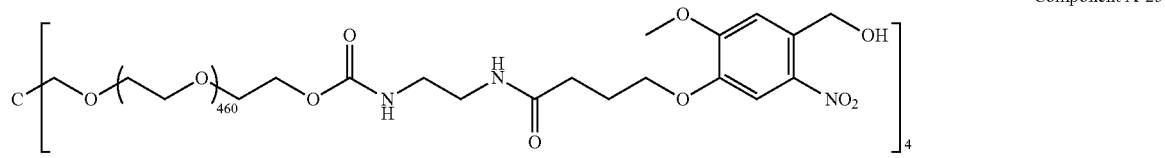
Component A-26
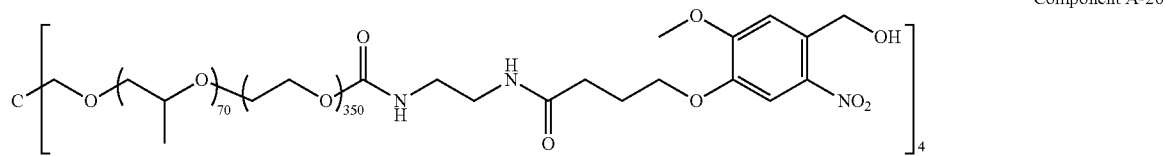
Component A-27
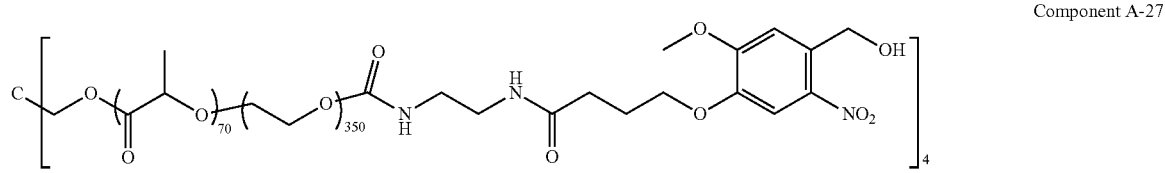

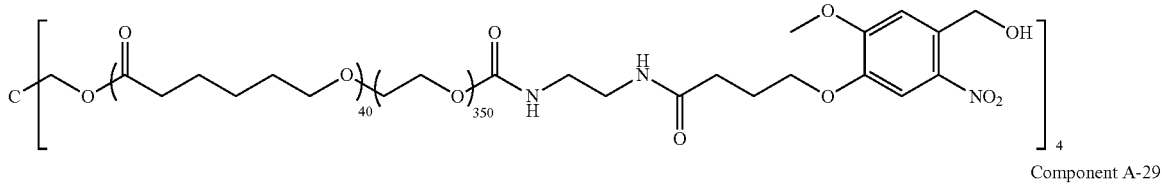

Component A-28

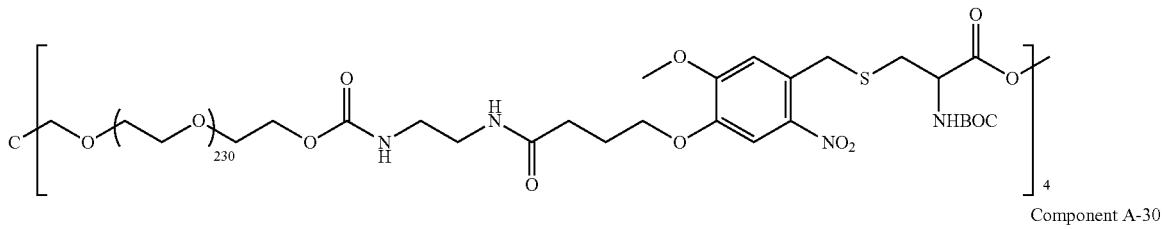

Component A-29

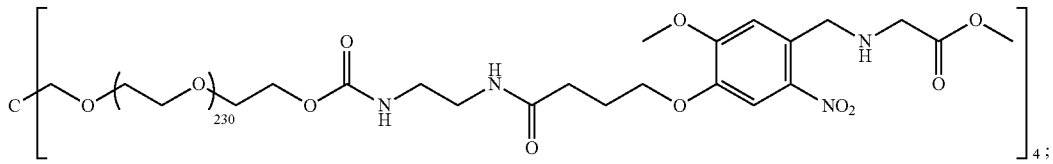

Component A-30

The second objective of this invention is to provide the highly strong and tough photo-crosslinked hydrogel material.

The highly strong and tough photo-crosslinked hydrogel material is prepared from three components as raw materials, and the three raw materials are:

The o-nitrobenzyl phototriggers modified photosensitive polymer derivative named as Component A;
The double bond groups modified polymer derivative named as Component B;
The photoinitiator named as Component C.

The photo-crosslinked hydrogel material of this invention can also be named as a photo-crosslinked composite hydrogel material.

Wherein, Component A is the o-nitrobenzyl phototrigger modified photosensitive polymer derivative that was defined in the first part of the invention.

The structure of double bond groups modified polymer derivative (Component B) is shown in Formula III:

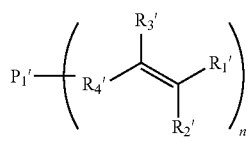

Formula III

Where, $R_1'$, $R_2'$ and $R_3'$ are independently selected from the group consisting of a hydrogen atom, a halogen atom, an aromatic ring, an aromatic heterocyclic ring, an alicyclic ring, a heteroalicyclic ring, an alkyl group, and a modified alkyl group. $R_4'$ is selected from the group consisting of an alkyl group, an ether group, an ester group, a carbonate group, an amide group, an amino formate ester group, a mercapto formate ester group and a phosphate ester group. $n \geq 2$, the average number of double bond groups on a single $P_1'$ polymer chain is higher than or equal to 2.

The definition of the halogen atom, aromatic ring, aromatic heterocyclic ring, alicyclic ring, heteroalicyclic ring, alkyl group, modified alkyl group, ether group, ester group, carbonate group, amide group, amino formate ester group, mercapto formate ester group and phosphate ester group in Formula III is the same as that in Formula I. The selection of above groups in Formula III can be different from Formula I.

$P_1'$ can be a hydrophilic or water-soluble natural macromolecule or synthetic polymers, or selected independently from various hydrophilic or water-soluble natural macromolecule or synthetic polymers.

Hydrophilic or water-soluble natural macromolecules include natural polysaccharides and their derivatives and degradations, and proteins and their derivative, modifiers and degradable peptides, etc.

The natural polysaccharides include hyaluronic acid, carboxymethyl cellulose, methyl cellulose, hydroxyethyl cellulose, hydroxypropyl cellulose, alginate, dextran, agarose, heparin, chondroitin sulfate, glycol chitosan, propylene glycol chitosan, chitosan lactate, carboxymethyl chitosan, and quaternary ammonium salt of chitosan.

The protein includes various hydrophilic or water-soluble animal and plant proteins, collagen, serum proteins, silk fibroin proteins and elastin, and the protein degradations includes gelatin or polypeptides.

Hydrophilic or water-soluble synthetic macromolecules include two-arm or multi-arm poly (ethylene glycol), poly (ethylene imine), dendrites, synthetic peptides, poly (amino acid), poly (acrylic acid), poly (methacrylic acid), acrylate polymer, methacrylic ester polymer, poly (acrylamide), poly (methacrylamide), poly (vinyl alcohol), poly (vinyl pyrrolidone), hydrophilic or water-soluble copolymers of various hydrophilic monomers and hydrophilic monomers, and hydrophilic or water-soluble copolymers of various hydrophilic monomers and hydrophobic monomers.

$P_1'$ is selected from hyaluronic acid, carboxymethyl cellulose, methyl cellulose, hydroxyethyl cellulose, hydroxypropyl cellulose, alginate, dextran, agarose, heparin, chondroitin sulfate, glycol chitosan, propylene glycol chitosan, chitosan lactate, carboxymethyl chitosan, and quaternary ammonium salt of chitosan.
Preferably, the double bond groups modified macromolecules in Formula III can be selected from the following structures of Component B-1 to B-8:
Component B-1
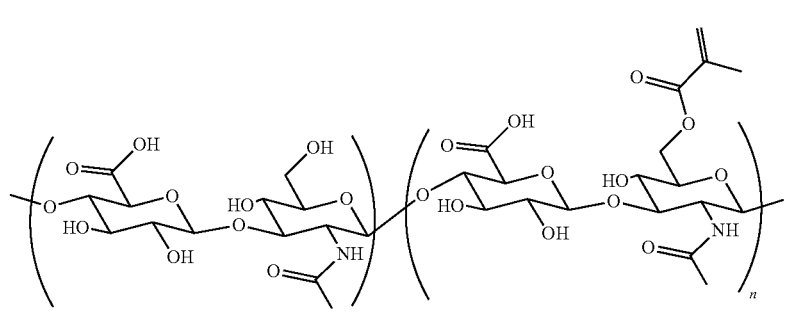
Component B-2
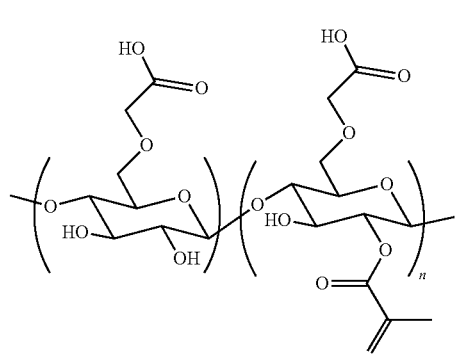
Component B-3
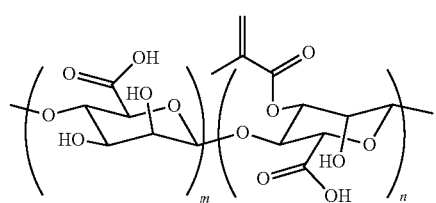
Component B-4
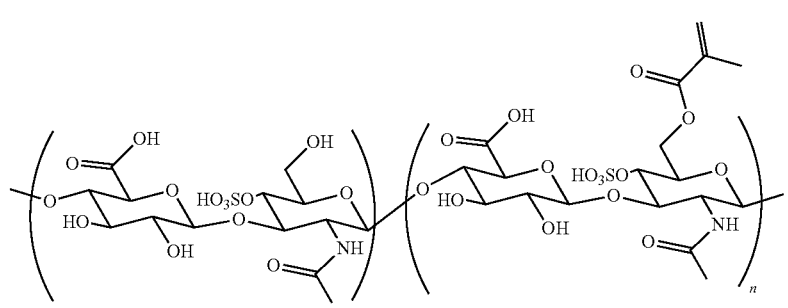
Component B-5
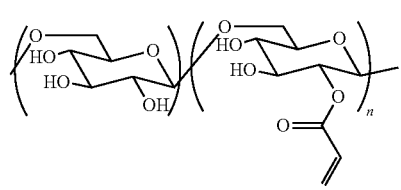

Component B-6

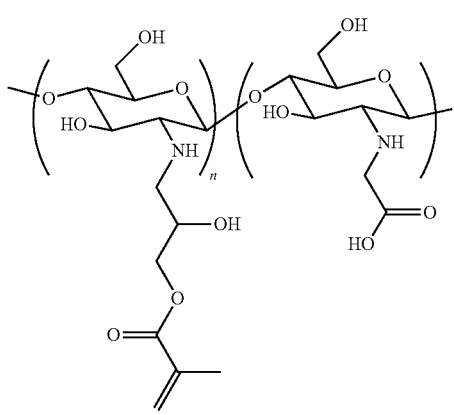

Component B-7

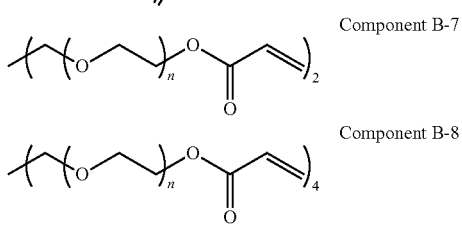

Component B-8

In Component B-1 to B-8, m and n≥2.

The photoinitiator (Component C) is the substance that can produce free radicals under irradiation.

Component C is preferably selected from water-soluble photoinitiator or photoinitiator that can be dispersible in water.

Component C is preferably selected from LAP (Component C-1), I 2959 (Component C-2), Eosin-Y (Component C-3), benzophenone (Component C-4), Na-TPO (Component C-5) and its derivatives.

Component C is preferably selected from LAP, Na-TPO and its derivatives.

Component C-1

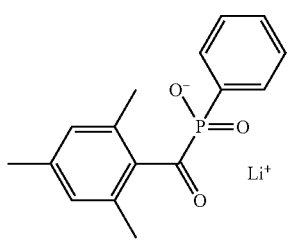

Component C-2

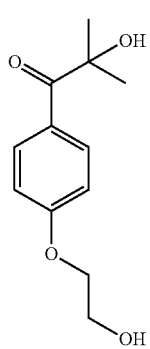

-continued

Component C-3

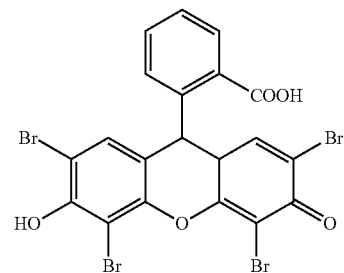

Component C-4

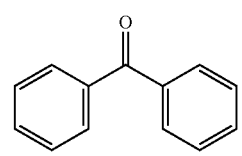

Component C-5

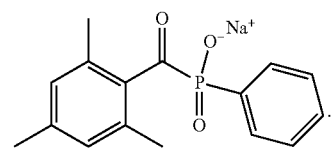

The third objective of this invention is to provide a method to prepare the highly strong and tough photo-crosslinked hydrogel material.

The preparation method of the highly strong and tough photo-crosslinked hydrogel involves the following steps:

The Component A, B and C are dissolved in a biocompatible medium to obtain a hydrogel precursor solution.

Under irradiation of light, the hydrogel precursor solution is photo-crosslinked to form the hydrogel.

There are two ways to obtain the hydrogel precursor solution:

Method one: The Component A, B and C are dissolved in a biocompatible medium to obtain solution A, B and C, respectively. The solution A, B and C are uniformly mixed to obtain hydrogel precursor solution.

Method two: The Component A, B and C are dissolved together in a biocompatible medium to obtain a hydrogel precursor solution.

In the preparation method of the invention, the biocompatible medium is selected from distilled water, physiological saline, buffer solution, acellular matrix, and cell culture medium solution. The media can be selected according to different applications.

In the preparation method of the invention, the concentration of Component A is 0.1% wt-60% wt, preferably 1% wt-40% wt; the concentration of Component B is 0.01% wt-20% wt, preferably 0.05% wt-10% wt; the concentration of Component C is 0.01% wt-5% wt, preferably 0.1% wt-3% wt; the total concentration of solid content is 0.1% wt-60% wt, preferably 1% wt-10% wt in the uniformly formed hydrogel precursor solution.

In the preparation method of the invention, wavelength of the light source is determined according to the absorption wavelength of the o-nitrobenzyl phototriggers and the photoinitiator, and can be 250-500 nm, preferably 300-450 nm. Further preferably 365, 375, 385, 395, or 405 nm.

The technical principle of the photo-crosslinked hydrogel in this invention is as follows: free radical reaction between the o-nitrobenzyl phototriggers in Component A and Component C (photoinitiator) happens under irradiation. Simultaneously, free radical polymerization between double bond functional groups in Component B and Component C (photoinitiator) happens under irradiation. The free radicals produced by the two reactions further react, crosslink and form hydrogels.

The characteristics of the photo-crosslinked hydrogel material provided by this invention involves the polymerization of the Component A (o-nitrobenzyl phototriggers modified photosensitive polymer derivatives) and the Component B (double bond groups modified polymer derivatives) under the presence of Component C (photoinitiator) to form hydrogels. When the average molecular weight of poly(ethylene glycol) and its derivatives in Component A reaches a threshold value, the strength and toughness of the hydrogels were significantly improved (the specific data were shown in Example 19-22). Based on the above findings, the strength and/or toughness of hydrogels were increased by one order of magnitude or even higher in this invention. Note that this advance solves the problems of the weak mechanical properties exit in hydrogels currently and widens the application scope of hydrogels.

The fourth objective of this invention is to provide a kit for preparing the highly strong and tough photo-crosslinked hydrogel material.

The kit includes Component A—o-nitrobenzyl phototriggers modified photosensitive polymer derivatives, Component B—double bond groups modified polymer derivatives, Component C—photoinitiators, and instructions for preparation and application of the hydrogel.

The above kit can also include a biocompatible media such as distilled water, physiological saline, buffer, and cell culture media.

The instructions in the above kit describe the application of hydrogels, including postoperative wound closure, tissue fluid leakage sealing, hemostasis material, tissue engineering scaffold material, 3D printed bio-ink and its application as a cell, protein or drug carrier.

The fifth objective of this invention is to provide applications of the highly strong and tough photo-crosslinked hydrogel material.

The invention provides the usage of the above-mentioned photo-crosslinked hydrogel for preparing postoperative wound closure-tissue sutureless material or medicament.

The invention provides the usage of the above-mentioned photo-crosslinked hydrogel for preparing postoperative wound closure-tissue repair material or medicament.

The invention also provides the usage of the above-mentioned photo-crosslinked hydrogel for preparing postoperative wound closure-postoperative anti-adhesion material or medicine.

The invention also provides the usage of the above photo-crosslinked for preparing a postoperative wound closure-oral ulcer material or medicament.

The invention also provides the usage of above photo-crosslinked hydrogel for preparing tissue fluid leakage sealing-enteric leakage sealing material or medicine.

The invention also provides the usage of above photo-crosslinked hydrogel for preparing tissue fluid leakage sealing-cerebrospinal fluid leakage sealing material or medicine.

The invention also provides the usage of above photo-crosslinked hydrogel for preparing tissue fluid leakage sealing-gastric leakage sealing material or medicine.

The invention also provides the usage of the above photo-crosslinked hydrogel for preparing hemostatic material-hepatic hemostatic material or medicament.

The invention also provides the usage of the above photo-crosslinked hydrogel for preparing hemostatic material-renal hemostatic material or medicament.

The invention also provides the usage of the above photo-crosslinked hydrogel for preparing hemostatic material-splenic hemostatic material or medicament.

The invention also provides the usage of the above photo-crosslinked hydrogel for preparing hemostatic material-pancreatic hemostatic material or medicament.

The invention also provides the usage of the above photo-crosslinked hydrogel for preparing hemostatic material-bone section hemostatic material or medicament.

The invention also provides the usage of the above photo-crosslinked hydrogel for preparing hemostatic material-arterial hemostatic material or medicament.

The invention also provides the usage of the above photo-crosslinked hydrogel for preparing hemostatic material-cardiac hemostatic material or medicament.

The invention also provides the usage of the above photo-crosslinked hydrogel for preparing adhesive material-patch fixed material or medicament.

The invention also provides the usage of the above photo-crosslinked hydrogel for preparing adhesive material-valve fixed material or medicament.

The invention also provides the usage of the above photo-crosslinked hydrogel for preparing adhesive material-mucous membrane fixed material or medicament.

The invention also provides the usage of the above photo-crosslinked hydrogel for preparing adhesive material-tissue fixed material or medicament.

The invention also provides the usage of the above photo-crosslinked hydrogel for preparing adhesive material-bone membrane fixed material or medicament.

The invention also provides the usage of the above photo-crosslinked hydrogel for preparing tissue reinforced material-patch material or medicament.

The invention also provides the usage of the above photo-crosslinked hydrogel for preparing tissue engineering scaffold material-cartilage repair material or drugs.

The invention also provides the usage of the above photo-crosslinked hydrogel for preparing tissue engineering scaffold materials-bone repair materials or drugs.

The invention also provides the usage of the above photo-crosslinked hydrogel for preparing tissue engineering scaffold materials-bone/cartilage composite defect repair materials or drugs.

The invention also provides the usage of the above photo-crosslinked hydrogel in 3D printing (FDM) material-bio-ink.

The invention also provides the usage of the above photo-crosslinked hydrogel in 3D printing (SLA) material-bio-ink.

The invention also provides the usage of the above photo-crosslinked hydrogel in 3D printing (DLP) material-bio-ink.

The invention also provides the usage of the above photo-crosslinked hydrogel in 3D printing-combined with interventional surgery.

The invention also provides the usage of the above photo-crosslinked hydrogel for preparing a carrier of cells, proteins, and drugs.

The invention improved the properties of hydrogels significantly by controlling the average molecular weight of poly (ethylene glycol) and its derivatives of Component A, and by controlling the molar ratio of o-nitrobenzyl phototriggers to poly (ethylene glycol) and its derivatives. Compared with the current technology (e.g. CN201711132472.2), the strength and/or toughness of these hydrogels are increased by one order of magnitude or even higher (the specific data were shown in Example 19-22), which solves the problems of the weak mechanical properties in hydrogel materials currently and widens the application scope of hydrogels.

The hydrogel prepared by this technology has the advantages of fast curing speed, strong tissue adhesion, good biocompatibility and favorable ductility and strength. Compared with the existing technology, this invention has the following advantages and beneficial effects:

(1) Excellent mechanical properties. The obtained hydrogels have very high strength (up to 15 MPa) and toughness (up to 12 MJ m$^{-3}$), dramatically enhancing the mechanical properties of hydrogel materials. The strength/toughness of the obtained hydrogels exceeds that of most current hydrogels (2) Strong tissue adhesion. This technology enables in situ gelation of hydrogels on the surface of tissue. Specifically, the aldehyde/ketone group and nitroso group generated under light irritation can react with the mercapto group, amine group or carboxyl group on the surface of tissue to realize the integration of the hydrogel and the surrounding tissues, thus overcoming the defect of additional primer needed in free radical polymerization crosslinking.

(3) Good biocompatibility. The raw materials come from natural biocompatible materials, and the formed hydrogel can be degraded.

(4) Fast curing speed. The gelation point is less than 10 s, and the complete gelation is less than 20 s.

(5) Convenient clinical operation. Due to the excellent spatiotemporal controllability, the hydrogel precursor solution can be painted or sprayed on the wound tissue, and forms hydrogel quickly under irradiation while integrating with tissue synchronously without the need of base coating. Therefore, wound closure can be achieved in only one step.

DESCRIPTION OF THE EMBODIMENTS

Figure 1:
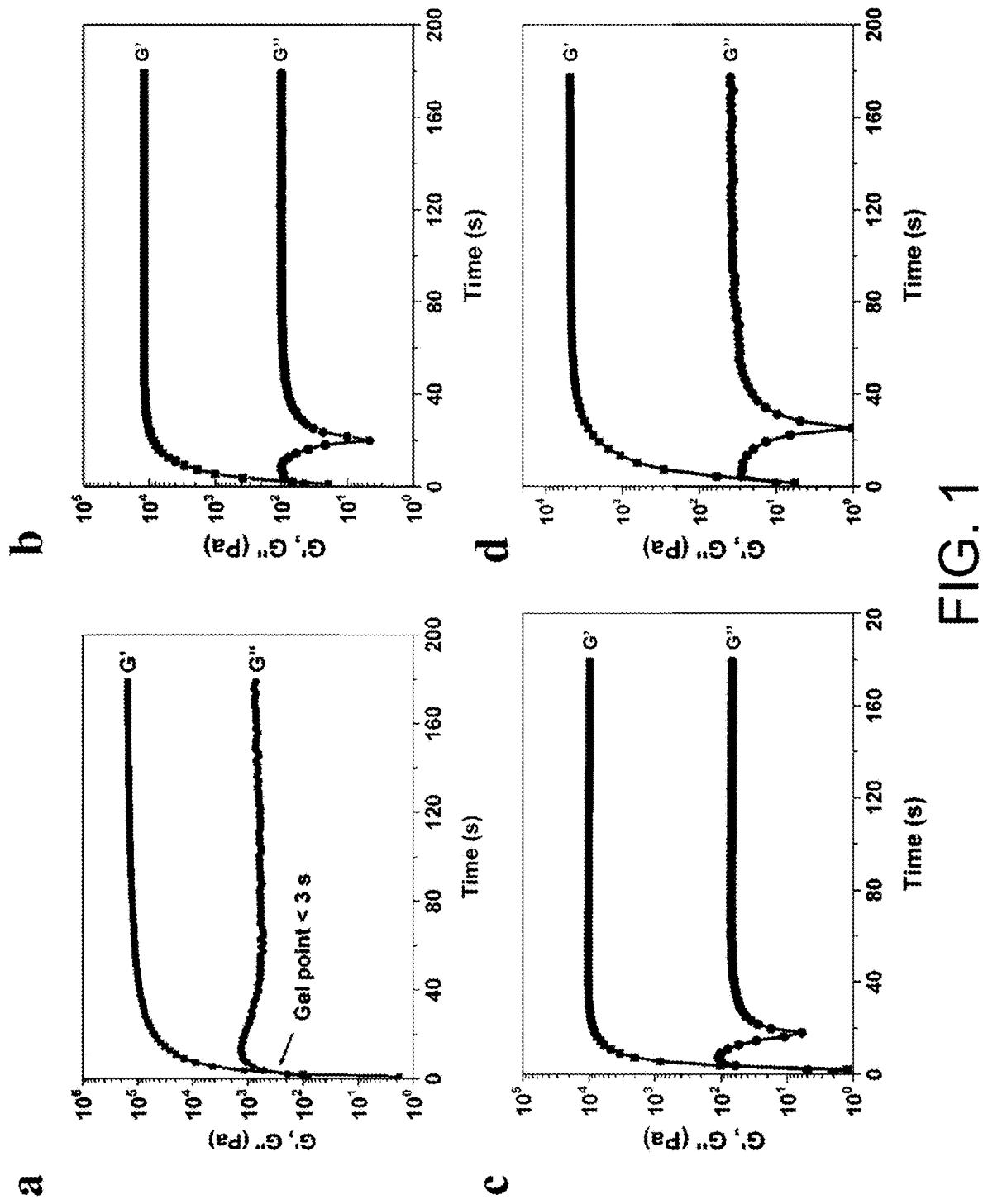
FIG. 1 is a dynamic time sweep rheological diagram of a hydrogel precursor solution (30% Component A-25/5% Component B-1/1% Component C-1, 4% Component A-15/3% Component B-1/0.2% Component C-1, 30% 4APEG50/5% Component B-1/2% Component C-1 and 4% 4APEG50/3% Component B-1/0.2% Component C-1), which is irradiated to form a gel.

The present invention will be described in detail in combination with drawings and specific embodiments.

Embodiment 1: Synthesis of Component A-2

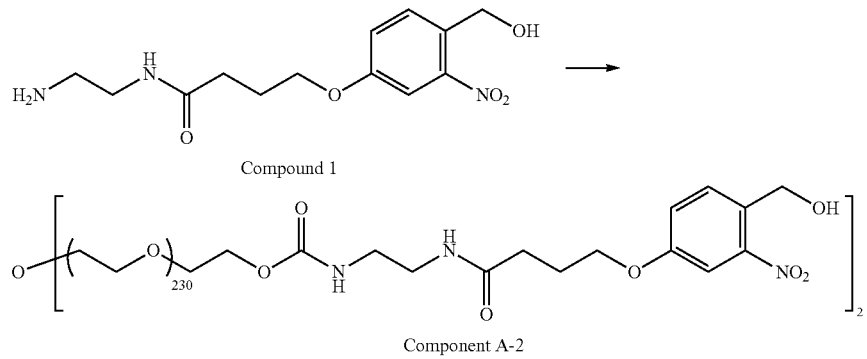

Compound 1

Component A-2

(1) Synthesis of Compound 1: The synthesis was carried out according to the method referred to in the reference (Yunlong Yang; Jieyuan Zhang; Zhenzhen Liu; Qiuning Lin; Xiaolin Liu; Chunyan Bao; Yang Wang; Linyong Zhu. Adv. Mater. 2016, 28, 2724). $^1$H NMR (400 MHz, CDCl$_3$): δ=7.71 (s, 1H), 7.35 (d, 1H), 7.22 (d, 1H), 4.96 (s, 2H), 4.13 (t, J=6.1 Hz, 2H), 3.32 (dd, J=11.6, 5.7 Hz, 2H), 2.82 (t, J=5.9 Hz, 2H), 2.44 (t, J=7.2 Hz, 2H), 2.26-2.17 (m, 2H).

(2) Synthesis of Component A-2: Poly (ethylene glycol) (8 g) was dissolved in anhydrous CH$_2$Cl$_2$ (100 mL) with the addition of 4-dimethylaminopyridine (DMAP, 0.005 g) and triethylamine (TEA, 0.101 g). The above solution was dropwise added into the anhydrous CH$_2$Cl$_2$ dissolved phenyl 4-nitrochloroformate (0.201 g) and stirred at room temperature for 5 h. Remove half of the solvent by vacuum distillation and pour the residue into Et$_2$O to collect white solid. The above re-sedimentation process was repeated several times until the unreacted raw materials (such as phenyl 4-nitrochloroformate) were completely removed. After above process, Compound 1 (7.8 g) was obtained. The dried compound was dissolved in anhydrous DMF (50 mL), and TEA (0.1 mL) and Compound 1 (0.327 g) were added. The mixture was stirred at room temperature for 6 h. The solvent was removed through vacuum distillation and the mixture was redissolved in CH$_2$Cl$_2$. Then the solution was washed three times with NaOH solution (1.0 M) and HCl solution (1.0 M) to remove the impurities such as p-nitrophenol, NB and TEA. The organic phase was dried by anhydrous Na$_2$SO$_4$ and half of the solvent was removed by vacuum distillation. The residue was added into Et$_2$O to collected light yellow solid—Component A-2 (7.2 g, yield: 90%).

According to $^1$H NMR spectroscopy, the peak at 7.3-7.9 ppm belongs to the proton in the terminal group, and the grafting degree (3.4-3.6) can be calculated by this chemical shift. $^1$H NMR (400 MHz, D$_2$O): δ 3.72 (s, 1818H), 7.33 (s, 2H), 7.43 (s, 2H), 7.81 (s, 2H), 4.96 (s, 4H), 2.43 (q, 4H), 2.12 (m, 4H).

Embodiment 2: Synthesis of Component A-3

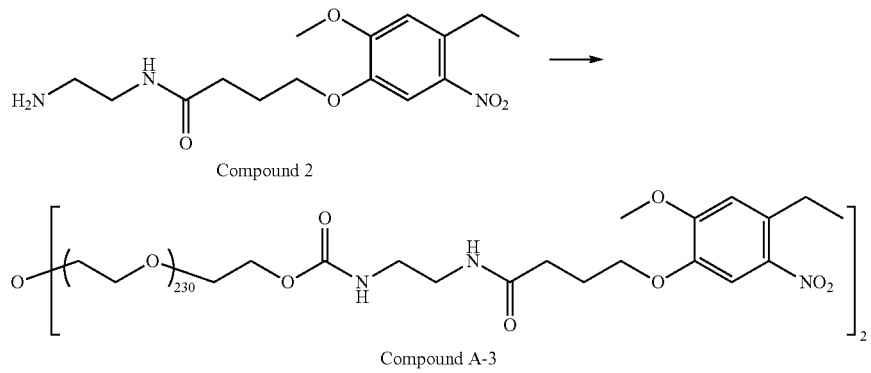

Compound 2

Compound A-3

(1) Synthesis of Compound 2: The synthesis was carried out according to the method referred to in the reference (Yunlong Yang; Jieyuan Zhang; Zhenzhen Liu; Qiuning Lin; Xiaolin Liu; Chunyan Bao; Yang Wang; Linyong Zhu. Adv. Mater. 2016, 28, 2724). $^1$H NMR (400 MHz, CDCl$_3$): δ=7.71 (s, 1H), 7.22 (s, 1H), 4.96 (q, 2H), 4.13 (t, J=6.1 Hz, 2H), 3.99 (s, 3H), 3.32 (dd, J=11.6, 5.7 Hz, 2H), 2.82 (t, J=5.9 Hz, 2H), 2.44 (t, J=7.2 Hz, 2H), 2.26-2.17 (m, 2H), 1.56 (t, 3H).

(2) Synthesis of Component A-3: Refer to the synthetic method of Component A-2. The grafting degree (3.4-3.6) was determined by $^1$H NMR. $^1$H NMR (400 MHz, D$_2$O): δ 3.72 (s, 1818H), 7.33 (s, 2H), 7.81 (s, 2H), 4.96 (q, 4H), 2.43 (q, 4H), 2.12 (m, 4H).

Embodiment 3: Synthesis of Component A-9

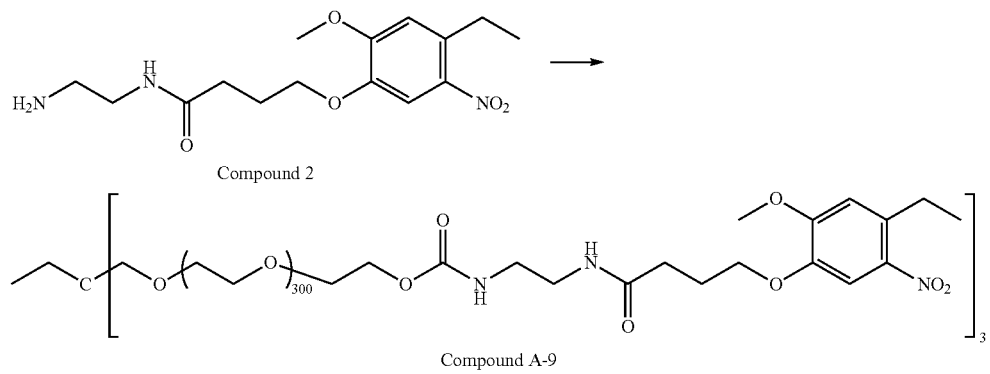

Compound 2

Compound A-9

Synthesis of Component A-9: Refer to the synthetic method of Component A-2. The grafting degree (3.4-3.6) was determined by $^1$H NMR. $^1$H NMR (400 MHz, D$_2$O): δ 3.72 (s, 3636H), 7.33 (s, 3H), 7.81 (s, 3H), 4.96 (q, 6H), 2.43 (q, 6H), 2.12 (m, 6H).

Embodiment 4: Synthesis of Component A-12

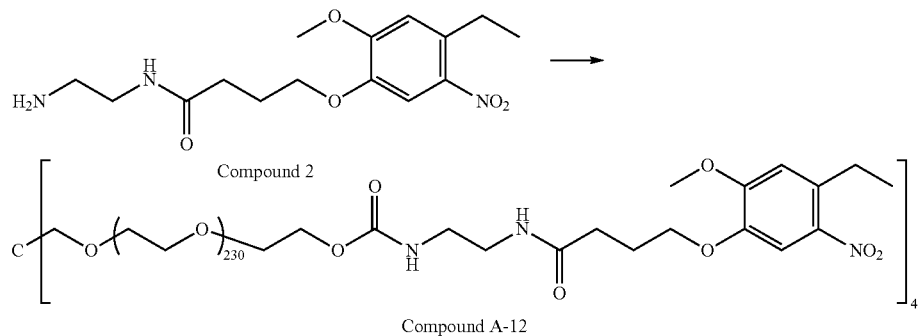

Compound 2

Compound A-12

Synthesis of Component A-12: Refer to the synthetic method of Component A-2. The grafting degree (3.4-3.6) was determined by $^1$H NMR. $^1$H NMR (400 MHz, D$_2$O): δ 3.72 (s, 3636H), 7.33 (s, 4H), 7.81 (s, 4H), 4.96 (q, 8H), 2.43 (q, 8H), 2.12 (m, 8H).

Embodiment 5: Synthesis of Component A-16

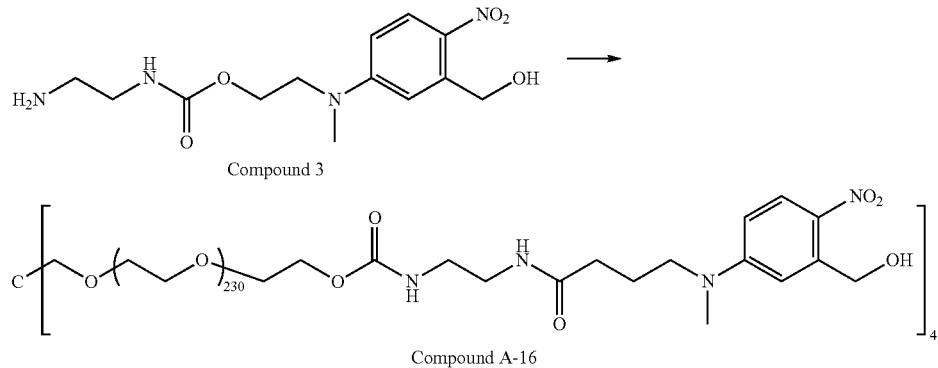

Compound 3

Compound A-16

(1) Synthesis of Compound 3: The synthesis was carried out according to the method referred to in the reference (Emmanuel Riguet and Christian G. Bochet, Org. Lett. 2007, 9, 26, 5453-545). $^1$H NMR (400 MHz, CDCl$_3$): δ 2.90 (bs, 1H), 3.05 (s, 3H), 3.40 (m, 4H), 3.85 (m, 4H), 4.94 (s, 2H), 6.75 (dd, 1H), 7.03 (d, 1H), 8.14 (d, 1H).

(2) Synthesis of Component A-16: Refer to the synthetic method of Component A-2. The grafting degree (3.4-3.6) was determined by $^1$H NMR. $^1$H NMR (400 MHz, D$_2$O): δ 3.72 (s, 3636H), 4.94 (s, 8H), 6.75 (dd, 4H), 7.03 (d, 4H), 8.14 (d, 4H).

Embodiment 6: Synthesis of Component A-18

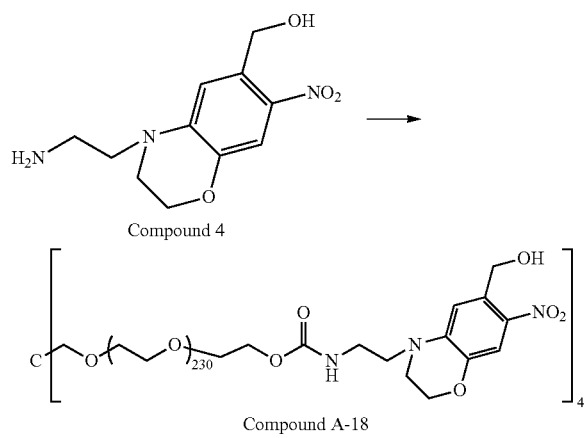

Compound 4

Compound A-18

(1) Synthesis of Compound 4: The synthesis was carried out according to the method referred to in the reference (Emmanuel Riguet and Christian G. Bochet, Org. Lett. 2007, 9, 26, 5453-545). $^1$H NMR (400 MHz, CDCl$_3$): δ 7.71 (s, 1H), 7.22 (s, 1H), 4.24 (s, 2H), 3.32 (t, 2H), 2.82 (t, 2H), 2.75 (t, 2H), 2.00-1.91 (m, 2H).

(2) Synthesis of Component A-18: Refer to the synthetic method of Component A-2. The grafting degree (3.4-3.6) was determined by $^1$H NMR. $^1$H NMR (400 MHz, D$_2$O): δ 3.72 (s, 3636H), 4.24 (s, 8H), 7.71 (s, 4H), 7.22 (s, 4H).

Embodiment 7: Synthesis of Component A-20

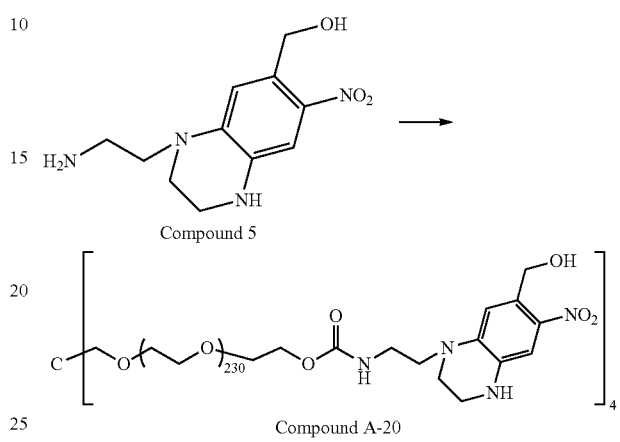

Compound 5

Compound A-20

(1) Synthesis of Compound 5: The synthesis was carried out according to the method referred to in the reference (Emmanuel Riguet and Christian G. Bochet, Org. Lett. 2007, 9, 26, 5453-545). $^1$H NMR (400 MHz, CDCl$_3$): δ 7.71 (s, 1H), 7.22 (s, 1H), 4.24 (s, 2H), 3.32 (t, 2H), 2.82 (t, 2H), 2.75 (t, 2H), 2.00-1.91 (m, 2H).

(2) Synthesis of Component A-20: Refer to the synthetic method of Component A-2. The grafting degree (3.4-3.6) was determined by $^1$H NMR. $^1$H NMR (400 MHz, D$_2$O): δ 3.72 (s, 3636H), 4.24 (s, 8H), 7.71 (s, 4H), 7.22 (s, 4H).

Embodiment 8: Synthesis of Component A-21

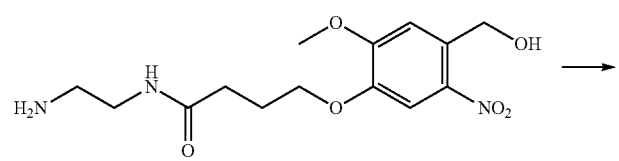

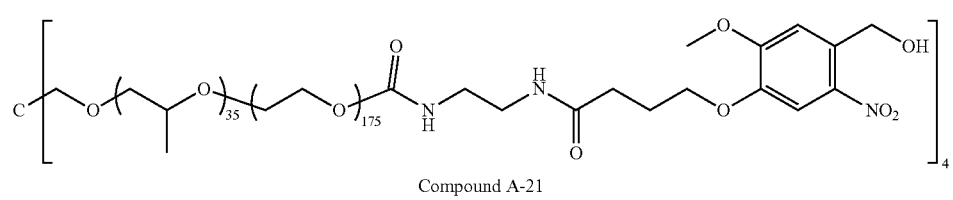

Compound A-21

Synthesis of Component A-21: Refer to the synthetic method of Component A-2. The grafting degree (3.4-3.6) was determined by $^1$H NMR. $^1$H NMR (400 MHz, D$_2$O): δ 3.72 (s, 3220H), 7.33 (s, 4H), 7.81 (s, 4H), 4.96 (s, 8H), 1.53 (s, 420H).

Embodiment 9: Synthesis of Component A-22

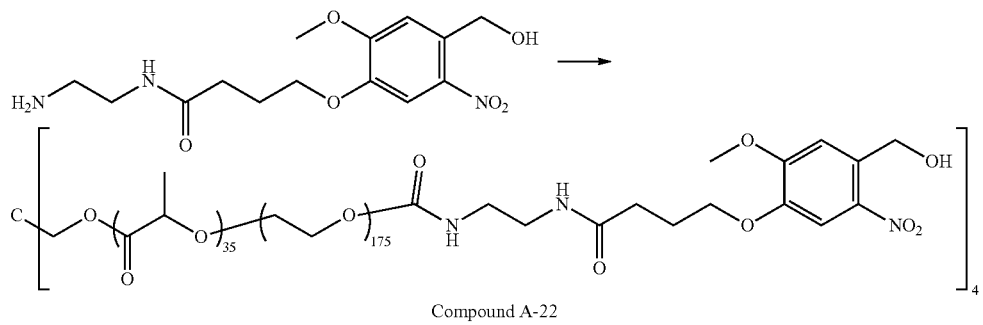

Compound A-22

Synthesis of Component A-22: Refer to the synthetic method of Component A-2. The grafting degree (3.4-3.6) was determined by $^1$H NMR. $^1$H NMR (400 MHz, D$_2$O): δ 3.72 (s, 2940H), 7.33 (s, 4H), 7.81 (s, 4H), 4.96 (s, 8H), 1.53 (s, 420H).

Embodiment 10: Synthesis of Component A-23

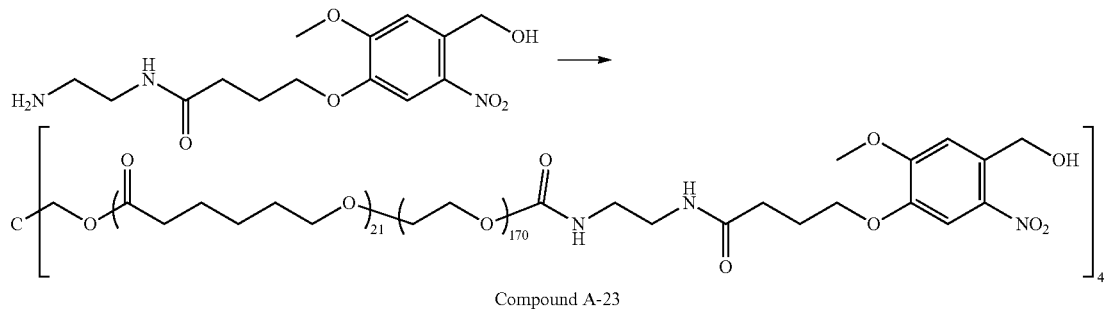

Compound A-23

Synthesis of Component A-23: Refer to the synthetic method of Component A-2. The grafting degree (3.4-3.6) was determined by $^1$H NMR. $^1$H NMR (400 MHz, D$_2$O): δ 3.72 (s, 2900H), 7.33 (s, 4H), 7.81 (s, 4H), 4.96 (s, 8H), 2.53 (m, 180H), 1.53 (m, 500H).

Embodiment 11: Synthesis of Component A-26

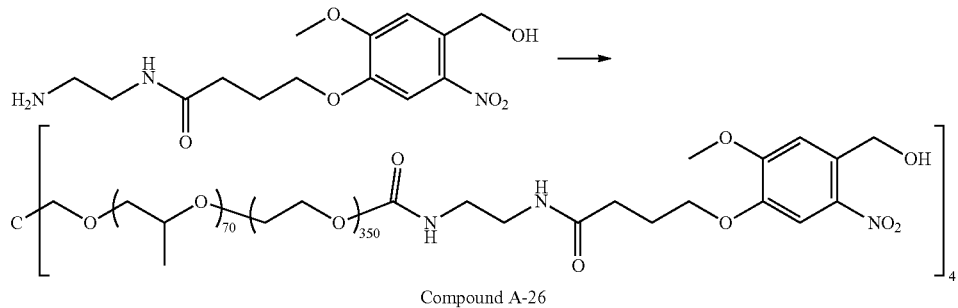

Compound A-26

Synthesis of Component A-26: Refer to the synthetic method of Component A-2. The grafting degree (3.4-3.6) was determined by $^1$H NMR. $^1$H NMR (400 MHz, D$_2$O): δ 3.72 (s, 6400H), 7.33 (s, 4H), 7.81 (s, 4H), 4.96 (s, 8H), 1.53 (s, 850H).

Embodiment 12: Synthesis of Component A-27

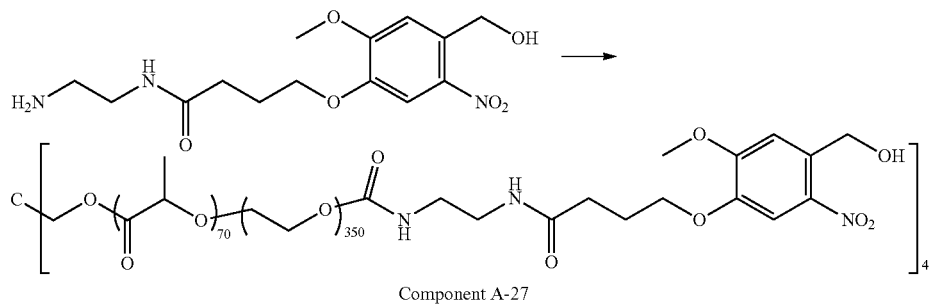

Component A-27

Synthesis of Component A-27: Refer to the synthetic method of Component A-2. The grafting degree (3.4-3.6) was determined by $^1$H NMR. $^1$H NMR (400 MHz, D$_2$O): δ 3.72 (s, 6000H), 7.33 (s, 4H), 7.81 (s, 4H), 4.96 (s, 8H), 1.53 (s, 850H).

Embodiment 13: Synthesis of Component A-28

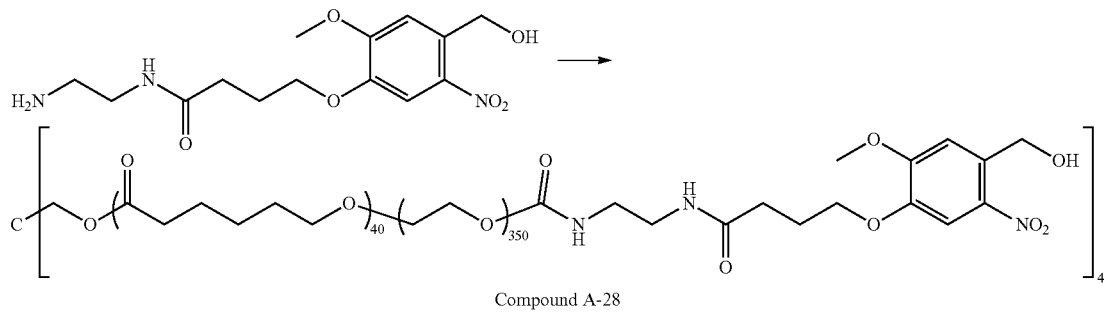

Compound A-28

Synthesis of Component A-28. Refer to the synthetic method of Component A-2. The grafting degree (3.4-3.6) was determined by $^1$H NMR. $^1$H NMR (400 MHz, D$_2$O): δ 3.72 (s, 5800H), 7.33 (s, 4H), 7.81 (s, 4H), 4.96 (s, 8H), 2.53 (m, 360H), 1.53 (m, 1000H).

Comparative Embodiment 14

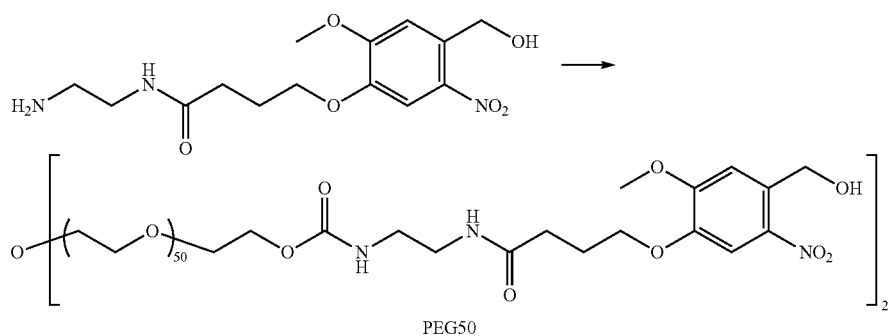

PEG50

Synthesis of PEG50. Refer to the synthetic method of Component A-2. The grafting degree (3.4-3.6) was determined by $^1$H NMR. $^1$H NMR (400 MHz, D$_2$O): δ 3.72 (s, 454H), 7.33 (s, 2H), 7.81 (s, 2H), 4.96 (s, 4H).

Comparative Embodiment 15

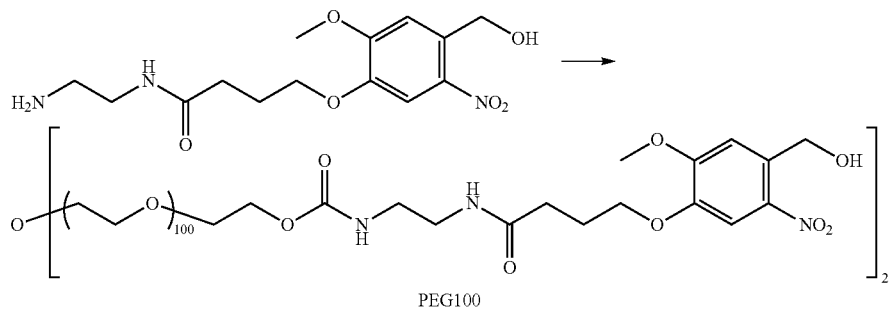

Synthesis of PEG100. Refer to the synthetic method of Component A-2. The grafting degree (3.4-3.6) was determined by $^1$H NMR. $^1$H NMR (400 MHz, D$_2$O): δ 3.72 (s, 900H), 7.33 (s, 2H), 7.81 (s, 2H), 4.96 (s, 4H).

Comparative Embodiment 16

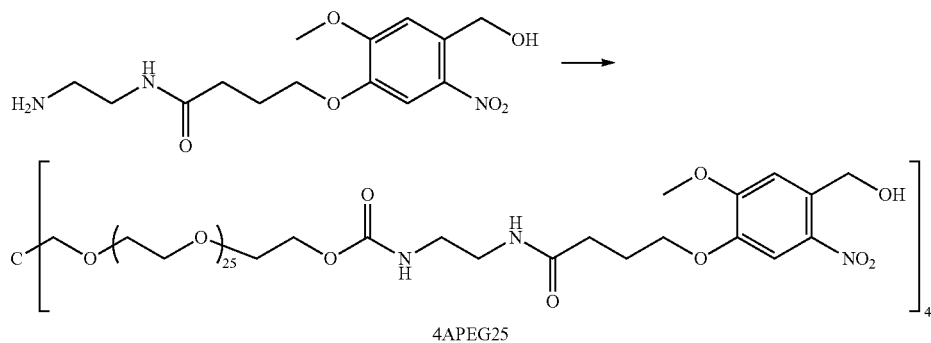

Synthesis of 4APEG25. Refer to the synthetic method of Component A-2. The grafting degree (3.4-3.6) was determined by $^1$H NMR. $^1$H NMR (400 MHz, D$_2$O): δ 3.72 (s, 450H), 7.33 (s, 4H), 7.81 (s, 4H), 4.96 (s, 8H).

Comparative Embodiment 17

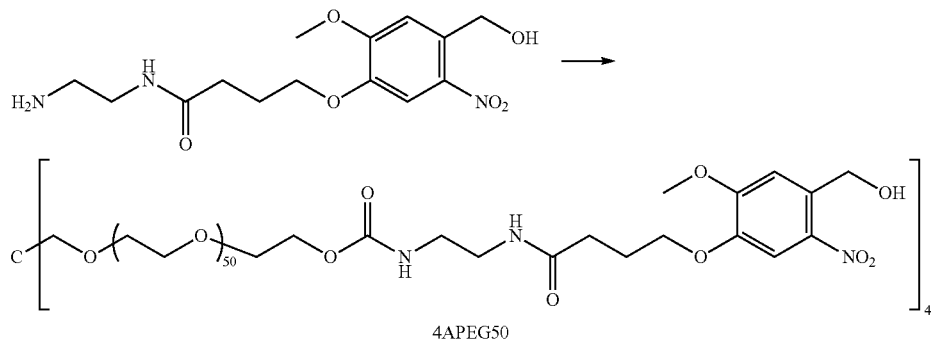

Synthesis of 4APEG50. Refer to the synthetic method of Component A-2. The grafting degree (3.4-3.6) was determined by $^1$H NMR. $^1$H NMR (400 MHz, D$_2$O): δ 3.72 (s, 900H), 7.33 (s, 4H), 7.81 (s, 4H), 4.96 (s, 8H).

Embodiment 18: Photo-Crosslinking Method for Preparing Hydrogel

As shown in Table 1, different hydrogel precursor solutions were prepared according to the process in the invention at 37° C.

TABLE 1

| A/C | B | | | | | |
|---|---|---|---|---|---|---|
| | Component B-1 | Component B-2 | Component B-3 | Component B-4 | Component B . . . | Component B-8 |
| Component A-1/ Component C-1 | 1-40 wt % | 1-40 wt % | 1-40 wt % | 1-40 wt % | 1-40 wt % | 1-40 wt % |
| Component A-1/ Component C-2 | 1-40 wt % | 1-40 wt % | 1-40 wt % | 1-40 wt % | 1-40 wt % | 1-40 wt % |
| Component A-1/ Component C-3 | 1-40 wt % | 1-40 wt % | 1-40 wt % | 1-40 wt % | 1-40 wt % | 1-40 wt % |
| Component A-1/ Component C-4 | 1-40 wt % | 1-40 wt % | 1-40 wt % | 1-40 wt % | 1-40 wt % | 1-40 wt % |
| Component A-1/ Component C-5 | 1-40 wt % | 1-40 wt % | 1-40 wt % | 1-40 wt % | 1-40 wt % | 1-40 wt % |
| Component A-2/ Component C-1 | 1-40 wt % | 1-40 wt % | 1-40 wt % | 1-40 wt % | 1-40 wt % | 1-40 wt % |
| Component A . . ./ Component C . . . | 1-40 wt % | 1-40 wt % | 1-40 wt % | 1-40 wt % | 1-40 wt % | 1-40 wt % |
| Component A-30/ Component C-5 | 1-40 wt % | 1-40 wt % | 1-40 wt % | 1-40 wt % | 1-40 wt % | 1-40 wt % |
| PEG50/ Component C-1 | 1-40 wt % | 1-40 wt % | 1-40 wt % | 1-40 wt % | 1-40 wt % | 1-40 wt % |
| (4A)PEG . . ./ Component C . . . | 1-40 wt % | 1-40 wt % | 1-40 wt % | 1-40 wt % | 1-40 wt % | 1-40 wt % |
| 4APEG50/ Component C-5 | 1-40 wt % | 1-40 wt % | 1-40 wt % | 1-40 wt % | 1-40 wt % | 1-40 wt % |

The above different gel solutions are irradiated at 365, 395 or 405 nm (20 mW/cm$^2$) for a period of time to obtain hydrogels. Hydrogels with different composition and biological effects can be selected for different applications.

Note: Component A . . . is Component A-2 to A-30; (4A)PEG . . . is PEG50, PEG100, 4APEG25 and 4APEG50; Component C . . . is component C-1 to C-5.

1-40 wt % in Table 1 is a preferred range of mass concentration of the hydrogel precursor solution.

Embodiment 19: Rheology Test of Photo-Crosslinked Hydrogel

Rheology analysis was performed on a 37° C. test platform (φ=20 mm) using a HAAKE MARS rheometer. In this embodiment, the effects of UV light time, light intensity and mass concentration of polymer derivatives on gelation time and storage modulus of hydrogels were investigated. FIG. 1 show the real time gelation curve of the prepared hydrogel precursor solutions in experimental groups (30% Component A-25/5% Component B-1/1% Component C-1 and 4% Component A-15/3% Component B-1/0.2% Component C-1) and control groups (30% 4APEG50/5% Component B-1/0.2% Component C-1 and 4% 4APEG50/3% Component B-1/0.2% Component C-1) under irradiation. In rheological test, G' is the storage modulus, G" is the loss modulus, and when G' exceeds G", it is the gel point. As shown in FIG. 1, the solution starts gelation at about 3 s, then it is completely gelled in about 20 s. The modulus at the time of complete gelation can reach 116,400 Pa (FIG. 1a) and 14,700 Pa (FIG. 1b), respectively. The modulus at the time of complete gelation of control groups are 10,500 Pa (FIG. 1c) and 4,500 Pa (FIG. 1d), respectively. The storage modulus of hydrogel in the experimental groups are 10 times and 3 times higher than that in the control groups, indicating that the storage modulus of the hydrogel in the experimental groups are significantly higher than control groups, either at high or low concentration. The storage modulus of other hydrogels with different ratios are also significantly higher than control groups. The specific data are shown in Table 2.

TABLE 2

| The composition of hydrogel material | Gel point (s) | Final Modulus (Pa) |
|---|---|---|
| Component A-4/Component B-1/Component C-1 (30% wt:5% wt:1% wt) | 2-5 | 113,000 |
| Component A-5/Component B-1/Component C-2 (30% wt:5% wt:1% wt) | 2-5 | 115,000 |
| Component A-7/Component B-1/Component C-5 (30% wt:5% wt:2% wt) | 2-5 | 102,000 |
| Component A-10/Component B-1/Component C-1 (30% wt:5% wt:2% wt) | 2-5 | 114,500 |
| Component A-11/Component B-1/Component C-1 (30% wt:5% wt:2% wt) | 2-5 | 106,200 |
| Component A-12/Component B-1/Component C-5 (30% wt:5% wt:2% wt) | 2-5 | 111,050 |
| Component A-13/Component B-1/Component C-1 (30% wt:5% wt:2% wt) | 2-5 | 104,000 |
| Component A-15/Component B-1/Component C-2 (30% wt:5% wt:2% wt) | 2-5 | 101,300 |
| Component A-16/Component B-1/Component C-5 (30% wt:5% wt:2% wt) | 2-5 | 100,000 |
| Component A-21/Component B-1/Component C-1 (30% wt:5% wt:2% wt) | 2-5 | 100,500 |
| Component A-22/Component B-1/Component C-2 (30% wt:5% wt:2% wt) | 2-5 | 114,000 |
| Component A-23/Component B-1/Component C-5 (30% wt:5% wt:2% wt) | 2-5 | 104,500 |
| Component A-25/Component B-1/Component C-1 (30% wt:5% wt:1% wt) | 2-5 | 116,400 |
| Component A-26/Component B-1/Component C-1 (30% wt:5% wt:1% wt) | 2-5 | 115,500 |

TABLE 2-continued

| The composition of hydrogel material | Gel point (s) | Final Modulus (Pa) |
|---|---|---|
| Component A-29/Component B-1/Component C-5 (30% wt:5% wt:2% wt) | 2-5 | 110,100 |
| Component A-4/Component B-2/Component C-1 (30% wt:5% wt:1% wt) | 2-5 | 110,030 |
| Component A-5/Component B-3/Component C-2 (30% wt:5% wt:1% wt) | 2-5 | 119,000 |
| Component A-7/Component B-4/Component C-5 (30% wt:5% wt:2% wt) | 2-5 | 103,000 |
| Component A-10/Component B-5/Component C-1 (30% wt:5% wt:2% wt) | 2-5 | 112,000 |
| Component A-11/Component B-6/Component C-2 (30% wt:5% wt:2% wt) | 2-5 | 109,050 |
| Component A-12/Component B-2/Component C-5 (30% wt:5% wt:2% wt) | 2-5 | 104,040 |
| Component A-13/Component B-3/Component C-1 (30% wt:5% wt:2% wt) | 2-5 | 105,050 |
| Component A-15/Component B-4/Component C-2 (30% wt:5% wt:2% wt) | 2-5 | 111,000 |
| Component A-16/Component B-5/Component C-5 (30% wt:5% wt:2% wt) | 2-5 | 102,300 |
| Component A-21/Component B-6/Component C-1 (30% wt:5% wt:2% wt) | 2-5 | 99,000 |
| Component A-22/Component B-2/Component C-2 (30% wt:5% wt:2% wt) | 2-5 | 101,500 |
| Component A-23/Component B-3/Component C-5 (30% wt:5% wt:2% wt) | 2-5 | 114,000 |
| Component A-25/Component B-4/Component C-1 (30% wt:5% wt:1% wt) | 2-5 | 114,150 |
| Component A-26/Component B-5/Component C-2 (30% wt:5% wt:1% wt) | 2-5 | 106,240 |
| Component A-29/Component B-6/Component C-5 (30% wt:5% wt:2% wt) | 2-5 | 105,450 |
| PEG50/Component B-1/Component C-1 (30% wt:5% wt:2% wt) | 2-5 | 1,320 |
| PEG100/Component B-1/Component C-1 (30% wt:5% wt:2% wt) | 2-5 | 2,430 |
| 4APEG25/Component B-1/Component C-1 (30% wt:5% wt:2% wt) | 2-5 | 2,510 |
| 4APEG50/Component B-1/Component C-1 (30% wt:5% wt:2% wt) | 2-5 | 10,500 |
| 4APEG50/Component B-1/Component C-5 (30% wt:5% wt:2% wt) | 2-5 | 11,400 |
| 4APEG50/Component B-2/Component C-1 (30% wt:5% wt:2% wt) | 2-5 | 16,450 |
| Component A-12/Component B-1/Component C-1 (3% wt:2% wt:0.2% wt) | 2-5 | 6,500 |
| Component A-12/Component B-1/Component C-5 (3% wt:2% wt:0.2% wt) | 2-5 | 6,350 |
| Component A-12/Component B-1/Component C-1 (4% wt:3% wt:0.2% wt) | 2-5 | 14,000 |
| Component A-12/Component B-1/Component C-5 (4% wt:3% wt:0.2% wt) | 2-5 | 14,500 |
| Component A-15/Component B-1/Component C-1 (3% wt:2% wt:0.2% wt) | 2-5 | 6,100 |
| Component A-15/Component B-1/Component C-5 (3% wt:2% wt:0.2% wt) | 2-5 | 6,250 |
| Component A-15/Component B-1/Component C-1 (4% wt:3% wt:0.2% wt) | 2-5 | 14,700 |
| Component A-15/Component B-1/Component C-5 (4% wt:3% wt:0.2% wt) | 2-5 | 14,200 |
| Component A-22/Component B-1/Component C-1 (3% wt:2% wt:0.2% wt) | 2-5 | 6,600 |
| Component A-22/Component B-1/Component C-5 (3% wt:2% wt:0.2% wt) | 2-5 | 6,550 |
| PEG50/Component B-1/Component C-1 (4% wt:3% wt:0.2% wt) | 2-5 | 2,100 |
| PEG50/Component B-1/Component C-1 (3% wt:2% wt:0.2% wt) | 2-5 | 1,050 |
| PEG100/Component B-1/Component C-1 (4% wt:3% wt:0.2% wt) | 2-5 | 1,520 |
| PEG100/Component B-1/Component C-1 (3% wt:2% wt:0.2% wt) | 2-5 | 940 |
| 4APEG25/Component B-1/Component C-1 (4% wt:3% wt:0.2% wt) | 2-5 | 1,500 |
| 4APEG25/Component B-1/Component C-1 (3% wt:2% wt:0.2% wt) | 2-5 | 1,300 |
| 4APEG50/Component B-1/Component C-1 (4% wt:3% wt:0.2% wt) | 2-5 | 4,500 |
| 4APEG50/Component B-1/Component C-1 (3% wt:2% wt:0.2% wt) | 2-5 | 4,400 |

Embodiment 20: Compression Test of Photo-Crosslinked Hydrogel

Figure 2:
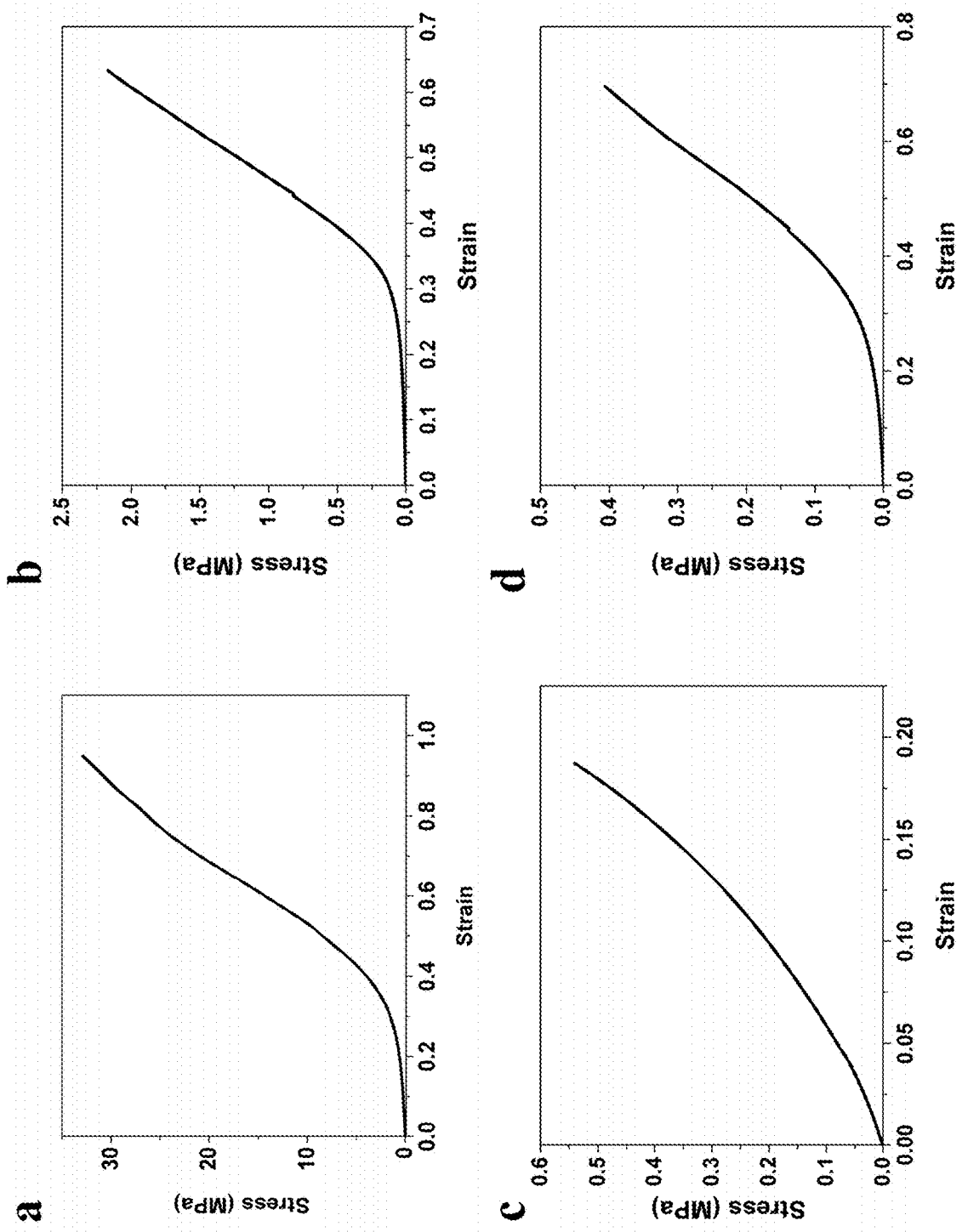
FIG. 2 is a compressive stress-strain curve of the hydrogel (30% Component A-25/5% Component B-1/1% Component C-1, 4% Component A-15/3% Component B-1/0.2% Component C-1, 30% 4APEG50/5% Component B-1/2% Component C-1 and 4% 4APEG50/3% Component B-1/0.2% Component C-1).

The compression test was performed by GT-TCS-2000 tensile machine. The compression test sample is a cylindrical specimen with a diameter of 10 mm and a height of 3 mm. Test speed is 1 mm/min. FIG. 2 shows the compression performance of the hydrogel in experimental groups (30% Component A-25/5% Component B-1/1% Component C-1 and 4% Component A-15/3% Component B-1/0.2% Component C-1) and control groups (30% 4APEG50/5% Component B-1/2% Component C-1 and 4% 4APEG50/3% Component B-1/0.2% Component C-1). As shown in FIG. 2, the compression strength of hydrogels in experimental groups achieve 36.4 MPa (FIG. 2a) and 2.2 MPa (FIG. 2b), respectively. The compression strength of hydrogels in control groups are 5.4 MPa (FIG. 2c) and 0.4 MPa (FIG. 2d), respectively. The compression strength of hydrogel in the experimental groups are 6.7 times and 5.5 times higher than that in the control groups, indicating that the compression strength of the hydrogel in the experimental groups are significantly higher than control groups, either at high or low concentration. The compression strength of other hydrogels with different ratios are also significantly higher than control groups. The specific data are shown in Table 3.

TABLE 3

| The composition of hydrogel material | Compression strength (MPa) |
|---|---|
| Component A-4/Component B-1/Component C-1 (30% wt:5% wt:1% wt) | 30.9 |
| Component A-5/Component B-1/Component C-2 (30% wt:5% wt:1% wt) | 32.4 |
| Component A-7/Component B-1/Component C-5 (30% wt:5% wt:2% wt) | 35.3 |
| Component A-10/Component B-1/Component C-1 (30% wt:5% wt:2% wt) | 35.9 |
| Component A-11/Component B-1/Component C-1 (30% wt:5% wt:2% wt) | 36.2 |
| Component A-12/Component B-1/Component C-5 (30% wt:5% wt:2% wt) | 31.4 |
| Component A-13/Component B-1/Component C-1 (30% wt:5% wt:2% wt) | 35.9 |
| Component A-15/Component B-1/Component C-2 (30% wt:5% wt:2% wt) | 34.7 |
| Component A-16/Component B-1/Component C-5 (30% wt:5% wt:2% wt) | 32.5 |
| Component A-21/Component B-1/Component C-1 (30% wt:5% wt:2% wt) | 33.8 |
| Component A-22/Component B-1/Component C-2 (30% wt:5% wt:2% wt) | 34.5 |
| Component A-23/Component B-1/Component C-5 (30% wt:5% wt:2% wt) | 32.8 |
| Component A-25/Component B-1/Component C-1 (30% wt:5% wt:1% wt) | 36.4 |
| Component A-26/Component B-1/Component C-1 (30% wt:5% wt:1% wt) | 36.6 |
| Component A-29/Component B-1/Component C-5 (30% wt:5% wt:2% wt) | 35.7 |

TABLE 3-continued

| The composition of hydrogel material | Compression strength (MPa) |
|---|---|
| Component A-4/Component B-2/Component C-1 (30% wt:5% wt:1% wt) | 34.8 |
| Component A-5/Component B-3/Component C-2 (30% wt:5% wt:1% wt) | 33.8 |
| Component A-7/Component B-4/Component C-5 (30% wt:5% wt:2% wt) | 31.5 |
| Component A-10/Component B-5/Component C-1 (30% wt:5% wt:2% wt) | 34.9 |
| Component A-11/Component B-6/Component C-2 (30% wt:5% wt:2% wt) | 34.2 |
| Component A-12/Component B-2/Component C-5 (30% wt:5% wt:2% wt) | 32.8 |
| Component A-13/Component B-3/Component C-1 (30% wt:5% wt:2% wt) | 33.5 |
| Component A-15/Component B-4/Component C-2 (30% wt:5% wt:2% wt) | 33.2 |
| Component A-16/Component B-5/Component C-5 (30% wt:5% wt:2% wt) | 32.7 |
| Component A-21/Component B-6/Component C-1 (30% wt:5% wt:2% wt) | 35.1 |
| Component A-22/Component B-2/Component C-2 (30% wt:5% wt:2% wt) | 33.9 |
| Component A-23/Component B-3/Component C-5 (30% wt:5% wt:2% wt) | 34.5 |
| Component A-25/Component B-4/Component C-1 (30% wt:5% wt:1% wt) | 33.3 |
| Component A-26/Component B-5/Component C-2 (30% wt:5% wt:1% wt) | 32.4 |
| Component A-29/Component B-6/Component C-5 (30% wt:5% wt:2% wt) | 32.9 |
| PEG50/Component B-1/Component C-1 (30% wt:5% wt:2% wt) | 1.1 |
| PEG100/Component B-1/Component C-1 (30% wt:5% wt:2% wt) | 3.2 |
| 4APEG25/Component B-1/Component C-1 (30% wt:5% wt:2% wt) | 1.5 |
| 4APEG50/Component B-1/Component C-1 (30% wt:5% wt:2% wt) | 5.4 |
| 4APEG50/Component B-1/Component C-5 (30% wt:5% wt:2% wt) | 5.8 |
| 4APEG50/Component B-2/Component C-1 (30% wt:5% wt:2% wt) | 4.4 |
| Component A-12/Component B-1/Component C-1 (3% wt:2% wt:0.2% wt) | 1.1 |
| Component A-12/Component B-1/Component C-5 (3% wt:2% wt:0.2% wt) | 1.2 |
| Component A-12/Component B-1/Component C-1 (4% wt:3% wt:0.2% wt) | 2.0 |
| Component A-12/Component B-1/Component C-5 (4% wt:3% wt:0.2% wt) | 1.9 |
| Component A-15/Component B-1/Component C-1 (3% wt:2% wt:0.2% wt) | 1.3 |
| Component A-15/Component B-1/Component C-5 (3% wt:2% wt:0.2% wt) | 1.2 |
| Component A-15/Component B-1/Component C-1 (4% wt:3% wt:0.2% wt) | 2.2 |
| Component A-15/Component B-1/Component C-5 (4% wt:3% wt:0.2% wt) | 2.1 |
| Component A-22/Component B-1/Component C-1 (3% wt:2% wt:0.2% wt) | 1.2 |
| Component A-22/Component B-1/Component C-5 (3% wt:2% wt:0.2% wt) | 1.1 |
| PEG50/Component B-1/Component C-1 (4% wt:3% wt:0.2% wt) | 0.3 |
| PEG50/Component B-1/Component C-1 (3% wt:2% wt:0.2% wt) | 0.2 |
| PEG100/Component B-1/Component C-1 (4% wt:3% wt:0.2% wt) | 0.3 |
| PEG100/Component B-1/Component C-1 (3% wt:2% wt:0.2% wt) | 0.2 |
| 4APEG25/Component B-1/Component C-1 (4% wt:3% wt:0.2% wt) | 0.3 |
| 4APEG25/Component B-1/Component C-1 (3% wt:2% wt:0.2% wt) | 0.2 |
| 4APEG50/Component B-1/Component C-1 (4% wt:3% wt:0.2% wt) | 0.4 |
| 4APEG50/Component B-1/Component C-1 (3% wt:2% wt:0.2% wt) | 0.4 |

Embodiment 21: Tensile Test of Photo-Crosslinked Hydrogel

Figure 3:
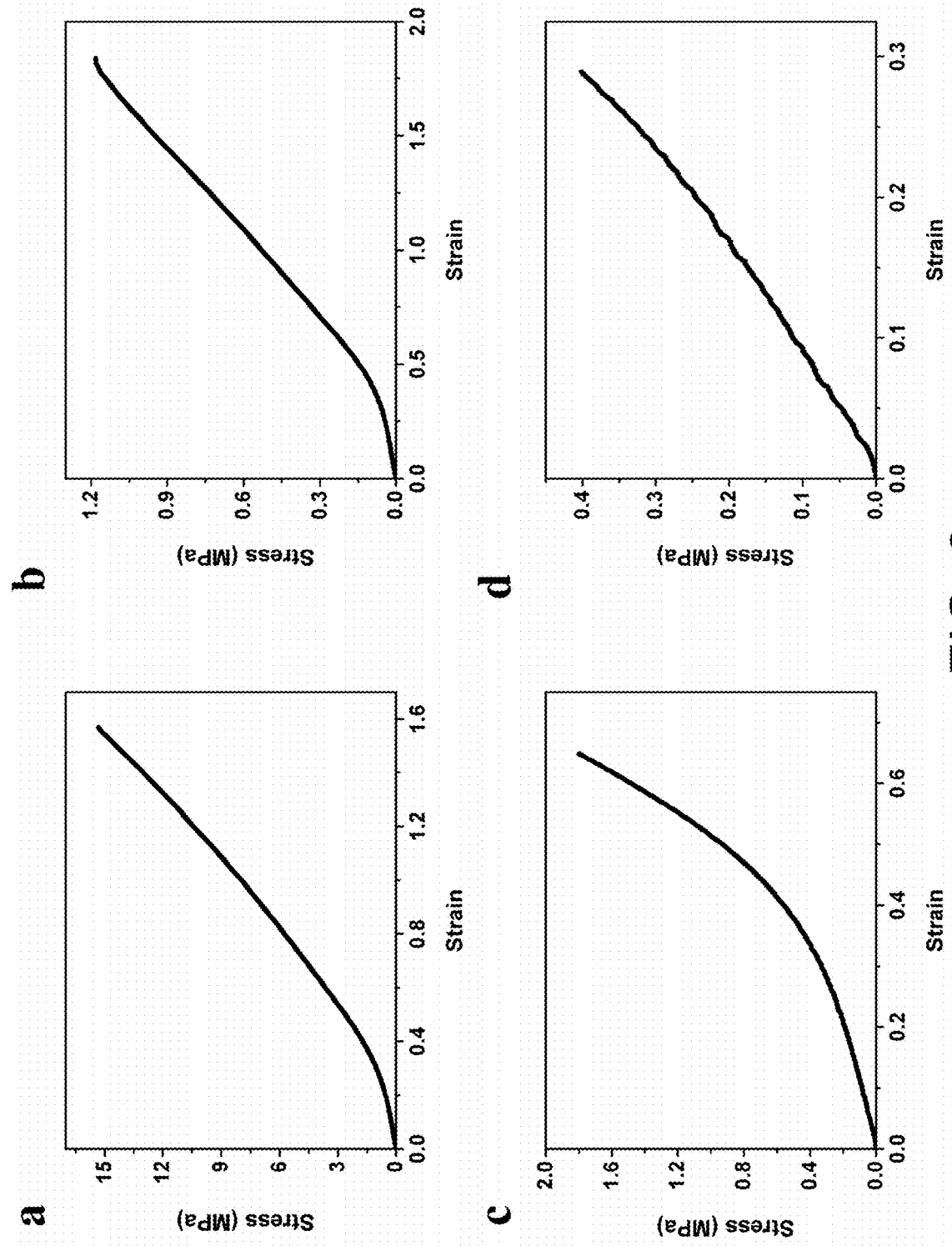
FIG. 3 is a tensile stress-strain curve of the hydrogel (30% Component A-25/5% Component B-1/1% Component C-1, 4% Component A-15/3% Component B-1/0.2% Component C-1, 30% 4APEG50/5% Component B-1/2% Component C-1 and 4% 4APEG50/3% Component B-1/0.2% Component C-1).

The tensile test was performed by GT-TCS-2000 tensile machine. The tensile test specimen is a dumbbell specimen with a length of 20 mm, a width of 3 mm and a thickness of 2 mm. The test speed is 5 mm/min. FIG. 3 shows the tensile performance of the hydrogel in experimental groups (30% Component A-25/5% Component B-1/1% Component C-1 and 4% Component A-15/3% Component B-1/0.2% Component C-1) and control groups (30% 4APEG50/5% Component B-1/2% Component C-1 and 4% 4APEG50/3% Component B-1/0.2% Component C-1). As shown in FIG. 3, the tensile strength of the hydrogels in experimental groups achieve 15.1 MPa (FIG. 3a) and 1.2 MPa (FIG. 3b), respectively. The tensile strength of hydrogels in control groups are 1.8 MPa (FIG. 3c) and 0.4 MPa (FIG. 3d), respectively. The tensile strength of hydrogel in the experimental groups are 8 times and 3 times higher than that in the control groups, indicating that the tensile strength of the hydrogel in the experimental groups are significantly higher than control groups, both at high and low concentration. The tensile strength of other hydrogels with different ratios are also significantly higher than control groups. The specific data are shown in Table 4.

TABLE 4

| The composition of hydrogel material | Tensile strength (MPa) |
|---|---|
| Component A-4/Component B-1/Component C-1 (30% wt:5% wt:1% wt) | 11.3 |
| Component A-5/Component B-1/Component C-2 (30% wt:5% wt:1% wt) | 12.1 |
| Component A-7/Component B-1/Component C-5 (30% wt:5% wt:2% wt) | 13.8 |
| Component A-10/Component B-1/Component C-1 (30% wt:5% wt:2% wt) | 12.5 |
| Component A-11/Component B-1/Component C-1 (30% wt:5% wt:2% wt) | 11.8 |
| Component A-12/Component B-1/Component C-5 (30% wt:5% wt:2% wt) | 10.7 |
| Component A-13/Component B-1/Component C-1 (30% wt:5% wt:2% wt) | 11.4 |
| Component A-15/Component B-1/Component C-2 (30% wt:5% wt:2% wt) | 11.5 |
| Component A-16/Component B-1/Component C-5 (30% wt:5% wt:2% wt) | 12.5 |
| Component A-21/Component B-1/Component C-1 (30% wt:5% wt:2% wt) | 10.1 |
| Component A-22/Component B-1/Component C-2 (30% wt:5% wt:2% wt) | 10.6 |
| Component A-23/Component B-1/Component C-5 (30% wt:5% wt:2% wt) | 11.2 |
| Component A-25/Component B-1/Component C-1 (30% wt:5% wt:1% wt) | 15.1 |
| Component A-26/Component B-1/Component C-1 (30% wt:5% wt:1% wt) | 12.2 |
| Component A-29/Component B-1/Component C-5 (30% wt:5% wt:2% wt) | 10.6 |

TABLE 4-continued

| The composition of hydrogel material | Tensile strength (MPa) |
|---|---|
| Component A-4/Component B-2/Component C-1 (30% wt:5% wt:1% wt) | 10.7 |
| Component A-5/Component B-3/Component C-2 (30% wt:5% wt:1% wt) | 10.6 |
| Component A-7/Component B-4/Component C-5 (30% wt:5% wt:2% wt) | 10.8 |
| Component A-10/Component B-5/Component C-1 (30% wt:5% wt:2% wt) | 12.5 |
| Component A-11/Component B-6/Component C-2 (30% wt:5% wt:2% wt) | 11.1 |
| Component A-12/Component B-2/Component C-5 (30% wt:5% wt:2% wt) | 12.6 |
| Component A-13/Component B-3/Component C-1 (30% wt:5% wt:2% wt) | 13.2 |
| Component A-15/Component B-4/Component C-2 (30% wt:5% wt:2% wt) | 10.7 |
| Component A-16/Component B-5/Component C-5 (30% wt:5% wt:2% wt) | 11.9 |
| Component A-21/Component B-6/Component C-1 (30% wt:5% wt:2% wt) | 10.8 |
| Component A-22/Component B-2/Component C-2 (30% wt:5% wt:2% wt) | 12.6 |
| Component A-23/Component B-3/Component C-5 (30% wt:5% wt:2% wt) | 10.6 |
| Component A-25/Component B-4/Component C-1 (30% wt:5% wt:1% wt) | 11.5 |
| Component A-26/Component B-5/Component C-2 (30% wt:5% wt:1% wt) | 11.1 |
| Component A-29/Component B-6/Component C-5 (30% wt:5% wt:2% wt) | 10.1 |
| PEG50/Component B-1/Component C-1 (30% wt:5% wt:2% wt) | 0.3 |
| PEG100/Component B-1/Component C-1 (30% wt:5% wt:2% wt) | 0.8 |
| 4APEG25/Component B-1/Component C-1 (30% wt:5% wt:2% wt) | 0.6 |
| 4APEG50/Component B-1/Component C-1 (30% wt:5% wt:2% wt) | 1.8 |
| 4APEG50/Component B-1/Component C-5 (30% wt:5% wt:2% wt) | 2.1 |
| 4APEG50/Component B-2/Component C-1 (30% wt:5% wt:2% wt) | 1.9 |
| Component A-12/Component B-1/Component C-1 (3% wt:2% wt:0.2% wt) | 0.8 |
| Component A-12/Component B-1/Component C-5 (3% wt:2% wt:0.2% wt) | 0.8 |
| Component A-12/Component B-1/Component C-1 (4% wt:3% wt:0.2% wt) | 1.3 |
| Component A-12/Component B-1/Component C-5 (4% wt:3% wt:0.2% wt) | 1.4 |
| Component A-15/Component B-1/Component C-1 (3% wt:2% wt:0.2% wt) | 0.7 |
| Component A-15/Component B-1/Component C-5 (3% wt:2% wt:0.2% wt) | 0.7 |
| Component A-15/Component B-1/Component C-1 (4% wt:3% wt:0.2% wt) | 1.2 |
| Component A-15/Component B-1/Component C-5 (4% wt:3% wt:0.2% wt) | 1.1 |
| Component A-22/Component B-1/Component C-1 (3% wt:2% wt:0.2% wt) | 0.6 |
| Component A-22/Component B-1/Component C-5 (3% wt:2% wt:0.2% wt) | 0.7 |
| PEG50/Component B-1/Component C-1 (4% wt:3% wt:0.2% wt) | 0.1 |
| PEG50/Component B-1/Component C-1 (3% wt:2% wt:0.2% wt) | 0.1 |
| PEG100/Component B-1/Component C-1 (4% wt:3% wt:0.2% wt) | 0.3 |
| PEG100/Component B-1/Component C-1 (3% wt:2% wt:0.2% wt) | 0.2 |
| 4APEG25/Component B-1/Component C-1 (4% wt:3% wt:0.2% wt) | 0.3 |
| 4APEG25/Component B-1/Component C-1 (3% wt:2% wt:0.2% wt) | 0.2 |
| 4APEG50/Component B-1/Component C-1 (4% wt:3% wt:0.2% wt) | 0.4 |
| 4APEG50/Component B-1/Component C-1 (3% wt:2% wt:0.2% wt) | 0.3 |

Embodiment 22: Toughness Test of Photo-Crosslinked Hydrogel

Figure 5:
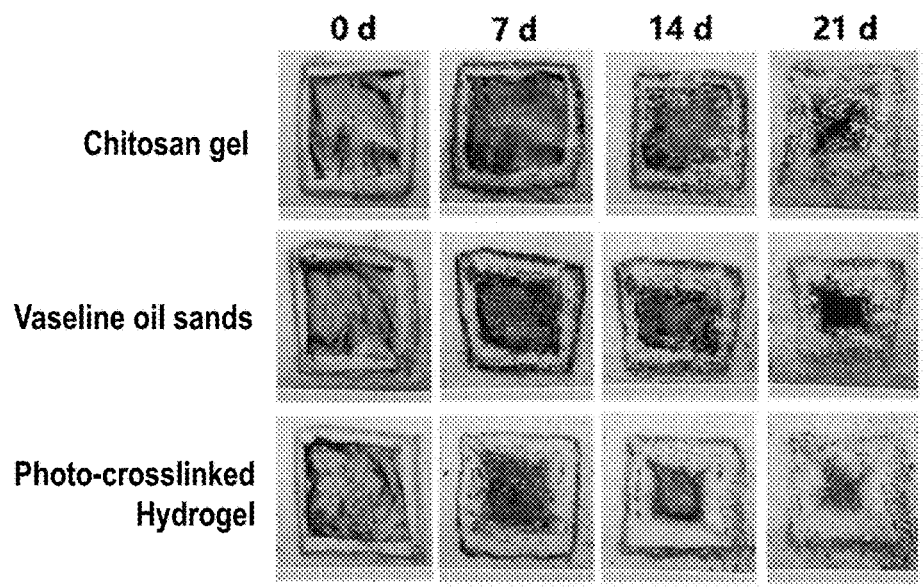
FIG. 5 is a visual view of the wound closure-skin repairing using the hydrogel (4% Component A-15/3% Component B-1/0.2% Component C-1).

The stress-strain curves of hydrogels were obtained through tensile tests and the toughness (MJ m$^{-3}$) was calculated from the integral area below the tensile stress-strain curves. The tensile test was performed by GT-TCS-2000 tensile machine. The tensile test specimen is a dumbbell specimen with a length of 20 mm, a width of 3 mm and a thickness of 2 mm. The test speed is 5 mm/min. FIG. 5 show the toughness of the hydrogel in experimental groups (30% Component A-25/5% Component B-1/1% Component C-1 and 4% Component A-15/3% Component B-1/0.2% Component C-1) and control groups (30% 4APEG50/5% Component B-1/2% Component C-1 and 4% 4APEG50/3% Component B-1/0.2% Component C-1). As shown in Table 5, the toughness of hydrogels in experimental groups achieve 11.8 MJ m$^{-3}$ and 1.2 MJ m$^{-3}$, respectively. The toughness of hydrogels in control groups are 0.8 MJ m$^{-3}$ and 0.21 MJ m$^{-3}$, respectively. The toughness of hydrogel in the experimental groups are 15 times and 6 times higher than that in the control groups, indicating that the toughness of the hydrogel in the experimental groups are significantly higher than control groups, either at high or low concentration. The toughness of other hydrogels with different ratios are also significantly higher than control groups. The specific data are shown in Table 5.

TABLE 5

| The composition of hydrogel material | Toughness (MJ m$^{-3}$) |
|---|---|
| Component A-4/Component B-1/Component C-1 (30% wt:5% wt:1% wt) | 8.2 |
| Component A-5/Component B-1/Component C-2 (30% wt:5% wt:1% wt) | 8.6 |
| Component A-7/Component B-1/Component C-5 (30% wt:5% wt:2% wt) | 7.8 |
| Component A-10/Component B-1/Component C-1 (30% wt:5% wt:2% wt) | 10.2 |
| Component A-11/Component B-1/Component C-1 (30% wt:5% wt:2% wt) | 9.8 |
| Component A-12/Component B-1/Component C-5 (30% wt:5% wt:2% wt) | 12.0 |
| Component A-13/Component B-1/Component C-1 (30% wt:5% wt:2% wt) | 11.6 |
| Component A-15/Component B-1/Component C-2 (30% wt:5% wt:2% wt) | 12.0 |
| Component A-16/Component B-1/Component C-5 (30% wt:5% wt:2% wt) | 10.5 |
| Component A-21/Component B-1/Component C-1 (30% wt:5% wt:2% wt) | 9.8 |
| Component A-22/Component B-1/Component C-2 (30% wt:5% wt:2% wt) | 11.1 |
| Component A-23/Component B-1/Component C-5 (30% wt:5% wt:2% wt) | 11.7 |
| Component A-25/Component B-1/Component C-1 (30% wt:5% wt:1% wt) | 11.8 |
| Component A-26/Component B-1/Component C-1 (30% wt:5% wt:1% wt) | 10.1 |

TABLE 5-continued

| The composition of hydrogel material | Toughness (MJ m$^{-3}$) |
|---|---|
| Component A-29/Component B-1/Component C-5 (30% wt:5% wt:2% wt) | 9.5 |
| Component A-4/Component B-2/Component C-1 (30% wt:5% wt:1% wt) | 9.3 |
| Component A-5/Component B-3/Component C-2 (30% wt:5% wt:1% wt) | 8.9 |
| Component A-7/Component B-4/Component C-5 (30% wt:5% wt:2% wt) | 10.3 |
| Component A-10/Component B-5/Component C-1 (30% wt:5% wt:2% wt) | 12.0 |
| Component A-11/Component B-6/Component C-2 (30% wt:5% wt:2% wt) | 8.8 |
| Component A-12/Component B-2/Component C-5 (30% wt:5% wt:2% wt) | 8.9 |
| Component A-13/Component B-3/Component C-1 (30% wt:5% wt:2% wt) | 9.3 |
| Component A-15/Component B-4/Component C-2 (30% wt:5% wt:2% wt) | 10.2 |
| Component A-16/Component B-5/Component C-5 (30% wt:5% wt:2% wt) | 10.8 |
| Component A-21/Component B-6/Component C-1 (30% wt:5% wt:2% wt) | 9.8 |
| Component A-22/Component B-2/Component C-2 (30% wt:5% wt:2% wt) | 9.6 |
| Component A-23/Component B-3/Component C-5 (30% wt:5% wt:2% wt) | 10.5 |
| Component A-25/Component B-4/Component C-1 (30% wt:5% wt:1% wt) | 11.2 |
| Component A-26/Component B-5/Component C-2 (30% wt:5% wt:1% wt) | 11.4 |
| Component A-29/Component B-6/Component C-5 (30% wt:5% wt:2% wt) | 11.8 |
| PEG50/Component B-1/Component C-1 (30% wt:5% wt:2% wt) | 0.5 |
| PEG100/Component B-1/Component C-1 (30% wt:5% wt:2% wt) | 0.7 |
| 4APEG25/Component B-1/Component C-1 (30% wt:5% wt:2% wt) | 0.8 |
| 4APEG50/Component B-1/Component C-1 (30% wt:5% wt:2% wt) | 1.2 |
| 4APEG50/Component B-1/Component C-5 (30% wt:5% wt:2% wt) | 1.8 |
| 4APEG50/Component B-2/Component C-1 (30% wt:5% wt:2% wt) | 1.6 |
| Component A-12/Component B-1/Component C-1 (3% wt:2% wt:0.2% wt) | 0.7 |
| Component A-12/Component B-1/Component C-5 (3% wt:2% wt:0.2% wt) | 0.7 |
| Component A-12/Component B-1/Component C-1 (4% wt:3% wt:0.2% wt) | 1.1 |
| Component A-12/Component B-1/Component C-5 (4% wt:3% wt:0.2% wt) | 1.2 |
| Component A-15/Component B-1/Component C-1 (3% wt:2% wt:0.2% wt) | 0.6 |
| Component A-15/Component B-1/Component C-5 (3% wt:2% wt:0.2% wt) | 0.7 |
| Component A-15/Component B-1/Component C-1 (4% wt:3% wt:0.2% wt) | 1.2 |
| Component A-15/Component B-1/Component C-5 (4% wt:3% wt:0.2% wt) | 1.1 |
| Component A-22/Component B-1/Component C-1 (3% wt:2% wt:0.2% wt) | 0.6 |
| Component A-22/Component B-1/Component C-5 (3% wt:2% wt:0.2% wt) | 0.6 |
| PEG50/Component B-1/Component C-1 (4% wt:3% wt:0.2% wt) | 0.02 |
| PEG50/Component B-1/Component C-1 (3% wt:2% wt:0.2% wt) | 0.03 |
| PEG100/Component B-1/Component C-1 (4% wt:3% wt:0.2% wt) | 0.05 |
| PEG100/Component B-1/Component C-1 (3% wt:2% wt:0.2% wt) | 0.10 |
| 4APEG25/Component B-1/Component C-1 (4% wt:3% wt:0.2% wt) | 0.15 |
| 4APEG25/Component B-1/Component C-1 (3% wt:2% wt:0.2% wt) | 0.18 |
| 4APEG50/Component B-1/Component C-1 (4% wt:3% wt:0.2% wt) | 0.21 |
| 4APEG50/Component B-1/Component C-1 (3% wt:2% wt:0.2% wt) | 0.19 |

Figure 4:
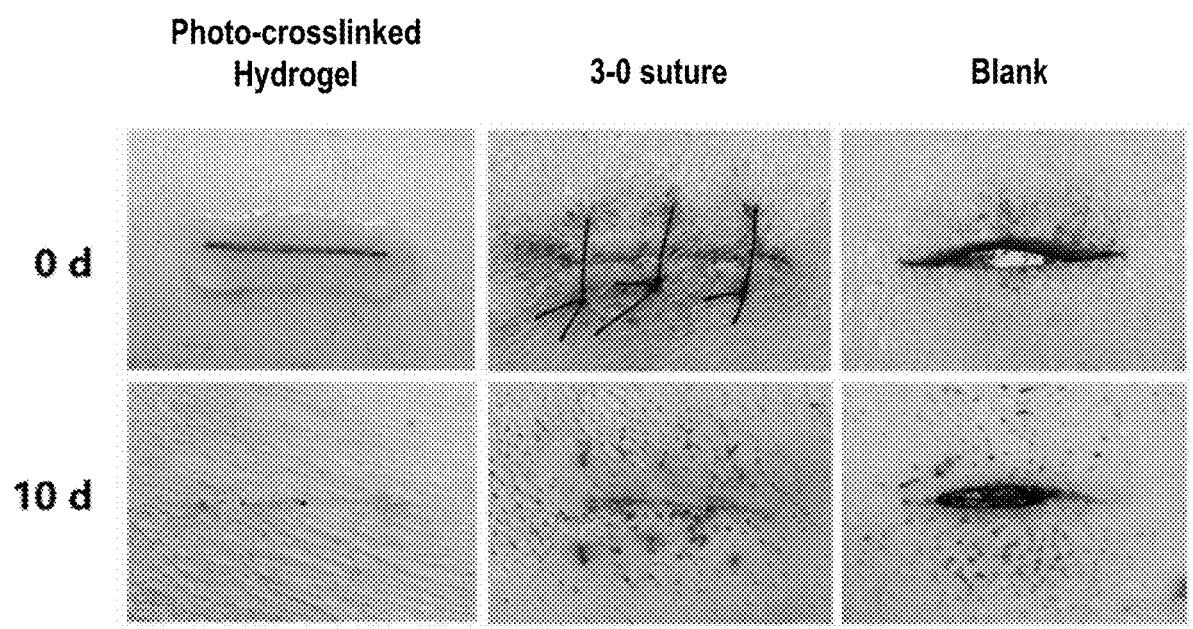
FIG. 4 is a visual view of the wound closure-tissue sutureless using the hydrogel (4% Component A-15/3% Component B-1/0.2% Component C-1).

Embodiment 23: Photo-Crosslinked Hydrogel for Wound Closure-Tissue Sutureless Connecting In the experiment, wounds with a length of 3 cm were created on the skin of Bama miniature pigs, which were cleaned and divided into groups. 600 μL of the hydrogel precursor solution (4% Components A-15/3% Component B-1/0.2% Component C-1) was applied on the wound surface. Then, under the irradiation of a 395 nm LED light source, a hydrogel was prepared in situ at the skin wound to achieve tissue sutureless closure. The results of the blank group, 3-0 surgical suture group and the hydrogel group were collected (FIG. 4). Compared with the suture and blank group, the wound healing in hydrogel group was distinctly faster (completely healed after 10 days), and the scar formation was obviously reduced, demonstrating that the hydrogel has well promoted the wound repair.

Other hydrogel compositions can also be applied for wound closure-tissue sutureless connecting.

Embodiment 24: Photo-Crosslinked Hydrogel for Wound Closure-Skin Repairing

In the experiment, 3*3 cm square full-thickness excisional wounds were created on the back skin of Bama miniature pigs. Then 1 mL of the hydrogel precursor solution (4% Components A-15/3% Component B-1/0.2% Component C-1) was filled in the wound. Due to the good fluidity of the solution, the wound was sufficiently filled and infiltrated by the hydrogel precursor solution. Then, under the irradiation of a 395 nm LED light source, a hydrogel was prepared in situ at the excisional skin wound to achieve closure of wound (FIG. 5). Next, the results in 21 days of photo-crosslinked hydrogel, chitosan gel and vaseline oil sands covered wound on the back skin of Bama miniature pigs were collected. The wound repair with photo-crosslinked hydrogel is faster than other two groups, with obvious difference on day 7.

Other hydrogel compositions can also be applied for wound closure-skin repairing.

Figure 6:
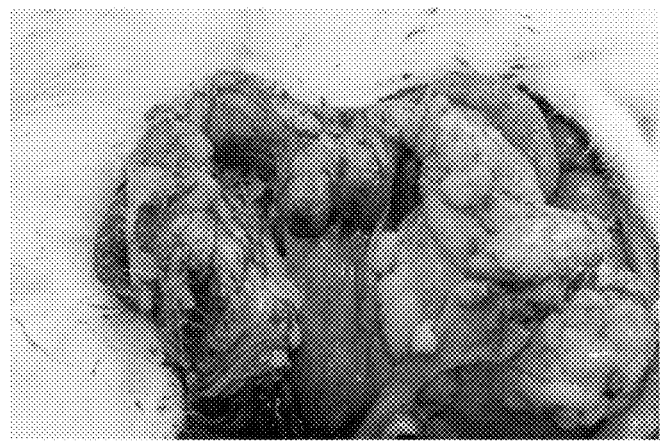
FIG. 6 is a visual view of the wound closure-postoperative cervical reconstruction after hysterectomy using the hydrogel (3% Component A-22/2% Component B-1/0.2% Component C-1).

Embodiment 25: Photo-Crosslinked Hydrogel for Wound Closure-Postoperative Cervical Reconstruction after Hysterectomy In the experiment, excisional wounds were created on cervix of New Zealand female white rabbits by electric knife and the rabbits were divided into two groups. The hydrogel precursor solution (3% Components A-22/2% Component B-1/0.2% Component C-1) was applied on the wound site in one group. Then, under the irradiation of a 395 nm LED light source, the solution was completely solidified to achieve wound closure, and the other side was not treated. The results were collected in 7 days. As shown in FIG. 6, the left cervix is the hydrogel group, and the right is the blank. The wound healing is photo-crosslinked hydrogel is obviously faster than that of the blank group. The wound with hydrogel group healed completely, while there is still congestion in blank group (FIG. 6).

Other hydrogel compositions can also be applied for wound closure-postoperative cervical reconstruction after hysterectomy.

Figure 7:
FIG. 7 is a visual view of the wound closure-postoperative reconstruction of hemorrhoids after hemorrhoidectomy using the hydrogel (3% Component A-12/2% Component B-1/0.2% Component C-1).

Embodiment 26: Photo-Crosslinked Hydrogel for Wound Closure-Postoperative Reconstruction of Hemorrhoids after Hemorrhoidectomy In the experiment, excisional wounds were created in the anus of Bama miniature pigs, and the wounds were symmetrically located on both sides of the anus. The hydrogel precursor solution (3% Components A-12/2% Component B-1/0.2% Component C-1) was applied on the wound site in one group. Then, under the irradiation of a 395 nm LED light source, the solution was completely solidified to achieve wound closure, and the other side were not treated. The results were collected after 7 days. As shown in FIG. 7, the left is the blank group, and the right is the hydrogel group. The wound healing with photo-crosslinked hydrogel is obviously faster than that of blank group. The wound with hydrogel group healed completely after 7 days, while there is still unhealed wound in blank group (FIG. 7).

Other hydrogel compositions can also be applied for wound closure-postoperative reconstruction of hemorrhoids after hemorrhoidectomy.

Figure 8:
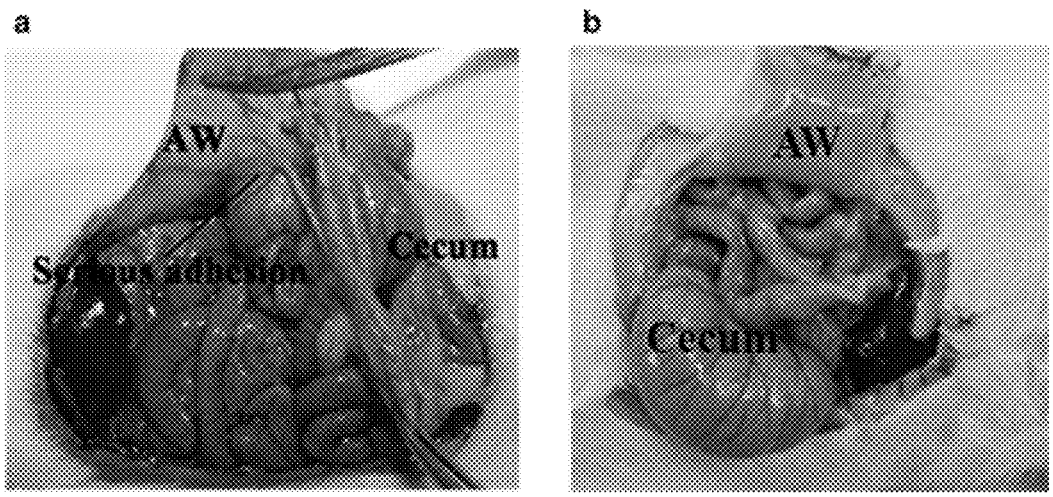
FIG. 8 is a visual view of the wound closure-postoperative anti-adhesion of abdominal cavity using the hydrogel (4% Component A-15/3% Component B-1/0.2% Component C-1).

Embodiment 27: Photo-Crosslinked Hydrogel for Wound Closure-Postoperative Anti-Adhesion of Abdominal Cavity In the experiment, SD rats were used to construct an adhesion model of abdominal wall-cecum scraping. Because the cecum is the thickest, most accessible, and most abundant intestine in the abdominal cavity, the incidence rate of abdominal adhesion is high if no measures are taken when the corresponding abdominal wall is damaged. Therefore, the adhesion model is stable. During the surgery, the hydrogel precursor solution (4% Component A-15/3% Component B-1/0.2% Component C-1) adequately cover the cecal and abdominal wall wounds, and has sufficient residence time on the vertical tissue surface before gelled. After 30 s of irradiation, the obtained hydrogel was fixed at the wound site, and hard to strip from the wound site with a force applied by a surgical blade. The above process of gelation can be completed within 1 min. After the surgery, the SD rats were reared in a sterile environment for 14 days. After 14 days, the abdominal cavity of SD rats was opened again. The abdominal adhesion was recorded (FIG. 8a: control group; FIG. 8b: experimental group). Among the hydrogel-treated 10 rats, 8 of them did not show any intestinal-abdominal wall and intestinal-intestinal adhesion after 14 days; 1 of them underwent a moderate adhesion between the abdominal wall and the cecum; 1 of them underwent a thin layer of adhesion between intestine. In addition, no hydrogel residue was observed in the SD rats that did not underwent intestinal-abdominal adhesion, and the wound on the abdominal wall was completely healed. In control group, severe abdominal and cecal adhesions have occurred in all of the 10 rats. Histological analysis of the tissue sections of the wound site in the experimental and control group was performed by Hematoxylin-Eosin (H&E) staining. The injuries of the cecum and abdominal wall were completely restored after 14 days, and the surface layer was re-epithelialized in the experimental group. In control group, smooth muscle of the cecum was fused with the muscle tissue of the abdominal wall, and fibroblasts and inflammatory cells were deposited at the adhesion site after 14 days.

Other hydrogel compositions can also be applied for wound closure-postoperative anti-adhesion of abdominal cavity.

Figure 9:
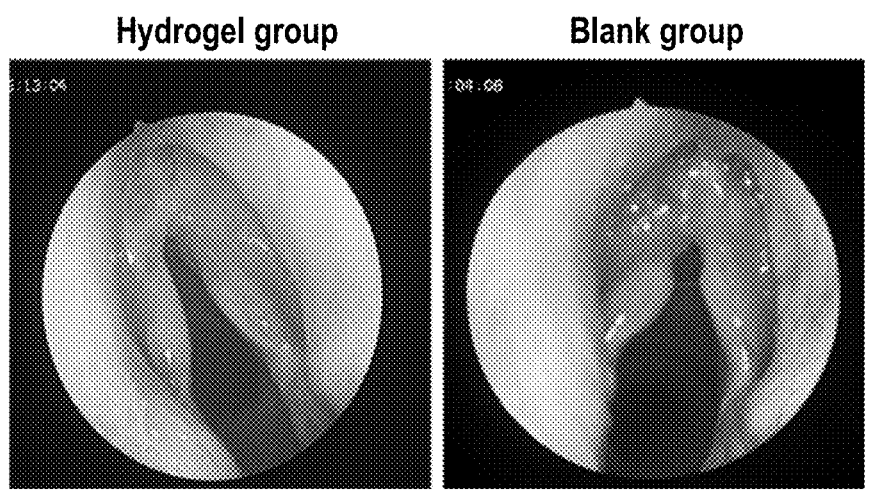
FIG. 9 is a visual view of the wound closure-postoperative anti-adhesion of vocal cords using the hydrogel (4% Component A-15/3% Component B-1/0.2% Component C-1).

Embodiment 28: Photo-Crosslinked Hydrogel for Wound Closure-Postoperative Anti-Adhesion of Vocal Cords In the experiment, Beagle dogs were employed to construct an adhesion model of vocal cord damage. The bilateral vocal cords were destroyed by electric knife through laryngoscope surgery. The hydrogel precursor solution (4% Components A-15/3% Component B-1/0.2% Component C-1) was applied on the damaged vocal cords. Then, under the irradiation of a 395 nm LED light source, the solution was completely solidified to achieve wound closure, and the blank group was not treated. The adhesion of vocal cords was observed and recorded after 14 days. As shown in FIG. 9, only about a quarter of cord adhesions occurred in the hydrogel-treated experimental group after 14 days. In the control group, half of the vocal cords exhibited adhesions. Next, histological analysis of the tissue sections of the wound site in the experimental and control group was performed by H&E staining. The injuries of vocal cords were completely restored in experimental group, and the surface layer was re-epithelialized. In the control group, the fibroblasts and inflammatory cells were deposited at the adhesion site.

Other hydrogel compositions can also be applied for wound closure-postoperative anti-adhesion of vocal cords.

Embodiment 29: Photo-Crosslinked Hydrogel for Wound Closure-Oral Ulcer

In the experiment, an oral ulcer defect wound with a diameter of 1.0 cm was created in the oral cavity of SD rats. Then wound site was filled with 200 μL of the hydrogel precursor solution (4% Component A-15/3% Component B-1/0.2% Component C-1). Due to the good fluidity of the solution, the wound was sufficiently filled and infiltrated with the hydrogel precursor solution. Then, under irradiation of a 395 nm LED light source, the hydrogel was prepared in situ at the oral cavity to achieve closure of the oral wound. Next, the results of the hydrogel-treated and physiological saline-treated wound was collected after 5 days. Histological analysis of the tissue sections of experimental and control groups were performed by H&E staining. The wound repairing with the hydrogel was significantly faster than that of the control group. The mucosa returned to normal level on day 5. The wound repairing without hydrogel was obviously slower, indicating that the photo-crosslinked hydrogel promotes oral ulcer repair.

Other hydrogel compositions can also be applied for wound closure—oral ulcer.

Embodiment 30: Photo-Crosslinked Hydrogel for Tissue Exudate Plugging—Intestinal Leakage Sealing New Zealand male white rabbits were adopted and divided into two groups for cecal leakage closure experiments: a: hydrogel treatment (4% Component A-15/3% Component B-1/0.2% Component C-1) group; b: untreated control group. In the experiment group, a model of leakage was made in the cecum of the rabbit, and the hydrogel precursor solution was applied on the wound. After being fully infiltrated, the hydrogels were gelled in situ under irradiation, and adhered firmly to the defect. No additional fixing is required. Four weeks after the surgery, the rabbits were sacrificed by intravenous injection of air, and the cecum was extracted to evaluate the repairing. There was no leakage of cecum with the hydrogel treatment, and the original cecal defect has been repaired with hydrogel treatment. However, severe leakage occurred in the cecum without hydrogel treatment. Therefore, the hydrogel not only effectively blocks the leakage, but also promotes the repair of damaged tissue after surgery.

Other hydrogel compositions can also be applied for tissue exudate plugging-intestinal leakage sealing.

Embodiment 31: Photo-Crosslinked Hydrogel for Tissue Exudate Plugging-Gastric Leakage Sealing SD rats were adopted and divided into three groups for sutureless gastric tissue experiment: a: hydrogel treatment (4% Component A-15/3% Component B-1/0.2% Component C-1) group; b: untreated control group; c: 3-0 surgical suture treatment group. A wound model was made in the stomach of rats, and the hydrogel precursor solution was applied on the wound. After being fully infiltrated, the hydrogel was gelled in situ under irradiation, and adhered firmly to the defect. No additional fixing is required. 3-0 suture was adopted in the suture treatment group. Ten days after the surgery, SD rats were euthanized and the stomach was extracted to evaluate the repairing. There was no leakage in stomach blocked with hydrogel or suture, but the rats died one day after surgery in the group without any treatment. After ten days, the original gastric defect has been completely repaired with hydrogel treatment. These results indicate that the hydrogel not only effectively blocks the leakage, but also promotes the repair of damaged tissue after surgery.

Other hydrogel compositions can also be applied for tissue exudate plugging-gastric leakage sealing.

Figure 10:
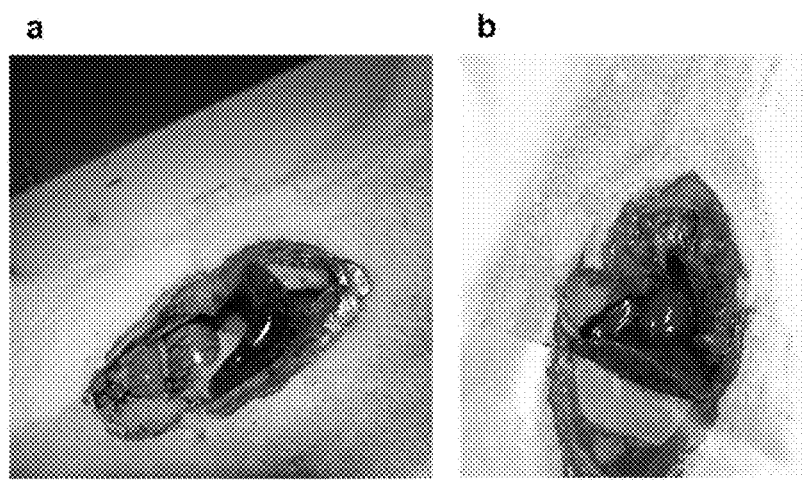
FIG. 10 is a visual view of the hydrogel (4% Component A-15/3% Component B-1/0.2% Component C-1) as hemostatic material-hepatic hemostasis.

Embodiment 32: Photo-Crosslinked Hydrogel as Hemostatic Material in Hepatic Hemostasis SD rats were adopted to evaluate the hemostasis of the hydrogel. They were divided into two groups for the liver hemostasis experiments: a: hydrogel treatment (4% Component A-15/3% Component B-1/0.2% Component C-1) group; b: blank control group. The rats were anesthetized by intraperitoneal injection of chloral hydrate (4% aqueous solution). The injection dose was 0.9 mL/100 g. After deep anesthesia, the rat's anterior chest was shaved with a shaver and the iodine was used to disinfect them. Cut an incision with a length of about 4 cm along the midline of the chest, open the chest and expose the liver. Make an incision with a diameter of about 2 cm in the left lobe of the liver. The group a was treated with hydrogel precursor solution at the incision to cover the section, and form a gel under irradiation of 395 nm LED light for 1 min to stop bleeding. There was no any treatment for group b. The liver incision oozing naturally coagulated, and the oozing was sucked by gauze. The amount and time of bleeding were recorded by the weight loss (FIG. 10). At the end, the hydrogel was gelled in situ at the incision and the wounds were isolated. The liver was placed back into the chest, and sutured. Group b was directly sutured without any treatment. After 14 days, the liver recovery of SD rats was observed. The rats were sacrificed by intraperitoneal injection of excess anesthetic chloral hydrate (4% aqueous solution, 2.7 mL/100 g). The thoracic cavity was opened along the midline of the thoracic cavity, and the liver recovery of the rats was observed and photographed. At the same time, the liver injury site was sampled, and the specimen was fixed with 4% formalin solution for 2 days. After dehydration treatment, paraffin was embedded and sliced with a microtome. The thickness of the sample was 5 μm. Finally, the specimens were subjected to H&E staining, and photographs were taken with an optical microscope. The experimental results show that the liver in group a recovered well, with the hydrogel completely degraded and no adhesion occurred, and the liver incision grew new liver tissue. Hepatic and omental adhesions were observed in group b. H&E staining show that the liver surface of the experimental group was smooth and round, with abundant blood vessel distribution and clear liver interface in group a. In group b, the liver of the adhesion was found by H&E staining, and the liver interface was uneven. Moreover, the liver and the omentum were stuck together, and there were deposited inflammatory cells at the interface.

Other hydrogel compositions can also be applied as hemostatic material in hepatic hemostasis.

Figure 11:
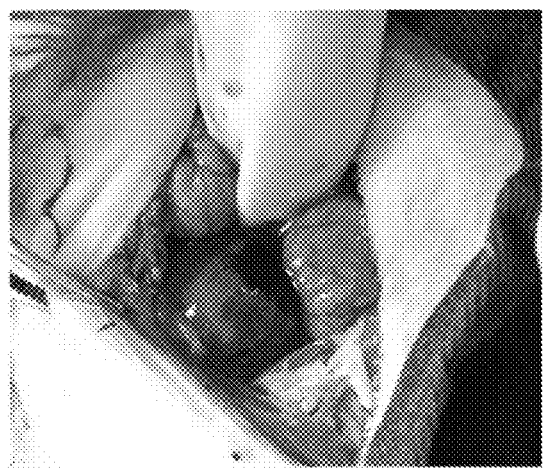
FIG. 11 is a visual view of the hydrogel (3% Component A-22/2% Component B-1/0.2% Component C-1) as hemostatic material-renal hemostasis.

Embodiment 33: Photo-Crosslinked Hydrogel as Hemostatic Material in Renal Hemostasis New Zealand white rabbits were adopted to evaluate the hemostatic effect of the hydrogel, and divided into two groups for renal hemostasis experiments: a: hydrogel treatment (3% Component A-22/2% Component B-1/0.2% Component C-5) group; b: blank control group. After deep anesthesia, New Zealand white rabbits were shaved and disinfected with iodine. Cut an incision with a length of about 5 cm along the side of the abdomen, and open the abdominal cavity and expose the kidney. Then make a circular incision with a diameter of about 1 cm and a depth of about 3 mm in the kidney. The group a was treated with hydrogel precursor solution at the incision to cover the section, which forms a gel under irradiation of 395 nm LED light for 1 min and stops bleeding. There was no any treatment for group b and the oozing was sucked by gauze. At last, the hydrogel was gelled in situ at the incision and the wounds were isolated. Then the kidney was placed back into the abdominal cavity, and sutured. Group b was directly sutured without any treatment. After several hours, the rabbits in blank group died of blood loss, while the rabbits in hydrogel-treated group stopped bleeding completely without any abnormal reaction (FIG. 11).

Other hydrogel compositions can also be applied as hemostatic material in renal hemostasis.

Embodiment 34: Photo-Crosslinked Hydrogel as Hemostatic Material in Splenic Hemostasis Beagle dogs were adopted to evaluate the hemostatic effect of the hydrogel, and divided into three groups for renal hemostasis experiments: a: gelatin sponge group; b: hydrogel treatment (4% Component A-15/3% Component B-1/ 0.2% Component C-1) group; c: positive control group. The experimental Beagle dogs were anesthetized by intramuscular injection of barbiturates (0.5 mL/kg). After deep anesthesia, the lateral abdomen of Beagle dogs was shaved and disinfected with iodine. Cut an incision with a length of about 10 cm along the side of the abdomen, open the abdominal cavity and expose the spleen. Then make an incision with a diameter of about 8 mm in the spleen. The group a was treated with gelatin sponge to stop bleeding; the group b was treated with hydrogel precursor solution at the incision to cover the section, which forms a gel under irradiation of 395 nm LED light for 2 min to stop bleeding; there were no any treatment for group c. The liver incision oozing naturally coagulated, and the oozing was sucked by gauze. The amount and time of bleeding were recorded by the weight loss. At last, in group a, gelatin sponge that adhered to the cut site was left in the dog for suturing. The hydrogel in group b was gelled in situ at the incision and the wounds were isolated, and the spleen was placed back into the abdominal cavity, and sutured. Group c was directly sutured without any treatment. After 14 days, the spleen recovery of Beagle dogs was observed. The dogs were sacrificed by intramuscular injection of barbiturates. The abdominal cavity was opened along the side of the abdomen, and the spleen recovery of the three groups of dogs was observed and photographed. The spleen injury site was sampled, and the specimen was fixed with 4% formalin solution for 2 days. After dehydration treatment, paraffin was embedded and sliced with a microtome. The thickness of the sample was 5 μm. Finally, the specimens were subjected to H&E staining, and photographs were taken with an optical microscope. The experimental results show that the spleen in group b recovered well, with the hydrogel completely degraded and no adhesion occurred, and there was new spleen tissue on spleen incision site. The gelatin sponge in the dogs in group a was not degraded, and the adhesion between the organs and the omentum was severe. Splenic and omental adhesions occurred in group c. H&E staining shows that the spleen surface in group b was smooth and round, with abundant blood vessel distribution and clear spleen interface. The adhesion of the spleen can be confirmed by H&E staining: the uneven shows a spleen interface; the spleen and the omentum were stuck together, and there were deposited inflammatory cells at the interface.

Other hydrogel compositions can also be applied as hemostatic material in splenic hemostasis.

Embodiment 35: Photo-Crosslinked Hydrogel as Hemostatic Material in Bone Section Hemostasis New Zealand male white rabbits were adopted and divided into three groups for bone section hemostasis experiments: a: hydrogel treatment (4% Component A-15/ 3% Component B-1/0.2% Component C-1) group; b: bone wax treatment group; c: Control group not treated. In the experiment, a bone section bleeding model was constructed in the rabbit femur. In group a, the hydrogel precursor solution was applied to the wound. After being fully infiltrated, the hydrogels were gelled in situ under irradiation, and achieved effective sealing of the bone section bleeding. Due to the excellent tissue adhesion and fast photocuring of the hydrogel, a timely and effective hemostasis can be achieved. In group b, conventional bone wax was applied to bleeding wounds. Group c is not treated for bleeding wounds. After 8 weeks of surgery, the rabbits were sacrificed by intravenous injection of air, and samples were collected to evaluate the repairing. The hydrogel-treated wounds displayed faster hemostasis, which was almost the same as the bone wax group. The wounds keep bleeding without any treatment. After 2 weeks, the original wound hemorrhage site treated with hydrogel have been well repaired. The bone wax treated wound was not repaired because the bone wax did not degrade in the body. In conclusion, the hydrogel not only effectively achieves hemostasis of the bone section, but also promotes the repair of damaged tissue after surgery.

Other hydrogel compositions can also be applied as hemostatic material in bone section hemostasis.

Figure 12:
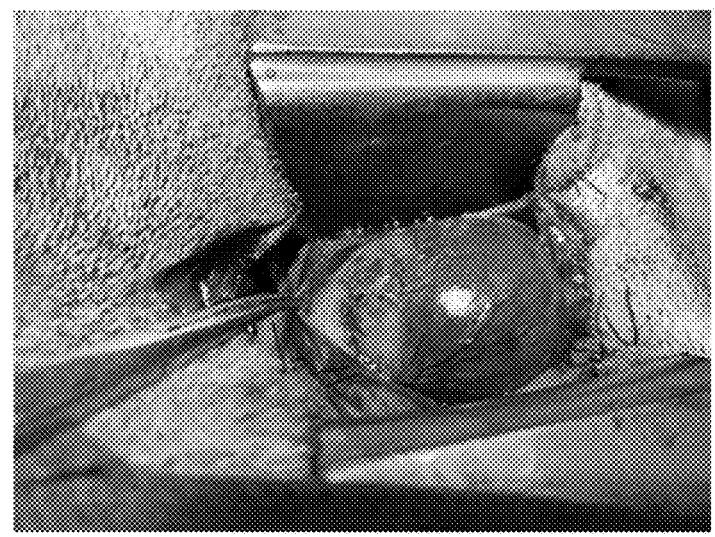
FIG. 12 is a visual view of the hydrogel (3% Component A-12/2% Component B-1/0.2% Component C-1) as hemostatic material-cardiac hemostasis.

Embodiment 36: Photo-Crosslinked Hydrogel as Hemostatic Material in Cardiac Hemostasis Beagle dogs were used to construct a model of cardiac hemorrhage with 10 mL syringe needles and divided into three groups: a: hydrogel treatment (3% Component A-12/ 2% Component B-1/0.2% Component C-1); b: fibrin glue treatment group; c: blank control group. In group a, the hydrogel precursor solution was applied to the wound. After being fully infiltrated, the hydrogels were gelled in situ under irradiation, and achieved effective sealing of the heart bleeding. Due to the excellent tissue adhesion and fast photocuring of the hydrogel, a timely and effective hemostasis can be achieved. In group b, fibrin glue was applied to stop bleeding. Group c is not treated. Due to the weak adhesion and insufficient strength, the latter two groups can not stop the hemostasis of pulmonary artery hemorrhage. By contrast, the photo-crosslinked hydrogel quickly stops heart bleeding, presumably because of its excellent tissue adhesion and strength (FIG. 12).

Other hydrogel compositions can also be applied as hemostatic material in cardiac hemostasis.

Embodiment 37: Photo-Crosslinked Hydrogel for Hernia Patch Fixation

Figure 13:
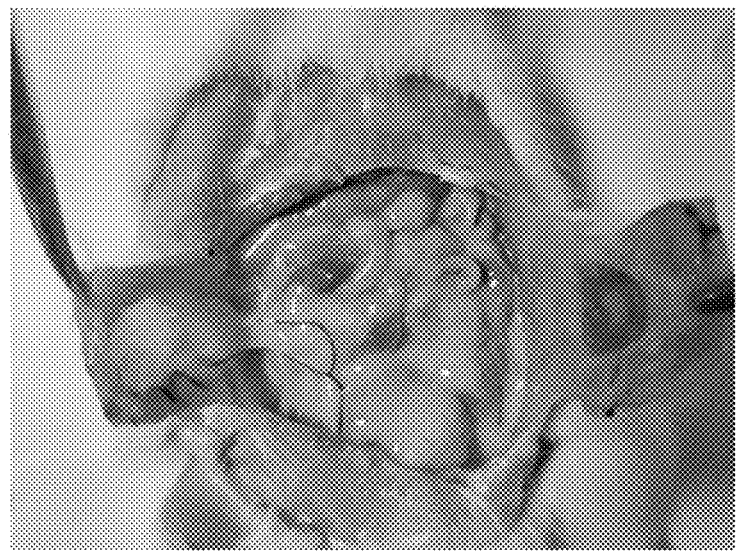
FIG. 13 is a visual effect view of the hydrogel (4% Component A-15/3% Component B-1/0.2% Component C-1) as hernia patch fixation material.

SD rats were adopted and divided into two groups for hernia patch fixation experiment: a: hydrogel fixation (4% Component A-15/3% Component B-1/0.2% Component C-1); b: suture group. In the experiment, a square notch with a side length of 3 cm was constructed in the abdomen of SD rats. In group a, the hydrogel precursor solution is applied to the patch. After being fully infiltrated, the hydrogels were gelled in situ under irradiation, and achieved patch fixation. In group b, the patch was fixed by suture. After 2 weeks of surgery, the rats were sacrificed by intraperitoneal injection of anesthetic, and the samples were collected to evaluate the repairing (the left of FIG. 13 is group b and the right of FIG. 13 is group a). The results show that the patch in group a was completely fixed, and the capsule was generated at the contact position between patch and tissue.

Other hydrogel compositions can also be applied for hernia patch fixation

Embodiment 38: Photo-Crosslinked Hydrogel for Conjunctival Flap Fixation of Postoperative Pterygium New Zealand male white rabbits were adopted and divided into two groups for conjunctival flap fixation experiment of postoperative pterygium: a: hydrogel fixation (3% Component A-12/2% Component B-1/0.2% Component C-1); b: suture group. In the experiment, a conjunctival flap was removed from the rabbit eyes. In group a, the hydrogel precursor solution was applied to the wound. After being fully infiltrated, the hydrogels were gelled in situ under irradiation, and achieved the fixed adhesion of conjunctival flap. In group b, the conjunctival flap was fixed by suture. After 2 weeks of surgery, the rabbits were sacrificed by intravenous injection of air, and samples were collected to evaluate the repairing. The results show that the wound repairing time was similar between the hydrogel and the suture group. After 2 weeks, the conjunctival flap was completely attached to the iris, displaying little difference with the surrounding conjunctival tissue.

Other hydrogel compositions can also be applied for conjunctival flap fixation of postoperative pterygium.

Embodiment 39: Photo-Crosslinked Hydrogel as Cardiac Patch

Figure 14:
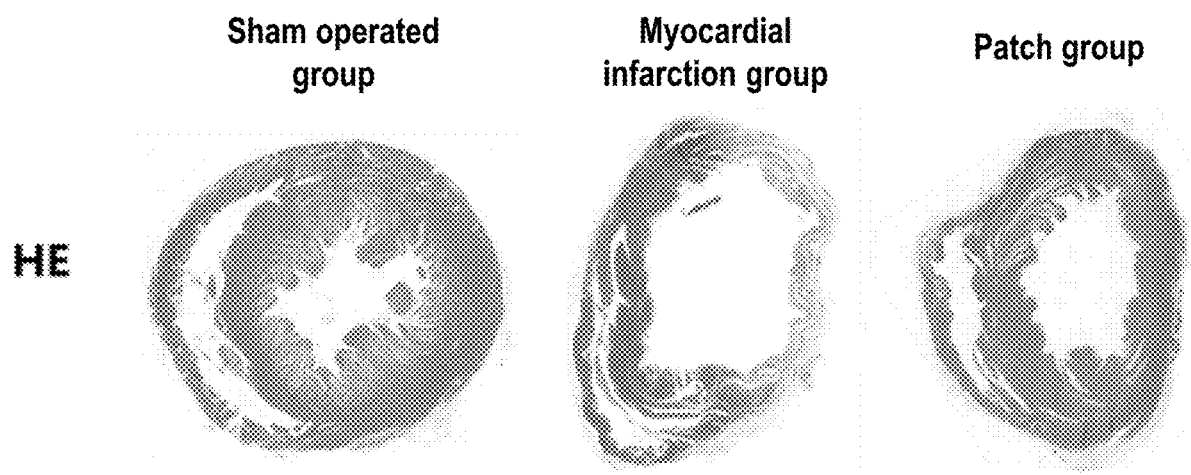
FIG. 14 is a visual effect view of the hydrogel (30% Component A-26/5% Component B-1/1% Component C-1) as cardiac patch.

SD rats were adopted and divided into two groups for cardiac patch experiment: a: myocardial infarction (MI) group; b: hydrogel patch (30% Component A-26/5% Component B-1/1% Component C-1) group. Before the surgery, the rats were anesthetized with pentobarbital sodium (60 mg/kg) intraperitoneally and intubated with laryngoscope. Then the rats were ventilated with positive pressure of small animal ventilator (RWD407, Shenzhen), with the respiratory rate of 70 times/min and tidal volume of 2.5 mL per time. Electrocardiogram (ECG) was monitored by limb lead. A vertical incision was constructed at the plane of the fifth rib of left chest. The muscles were separated and the pleura was punctured with hemostatic forceps to expose the heart. Then, ligate the left anterior descending coronary artery at 2 mm from the lower edge of the left atrial appendage with 5-0 suture and a needle. The sign of successful ligation was the elevation of S-T segment in lead II ECG and the whitening of myocardium below ligation site. The hydrogel was applied to the anterior wall of the left ventricle and then irradiated with ultraviolet light to complete gelation. The rats in sham MI group were treated with the same procedure except for threading without ligating the coronary artery. The heart was placed back in the chest and sutured layer by layer. After one month, the H&E and Masson trichromatic staining (MTS) were used to evaluate the ventricular remodeling after MI. The results showed that the hydrogel reduced ventricular dilation after mechanical treatment of the ventricular wall, and the ventricular contraction function was improved compared with the MI group. After 8 weeks, the MI area was also analyzed histologically. In the blank group, the infarction area of ventricular wall was significantly thinner and the local structure was disordered. By contrast, in the hydrogel group the wall of the infarct area became less thinner, and the ventricular cavity structure was relatively intact (FIG. 14). In blank group, the MTS results show that a large number of collagen fibers replaced the myocardial tissue, and the structure was disordered. These results indicate that immediate application of hydrogel after MI can significantly reduce death of myocardial cells and secondary replacement of fibrosis tissue in the injured area. The mechanical support provided by hydrogel has a significant reversal effect on the pathological cardiac remodeling after acute MI. The results provide a potential path for the treatment of MI in the future.

Other hydrogel compositions can also be applied for cardiac patch.

Embodiment 40: Photo-Crosslinked Hydrogel as Tissue Engineering Scaffold Material in Cartilage Repair New Zealand male white rabbits were adopted and divided into three groups for repairing articular cartilage: a: group of hydrogels (4% Component A-15/3% Component B-1/0.2% Component C-1) wrapped with chondrocytes, i.e. a group of gel+ chondrocytes; b: pure hydrogel (4% Component A-15/3% Component B-1/0.2% Component C-1) group, i.e. gel group. c: the control group without treatment. In the experiment, the hydrogel precursor solution can fully penetrate and fill the defect of the rabbit articular cartilage, and adhered firmly to the defect after gelation, without any additional fixation. After 12 weeks of surgery, the rabbits were sacrificed by intravenous injection of air, and the injured joints were extracted to evaluate the repair. Results of rabbit articular cartilage lesions showed that the gel+ chondrocyte group developed smooth neonatal cartilage tissue at the joint defect and was well integrated with the old cartilage tissue after 12 weeks. The cartilage was also repaired in the gel group, but the contour of the cartilage wound arised from surgery was also seen. In the control group, the cartilage tissue was not repaired, and the damage site still exist an obvious hollow. We further evaluated the repair of cartilage in every group by H&E staining. The results showed that both the gel+ chondrocyte group and the gel group had new tissue formation and integrated well with the old cartilage tissue. However, tissue in the gel+ chondrocyte group was thicker than that of the gel group, and the surface of the former was more flat than the latter. In control group, it is difficult to observe obvious signs of new tissue. The components of neonatal cartilage were analyzed by Safranin-O and immunohistochemical staining. In the gel+ chondrocyte group and the gel group, the neonatal cartilage tissue showed a Safranin-O staining activity, and contained the glycoprotein component of normal cartilage. In addition, the neonatal cartilage tissue of the gel+ chondrocyte group and the gel group showed staining activity of Formula II collagen, proving that the cartilage tissue contained a large amount of Formula II collagen. The results demonstrated the newly produced hyaline cartilage when using the new photo-crosslinked hydrogel material to help cartilage repair.

Other hydrogel compositions can also be applied for tissue engineering scaffold material in cartilage repair.

Embodiment 41: Photo-Crosslinked Hydrogel for Tissue Engineering Scaffold Material Inbone Repair SD rats were used for skull repair experiments, and the above SD rats were randomly divided into 3 groups: a: an experimental group of hydrogel (30% Component A-25/5% Component B-1/1% Component C-1)+hydroxyapatite; b: hydrogel treatment (30% Component A-25/5% Component B-1/1% Component C-1); c: the control group without any material treatment. In the experiment, 4% chloral hydrate solution (0.9 mL per gram body weight) was used for abdominal anesthesia and iodine disinfection. Then, the scalp at the skull of the rat is opened by a surgical blade. A complete skull defect model with a diameter of 5 mm was made symmetrically around the skull of the mouse using a dental ring drill. In the experimental group, 200 μL of the hydrogel precursor solution was filled into the SD rat skull defect to fully penetrate into the wound edge. The 395 nm LED light source (20 mW/cm$^2$, 30 s) was used to complete gelation. The suture was used to suture the scalp. In the control group, after the SD rat skull defect model was constructed, the scalp was directly sutured without any other treatment. The above SD rats were kept in a sterile, 37° C. environment for 8 weeks. Then, the repair of the skull of SD rats in each group was evaluated by micro-CT scanning imaging. In the control group, the skull defect of the SD rat was not repaired. There is new osteogenesis at the edge of the skull defect in group b, but new bone tissue is limited, and most of the defects are not repaired. The skull defect filled with hydrogel+hydroxyapatite was repaired, and a large amount of new bone tissue was formed at the defect. The histological staining of the skull was then performed by Van Gieson staining. The results showed that the hydrogel+ hydroxyapatite-treated SD rats had complete new bone tissue in the skull defect. While only a small amount of new bone tissue was formed in the skull defect treated with hydrogel, and the bone tissue at the site is still defective. In the control group, almost no new bone tissue was formed. The tissue staining results further confirmed that the hydrogel combining hydroxyapatite had the best promotion for bone defects repair.

Other hydrogel compositions can also be applied for tissue engineering scaffold material in bone repair.

Embodiment 42: Photo-Crosslinked Hydrogel for 3D Printing (FDM) Bio-Ink 3D printing technology is a three-dimensional molding technology that has been rapidly developed in recent years. Current 3D printing technologies include fused deposition (FDM), light curing molding (SLA), laser sintering (SLS), continuous liquid surface manufacturing (CLIP), etc. Materials for cell printing are primarily hydrogel materials, and developing bio-ink-printable hydrogel materials for 3D printing and increasing the resolution of hydrogel material printing are two fundamental issues in this field of research. Take the hydrogel (3% Component A-22/2% Component B-1/0.2% Component C-1) as an example. The hydrogel precursor solution was uniformly mixed (the printing temperature is controlled at about 25° C. in printing barrel), and the viscosity of the bio-ink is adjusted by the temperature to obtain the best printing state. The appropriate print pressure and speed for bioprinting were determined according to the printed structures. After printing, the hydrogel was further crosslinked by light (or light while printing) to obtain a well-structured material for 3D cell culture.

Other hydrogel compositions can also be applied for 3D printing (FDM) bio-ink.

Embodiment 43: Photo-Crosslinked Hydrogel for 3D Printing (DLP) Bio-Ink

Figure 15:
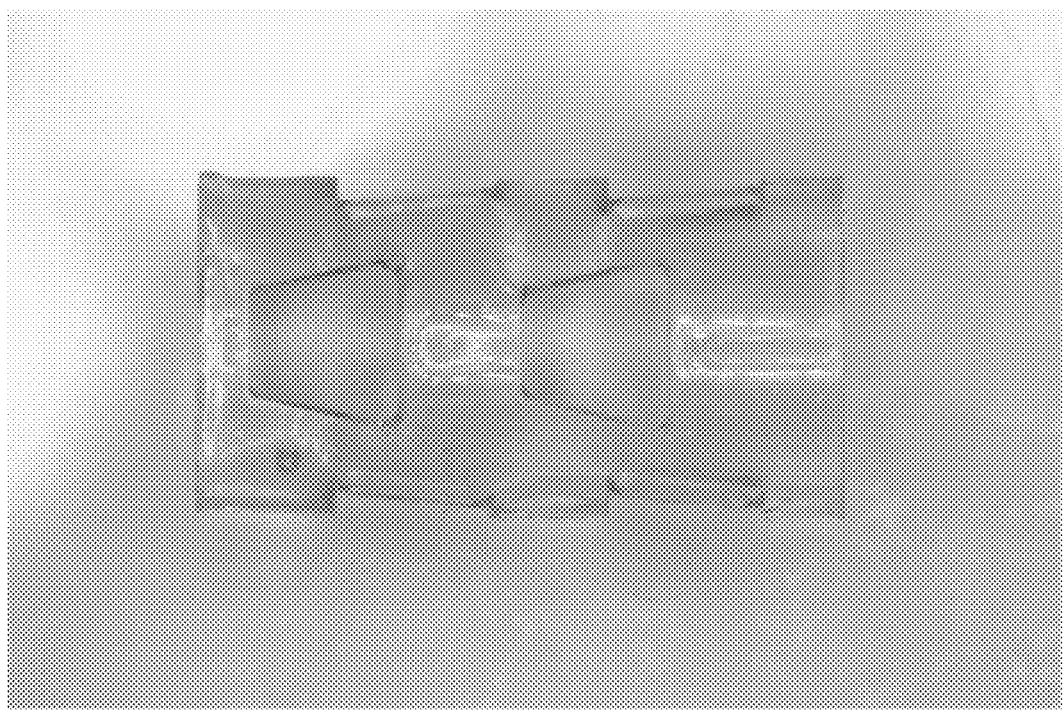
FIG. 15 is a visual effect view of the hydrogel (30% Component A-25/5% Component B-1/1% Component C-1) as 3D printing (DLP) bio-ink.

DLP (Digital Light Processing) 3D printing technology is a new formula of photo-curing printing method developed in recent years. Compared to SLA (stereo-curing) printers, DLP has the advantages of fast speed and high resolution. Currently, DLP 3D printing was mainly used in the fields of dental models and jewelry design. However, the printing inks are limited to photocurable resins. Hydrogels have received attention as an emerging bio-ink, but their printing were much impeded due to the limited hydrogel material that are suitable for DLP printing. The photo-crosslinked hydrogel proposed by this invention is very suitable for 3D printing due to its fast photocuring speed and excellent mechanical properties, and expected to be fabricated with high printing precision. Take a hydrogel (3% Component A-11/2% Component B-1/0.2% Component C-1) as an example. Put the hydrogel precursor solution into the liquid tank, and adjust the printing situation of the bio-ink such as the intensity of the light source, the exposure time and other parameters to obtain the best printing state, the well printed 3D hydrogel structure can be obtained (FIG. 15).

Other hydrogel compositions can also be applied for 3D printing (DLP) bio-ink.

Embodiment 44: Photo-Crosslinked Hydrogel for Drug Packaging and Releasing

Hydrogel is a cross-linking polymer network that swells in water but does not dissolve. Hydrogel is mostly composed of water, thus has very good biocompatibility and is especially suitable as carriers of drug and bioactive macromolecules. The drug or biologically active macromolecules encapsulated in the hydrogel material can achieve a sustained release accompanied with diffusion of the molecule and degradation of the material. Take the packaging and releasing of drugs as an example: hydrogel components (30% Component A-25/5% Component B-1/1% Component C-1) dissolve in physiological saline to formulate a certain concentration of hydrogel precursor solution. Drug molecules can be loaded in the hydrogel precursor solution. 200 μL of the above solution was placed in a cyclic mold to form a hydrogel under light exposure. The gel was then placed in a 24-well cell culture plate, and a certain amount of physiological saline was added. The amount of the drug in solution was analyzed by an ultraviolet test to evaluate the release of the drug from the material.

Other hydrogel compositions can also be applied for drug wrapping and release.

The above embodiments intend to facilitate the understanding and use of the invention. It is obvious that operators can easily make various modifications to these embodiments and the general principles described herein can be applied to other embodiments. Therefore, the invention is not limited to the embodiments described above. If the modifications and changes were not departing from the scope of this invention, they shall be under protection of this invention.

What is claimed is:
1. A highly strong and tough photo-crosslinked hydrogel material, wherein the highly strong and tough photo-crosslinked hydrogel material is prepared from the following three components in a biocompatible medium:
Component A: o-nitrobenzyl phototrigger modified photosensitive polymer derivative;
Component B: double bond groups modified polymer derivative;
Component C: photoinitiator,
the o-nitrobenzyl phototrigger modified photosensitive polymer derivative is selected from the following component A-1 to A-30:

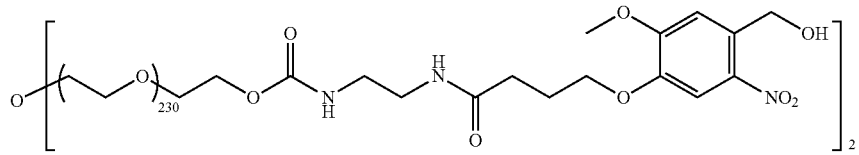

Component A-1

-continued
Component A-2
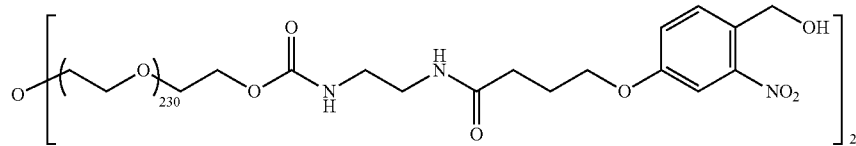
Component A-3
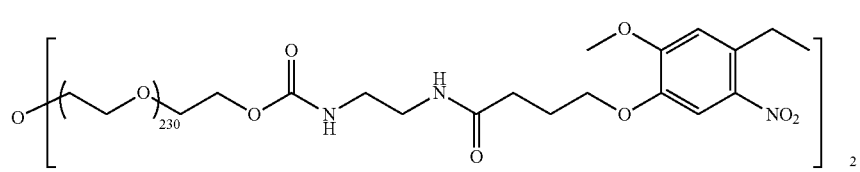
Component A-4
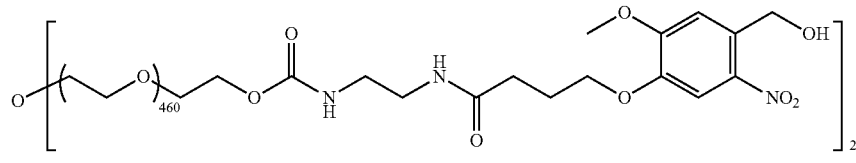
Component A-5
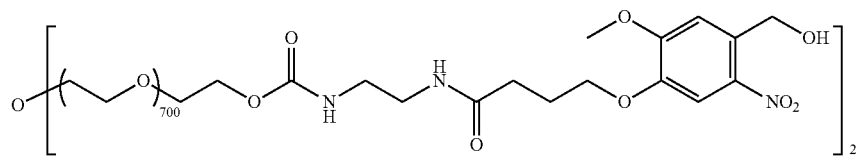
Component A-6
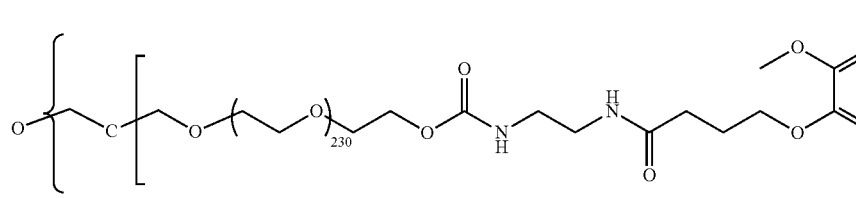
Component A-7
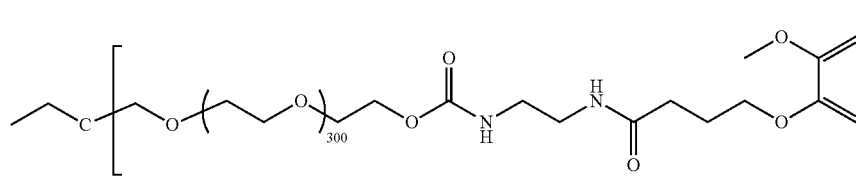
Component A-8
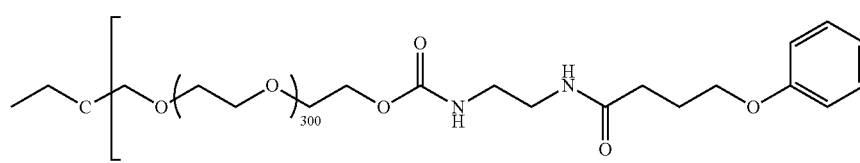
Component A-9
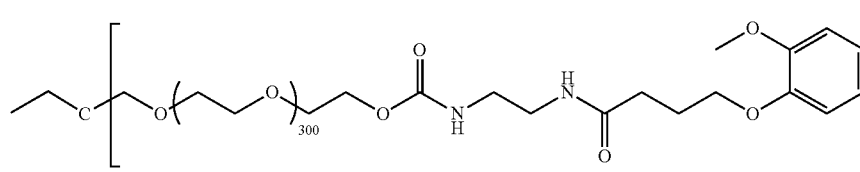
Component A-10
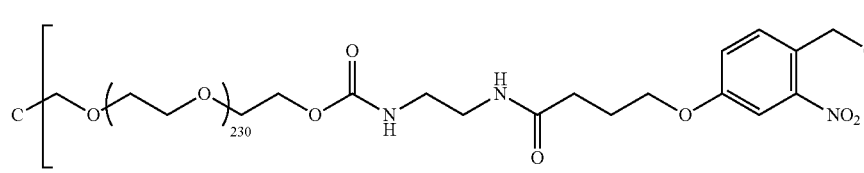

-continued
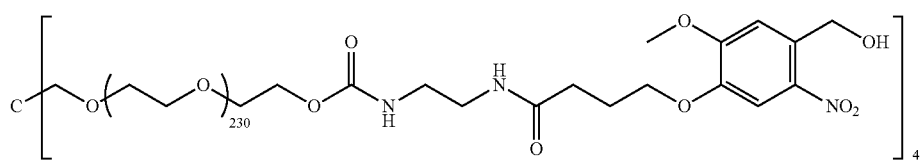
Component A-11
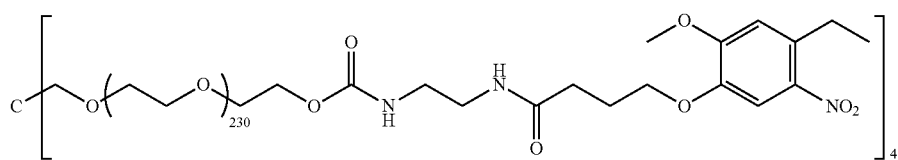
Component A-12
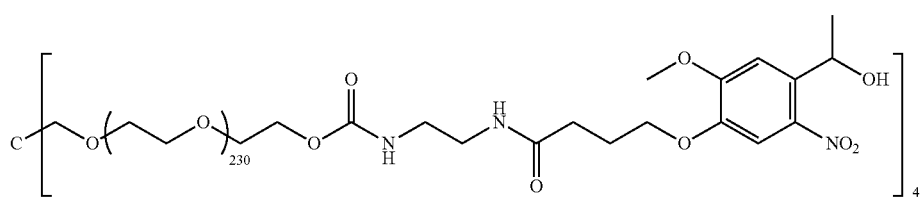
Component A-13
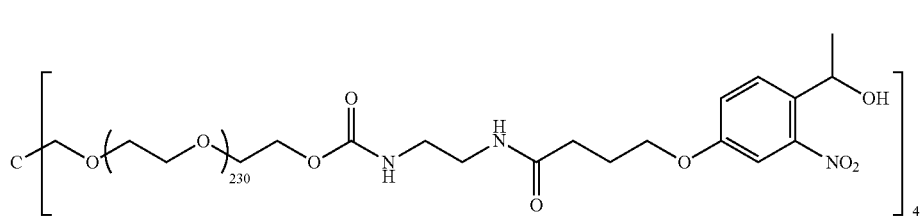
Component A-14
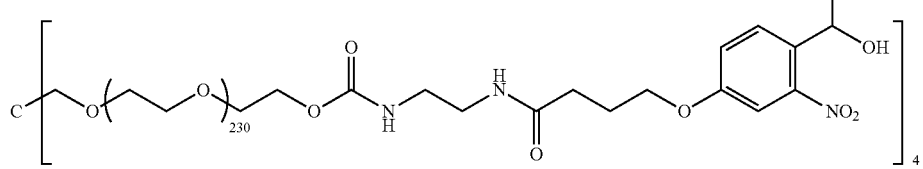
Component A-15
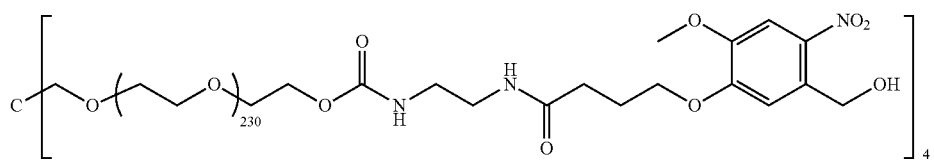
Component A-16
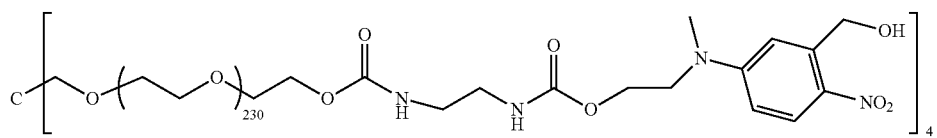
Component A-17
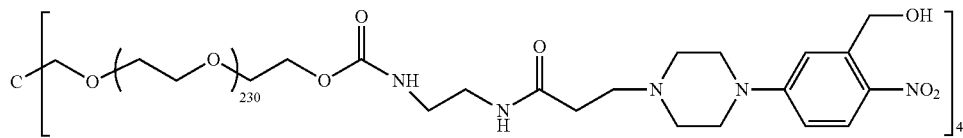
Component A-18
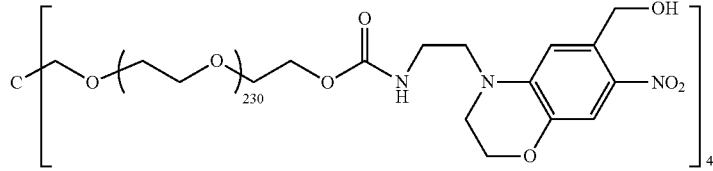
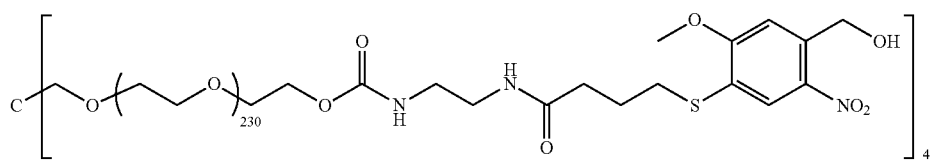
Component A-19

Component A-20
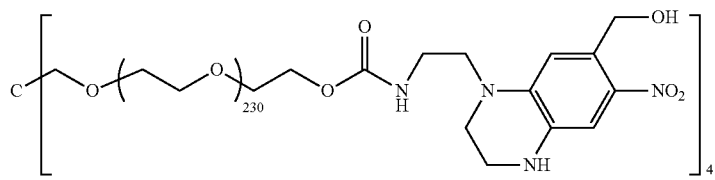
Component A-21
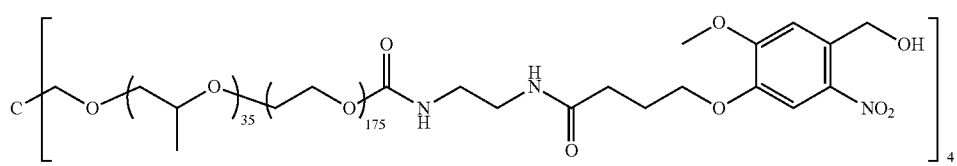
Component A-22
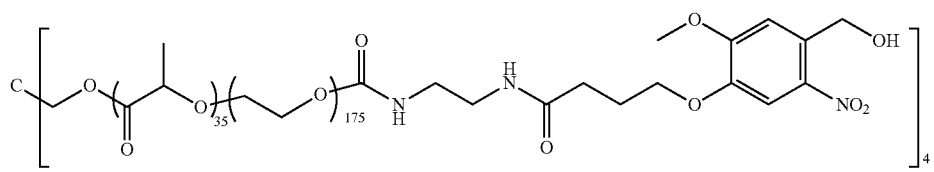
Component A-23
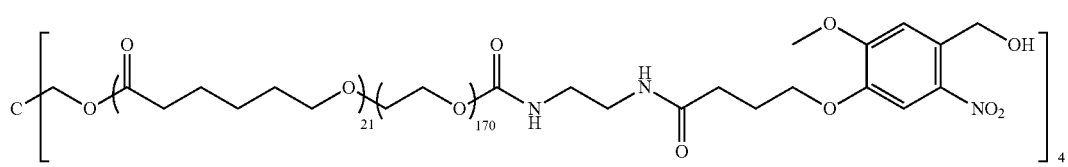
Component A-24
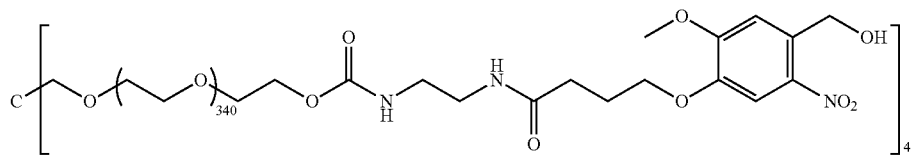
Component A-25
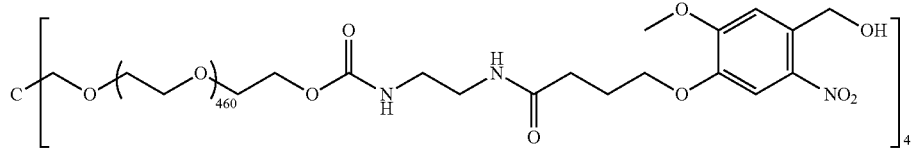
Component A-26
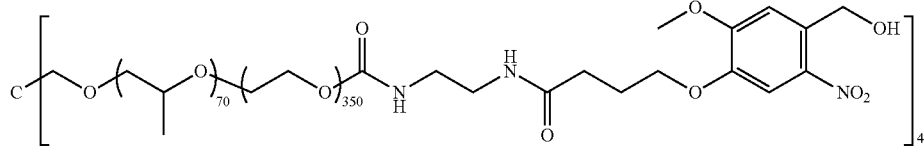
Component A-27
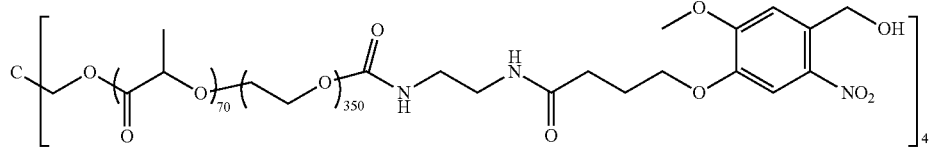
Component A-28
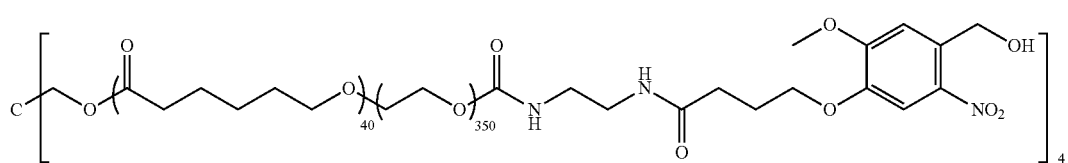

-continued

Component A-29

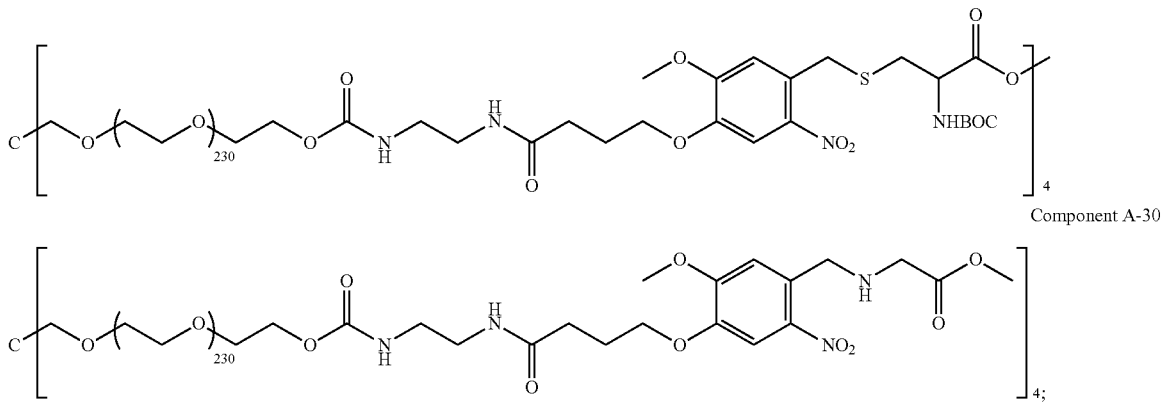

Component A-30 the double bond groups modified polymer derivative having a structure shown in Formula III:

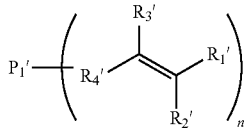

Formula III where in the Formula III, $R_1'$ and $R_2'$ are selected from hydrogen;
$R_3'$ is selected from hydrogen or methyl;
$R_4'$ is selected from an alkyl group, an ether group, an ester group, or an amide group;
$n \geq 2$;
$P_1'$ is hydrophilic natural macromolecules or hydrophilic synthetic polymers;
wherein the concentration of the o-nitrobenzyl phototrigger modified photosensitive polymer derivative is 1% wt-40% wt, the concentration of the double bond groups modified polymer derivative is 0.05% wt-10% wt, the concentration of the photoinitiator is 0.1% wt-3% wt, and the rest is the biocompatible medium.

2. The highly strong and tough photo-crosslinked hydrogel material according to claim 1, wherein the hydrophilic natural macromolecules comprise natural polysaccharides and their derivatives or degradations, proteins and their derivatives, modifiers and degradable peptides;

the natural polysaccharides comprise hyaluronic acid, carboxymethyl cellulose, methyl cellulose, hydroxyethyl cellulose, hydroxypropyl cellulose, alginate, dextran, agarose, heparin, chondroitin sulfate, glycol chitosan, propylene glycol chitosan, chitosan lactate, carboxymethyl chitosan or quaternary ammonium salt of chitosan;

the protein comprises various hydrophilic animal and plant proteins, and the protein degradations comprises gelatin or polypeptides;

the hydrophilic synthetic polymers comprise two-arm or multi-arm poly (ethylene glycol), poly (ethylene imine), synthetic peptides, poly (amino acid), poly (acrylic acid), poly (methacrylic acid), poly (acrylamide), poly (methacrylamide), poly (vinyl alcohol), poly (vinyl pyrrolidone).

3. The highly strong and tough photo-crosslinked hydrogel material according to claim 1, wherein the $P_1'$ is selected from hyaluronic acid, carboxymethyl cellulose, methyl cellulose, hydroxyethyl cellulose, hydroxypropyl cellulose, alginate, dextran, agarose, heparin, chondroitin sulfate, glycol chitosan, propylene glycol chitosan, chitosan lactate, carboxymethyl chitosan and quaternary ammonium salt of chitosan.

4. The highly strong and tough photo-crosslinked hydrogel material according to claim 1, wherein the double bond groups modified polymers in the Formula III is selected from the following structures of Component B-1 to B-8:

Component B-1

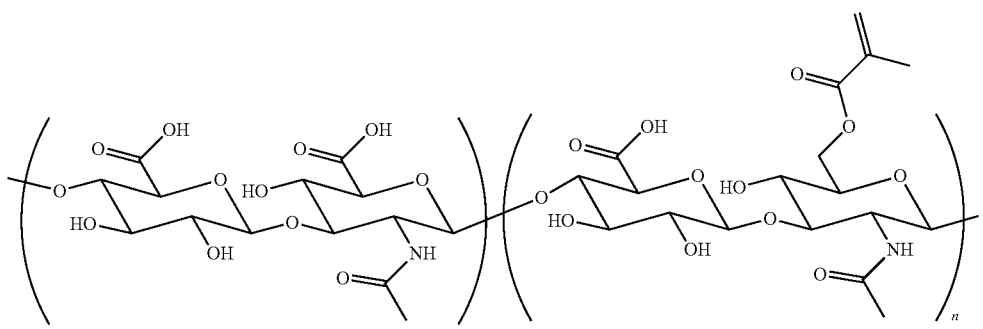

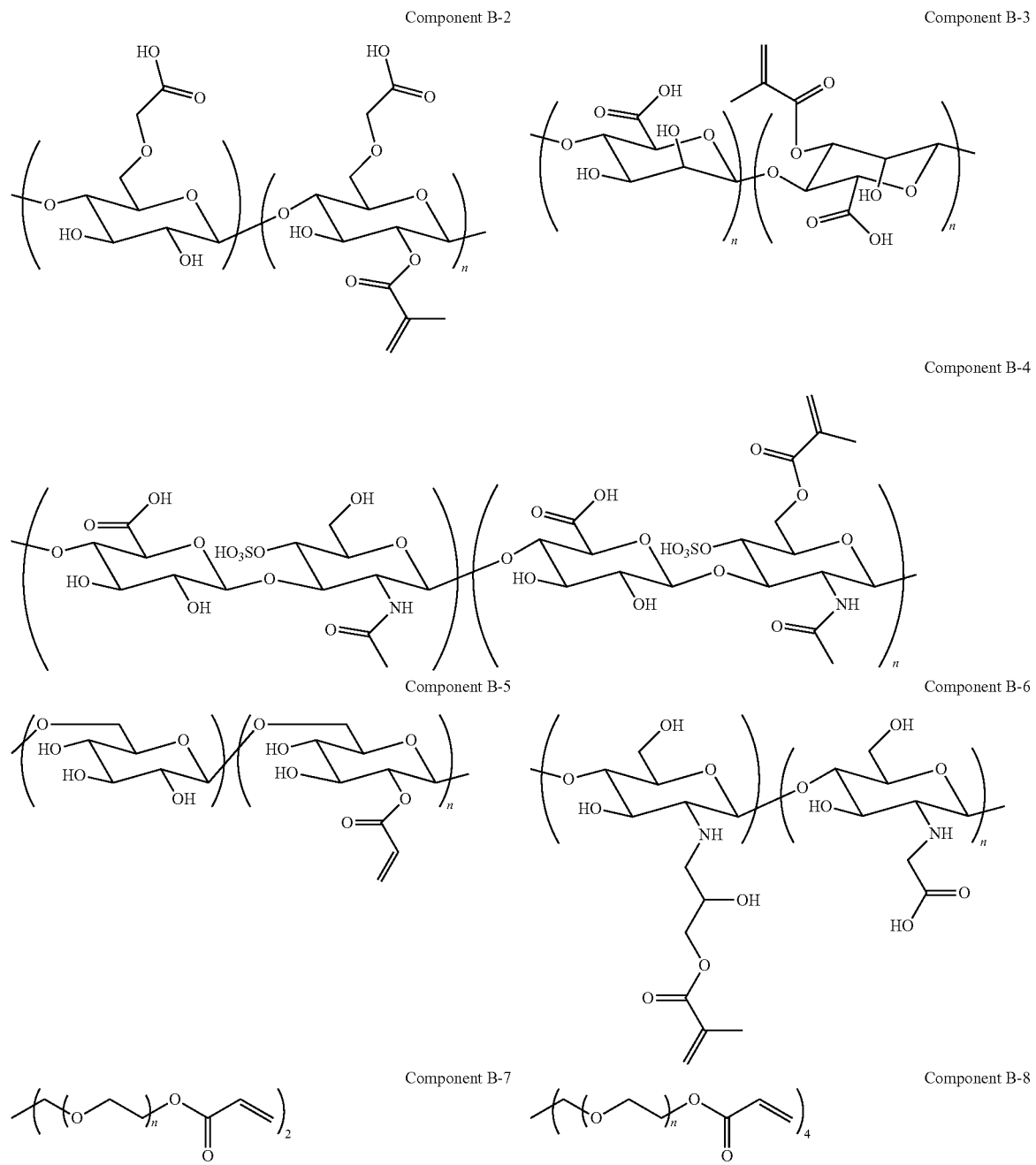
in Component B-1 to B-8, m and n≥2.
5. The highly strong and tough photo-crosslinked hydrogel material according to claim 1, wherein the photoinitiator is the substance that can produce free radicals under irradiation;
the photoinitiator is selected from Component C-1, Component C-2, Component C-3, Component C-4, Component C-5 and their derivatives:

-continued

Component C-2
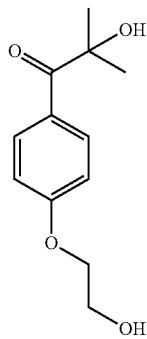

Component C-3
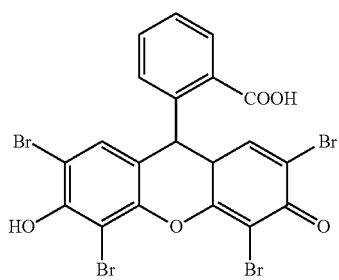

Component C-4
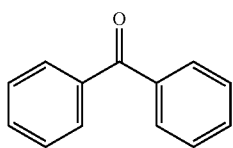

Component C-5
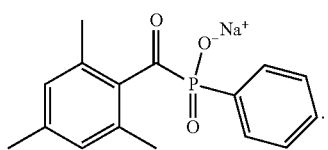

6. A preparation method of the highly strong and tough photo-crosslinked hydrogel material according to claim 1, comprising the following steps:

the Component A, the Component B and the Component C are dissolved in the biocompatible medium to obtain a hydrogel precursor solution;

under irradiation of light, the hydrogel precursor solution is photo-crosslinked to form a hydrogel.

7. The preparation method of highly strong and tough photo-crosslinked hydrogel material according to claim 6, wherein the biocompatible medium is selected from distilled water, physiological saline, buffer solution, acellular matrix and cell culture medium solution.

8. The preparation method of highly strong and tough photo-crosslinked hydrogel material according to claim 6, wherein wavelength of the light source is 250-500 nm.

9. The preparation method of highly strong and tough photo-crosslinked hydrogel material according to claim 8, wherein the wavelength of the light source is 300-450 nm.

10. The preparation method of highly strong and tough photo-crosslinked hydrogel material according to claim 9, wherein the wavelength of the light source is 365, 375, 385, 395 or 405 nm.

11. A kit for preparing the highly strong and tough photo-crosslinked hydrogel material, wherein the kit comprises:

Component A: o-nitrobenzyl phototrigger modified photosensitive polymer derivative;

Component B: double bond groups modified polymer derivative;

Component C: photoinitiator; and instructions for preparation and application of hydrogel, the o-nitrobenzyl phototrigger modified photosensitive polymer derivative is selected from the following component A-1 to A-30:

Component A-1
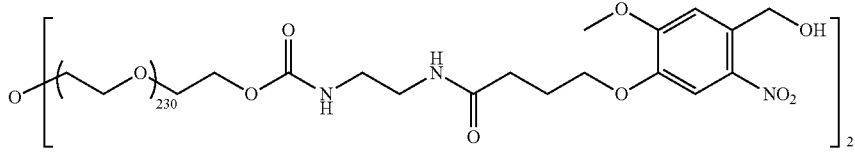

Component A-2
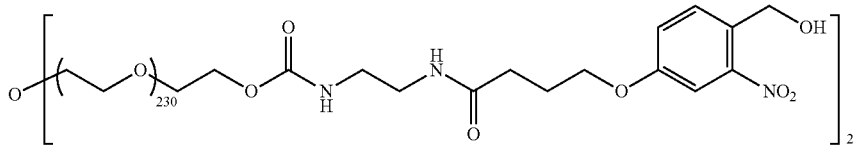

Component A-3
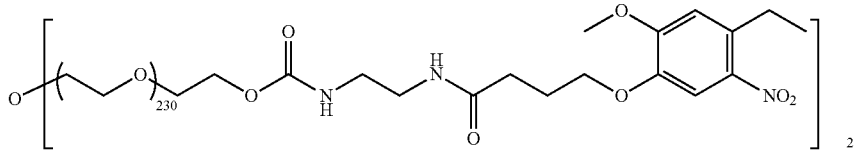

-continued
Component A-4
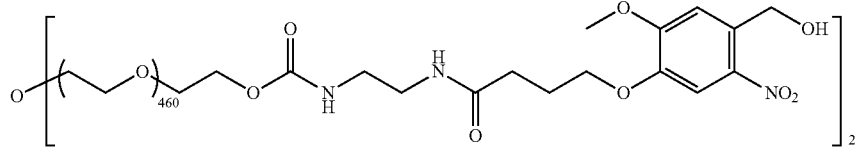
Component A-5
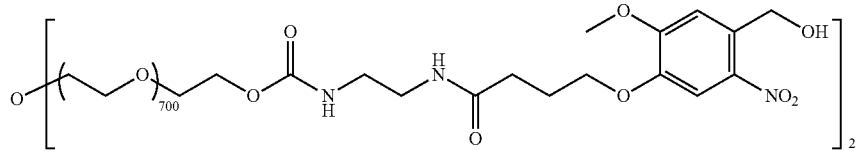
Component A-6
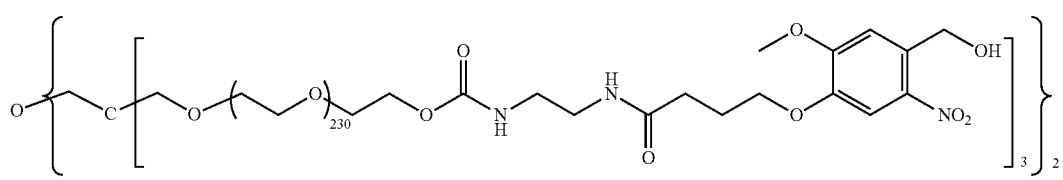
Component A-7
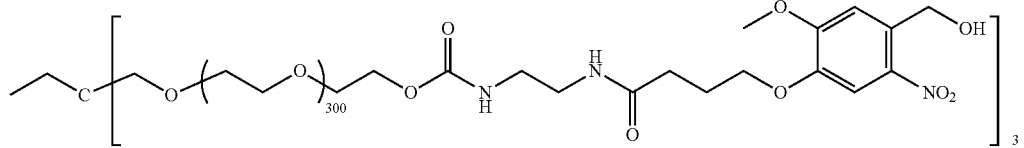
Component A-8
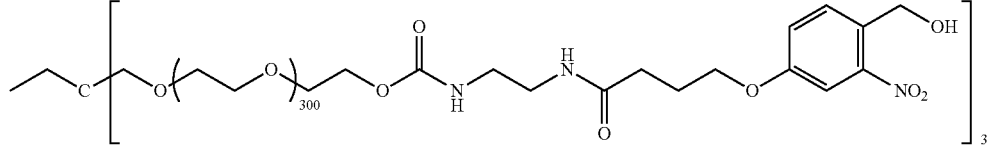
Component A-9
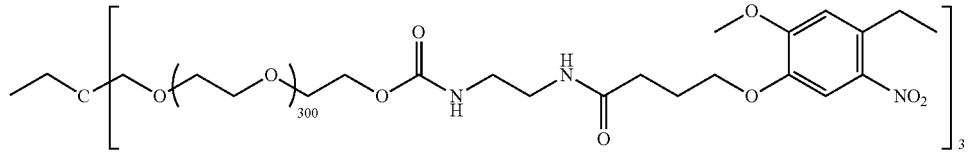
Component A-10
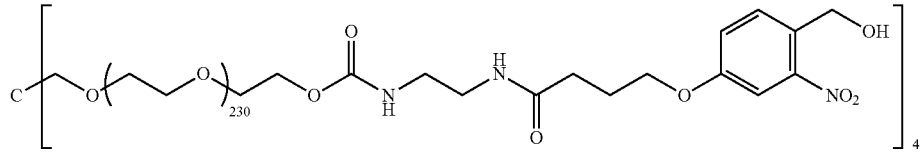
Component A-11
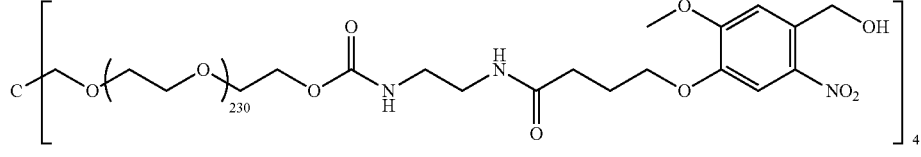
Component A-12
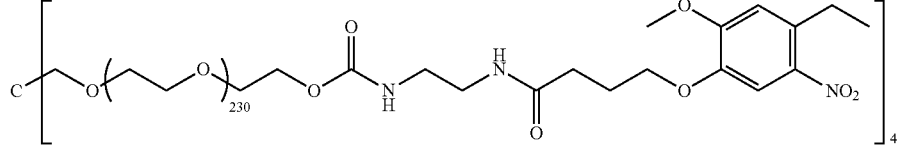

Component A-13
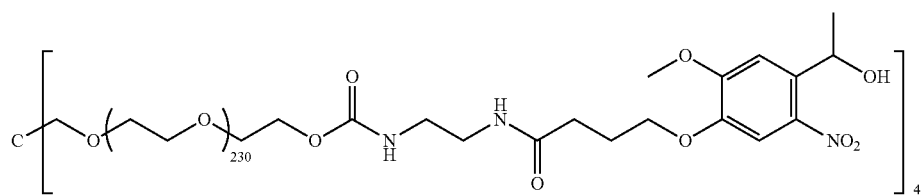
Component A-14
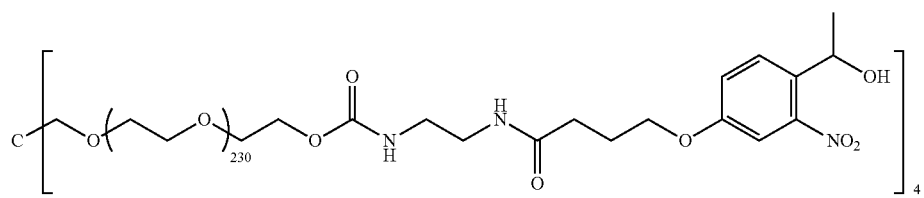
Component A-15
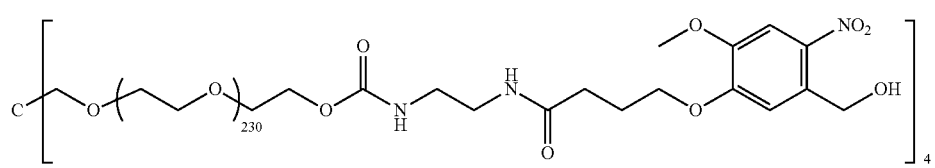
Component A-16
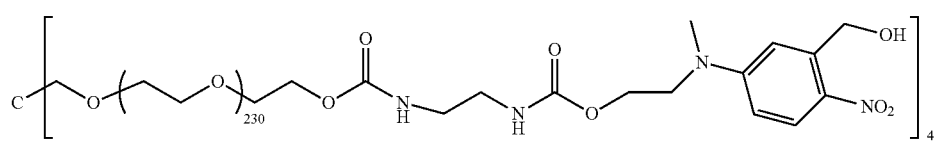
Component A-17
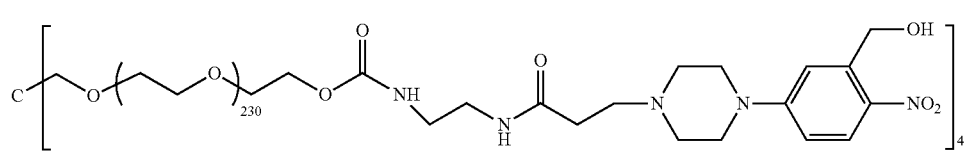
Component A-18
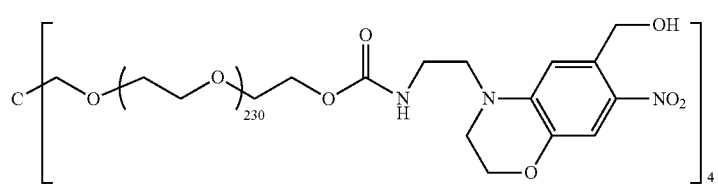
Component A-19
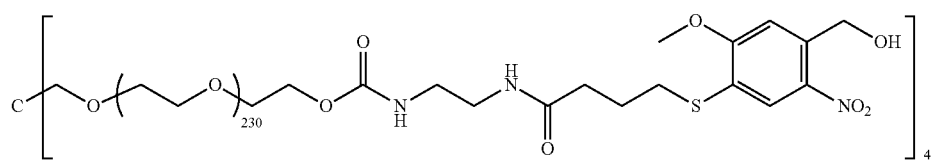
Component A-20
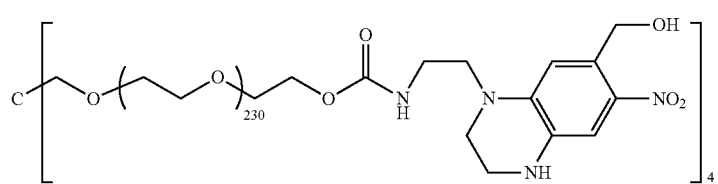
Component A-21
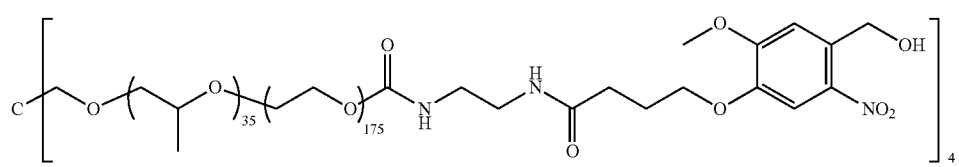

Component A-22
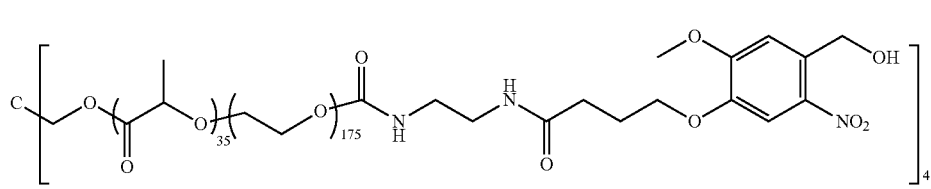
Component A-23
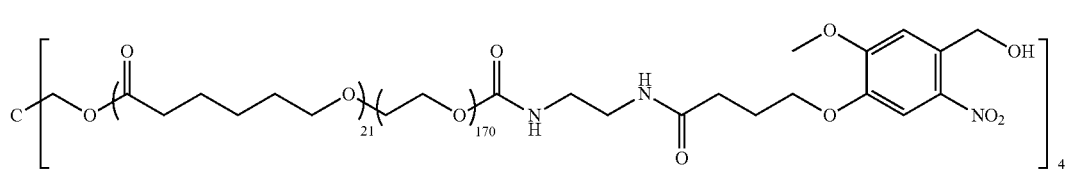
Component A-24
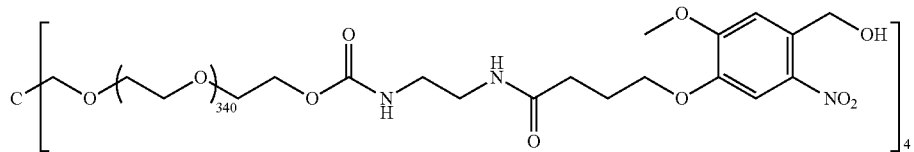
Component A-25
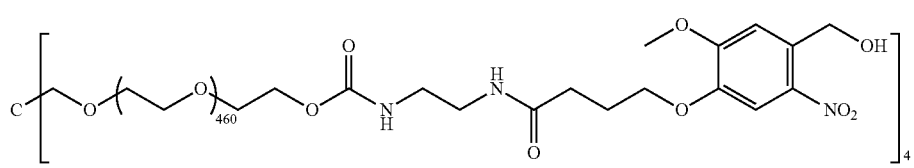
Component A-26
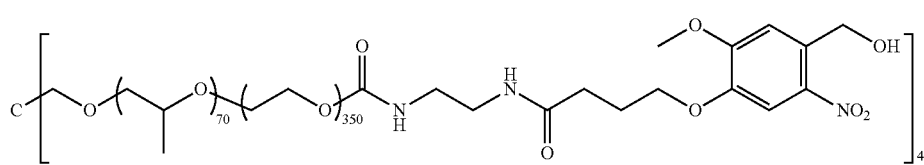
Component A-27
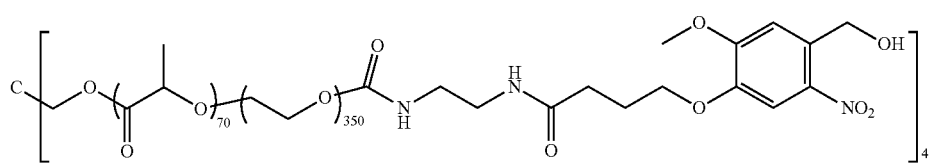
Component A-28
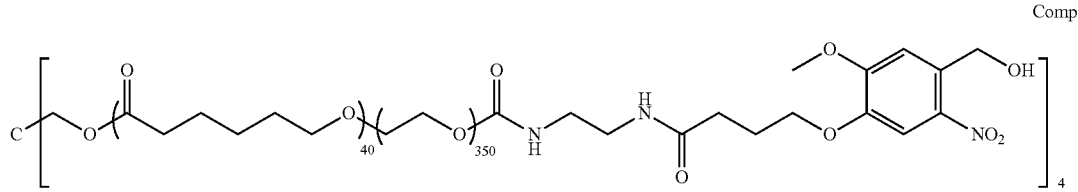
Component A-29
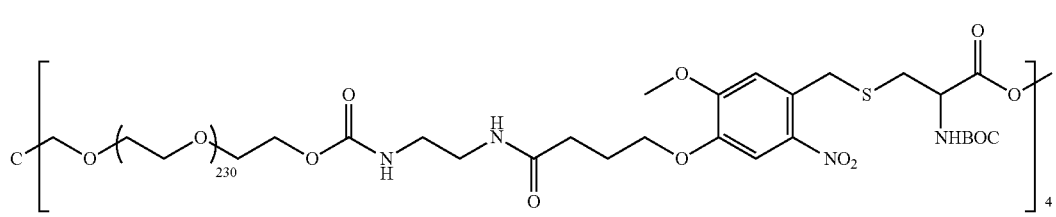

Component A-30

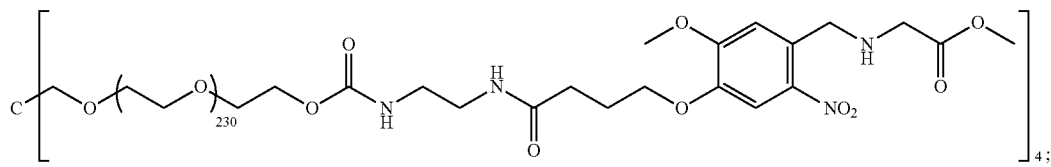

the double bond groups modified polymer derivative having a structure shown in Formula III:

Formula III

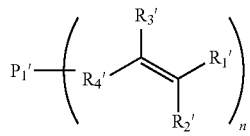

where in the Formula III, $R_1'$ and $R_2'$ are selected from hydrogen;

$R_3'$ is selected from hydrogen or methyl;

$R_4'$ is selected from an alkyl group, an ether group, an ester group, or an amide group;

$n \geq 2$;

$P_1'$ is hydrophilic natural macromolecules or hydrophilic synthetic polymers;

the photoinitiator is the substance that can produce free radicals under light irradiation, the photoinitiator is selected from Component C-1, Component C-2, Component C-3, Component C-4, Component C-5 and their derivatives:

Component C-1

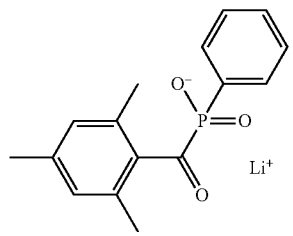

Component C-2

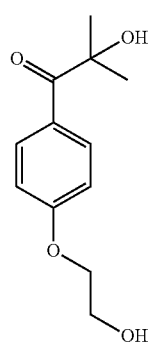

-continued

Component C-3

Component C-4

Component C-5

12. An application of the highly strong and tough photo-crosslinked hydrogel material according to claim 1, comprising the following application:

application of the highly strong and tough photo-crosslinked hydrogel material in preparation of tissue repair materials or drugs;

application of the highly strong and tough photo-crosslinked hydrogel material in preparation of tissue fluid leakage sealing material or medicine;

application of the highly strong and tough photo-crosslinked hydrogel material in preparation of hemostatic material or medicament;

application of the highly strong and tough photo-crosslinked hydrogel material in preparation of adhesive material;

application of the highly strong and tough photo-crosslinked hydrogel material in preparation of tissue engineering scaffold materials;

application of the highly strong and tough photo-crosslinked hydrogel material in preparation of 3D printing (FDM) material-bio-ink;

application of the highly strong and tough photo-crosslinked hydrogel material in preparation of 3D printing (SLA) material-bio-ink;

application of the highly strong and tough photo-crosslinked hydrogel material in preparation of 3D printing (DLP) material-bio-ink;

application of the highly strong and tough photo-crosslinked hydrogel material in preparation of 3D printing-combined with interventional surgery;

application of the highly strong and tough photo-crosslinked hydrogel material in preparation of a carrier of cells, proteins, and drugs.

13. The application of the highly strong and tough photo-crosslinked hydrogel material according to claim 12, wherein the tissue repair comprises postoperative wound closure; the tissue fluid leakage sealing comprises enteric leakage sealing, cerebrospinal fluid leakage, and gastric leakage sealing; the hemostasis comprises hepatic hemostasis, renal hemostasis, splenic hemostasis, pancreatic hemostasis, bone section hemostasis, arterial hemostasis, and cardiac hemostasis; the adhesive material comprises tissue fixed material, tissue reinforced material, and patch material.

14. The application of the highly strong and tough photo-crosslinked hydrogel material according to claim 13, wherein the postoperative wound closure comprises tissue sutureless and postoperative anti-adhesion; the tissue fixed material comprises hernia patch fixed material, valve fixed material, mucous membrane fixed material, and bone fixed material.

\* \* \* \* \*